US011876284B2

(12) United States Patent
Koul et al.

(10) Patent No.: US 11,876,284 B2
(45) Date of Patent: Jan. 16, 2024

(54) CONFORMAL ANTENNA MODULE WITH 3D-PRINTED RADOME

(71) Applicant: Synergy Microwave Corporation, Paterson, NJ (US)

(72) Inventors: Shiban K. Koul, Delhi (IN); Ajay Kumar Poddar, Elmwood Park, NJ (US); Karthikeya Gulur Sadananda, New Delhi (IN); Ulrich L. Rohde, Upper Saddle River, NJ (US)

(73) Assignee: Synergy Microwave Corporation, Paterson, NJ (US)

( * ) Notice: Subject to any disclaimer, the term of this patent is extended or adjusted under 35 U.S.C. 154(b) by 75 days.

(21) Appl. No.: 17/221,965

(22) Filed: Apr. 5, 2021

(65) Prior Publication Data

US 2021/0384613 A1 Dec. 9, 2021

Related U.S. Application Data

(60) Provisional application No. 63/033,884, filed on Jun. 3, 2020.

(51) Int. Cl.

*H04B 1/38* (2015.01)
*H01Q 1/24* (2006.01)
*H01Q 9/04* (2006.01)
*H01Q 1/42* (2006.01)
*H01Q 3/30* (2006.01)

(52) U.S. Cl.

CPC ............... *H01Q 1/243* (2013.01); *H01Q 1/42* (2013.01); *H01Q 3/30* (2013.01); *H01Q 9/0407* (2013.01)

(58) Field of Classification Search

CPC ............ H01Q 1/243; H01Q 1/42; H01Q 3/30; H01Q 9/0407; H04Q 1/523; H04B 1/38; H04B 1/3833

See application file for complete search history.

(56) References Cited

U.S. PATENT DOCUMENTS 9,473,220 B2 * 10/2016 Dinur .................. H04B 7/0404
9,627,775 B2 * 4/2017 Nakatsu ................ H01Q 21/08
10,811,777 B1 * 10/2020 Fuchi ....................... H01Q 3/01
11,011,828 B2 * 5/2021 Park ....................... H01Q 1/243
2019/0027808 A1 * 1/2019 Mow ........................ H04R 5/04

OTHER PUBLICATIONS

Forecast, Cisco VNI, "Cisco visual networking index: Global mobile data traffic forecast update 2009-2014 ,", Cisco Public Information, 40 pp. Feb. 9, 2010.

(Continued)

*Primary Examiner* — Tuan Pham
(74) *Attorney, Agent, or Firm* — Lerner David LLP

(57) ABSTRACT

The present disclosure provides several embodiments of integrated conformal antennas that are designed to be integrated into handheld devices and support operation at millimeter-wave operating frequency band that includes 28 GHz. The antennas have low mutual coupling despite close proximity, and maintain a front-to-back radiation ratio of 10 dB or better within the operating frequency band. The integrated conformal antennas are further capable of supporting operation of the device in different orientations, different forward gains, or a combination thereof.

42 Claims, 67 Drawing Sheets

(56) References Cited

OTHER PUBLICATIONS

Wang, C.-X., et al., "Cellular architecture and key technologies for 5G wireless communication networks," IEEE Communications Magazine, vol. 52, No. 2, 122-130, Feb. 2014.
Hong, W., K.-H. Baek, Y. Lee, Y. Kim, and S.-T. Ko, "Study and prototyping of practically large-scale mmWave antenna systems for 5G cellular devices," IEEE Communications Magazine, vol. 52, No. 9, 63-69, Sep. 2014.
Rappaport, T. S., S. Sun, R. Mayzus, H. Zhao, Y. Azar, K. Wang, G. N. Wong, J. K. Schulz, M. Samimi, and F. Gutierrez, "Millimeter wave mobile communications for 5G cellular: It will work!," IEEE Access, vol. 1, 335-349, May 2013.
Zhang, J., X. Ge, Q. Li, M. Guizani, and Y. Zhang, "5G millimeter-wave antenna array: Design and challenges," IEEE Wireless Communications, vol. 24, No. 2, 106-112, Apr. 2017.
Rowell, C. and E. Y. Lam, "Mobile-phone antenna design," IEEE Antennas and Propagation Magazine, vol. 54, No. 4, 14-34, Aug. 2012.
Haraz, O. M., A. Elboushi, S. A. Alshebeili, and A.-R. Sebak, "Dense dielectric patch array antenna with improved radiation characteristics using EBG ground structure and dielectric superstrate for future 5G cellular networks," IEEE Access, vol. 2, 909-913, Aug. 2014.
Asaadi, M. and A. Sebak, "High-gain low-profile circularly polarized slotted SIW cavity antenna for MMW applications," IEEE Antennas and Wireless Propagation Letters, vol. 16, 752-755, Aug. 2016 2017.
Jilani, S. F. and A. Alomainy, "Planar millimeter-wave antenna on low-cost flexible PET substrate for 5G applications," 2016 10th European Conference on Antennas and Propagation (EuCAP), pp. 1-3, IEEE, Apr. 2016.
Park, J.-S., J.-B. Ko, H.-K. Kwon, B.-S. Kang, B. Park, and D. Kim, "A tilted combined beam antenna for 5G communications using a 28-GHz band," IEEE Antennas and Wireless Propagation Letters, vol. 15, 1685-1688, Jan. 2016.
Sarabandi, K., J. Oh, L. Pierce, K. Shivakumar, and S. Lingaiah, "Lightweight, conformal antennas for robotic flapping flyers," IEEE Antennas and Propagation Magazine, vol. 56, No. 6, pp. 29-40, Dec. 2014.
Agnihotri, N., G. S. Karthikeya, K. Veeramalai, A. Prasanna, and S. S. Siddiq, "Super wideband conformal antenna array on cylindrical surface," 2016 21st International Conference on Microwave, Radar and Wireless Communications (MIKON), 1-4, IEEE, Jun. 2016.
Semkin, V., F. Ferrero, A. Bisognin, J. Ala-Laurinaho, C. Luxey, F. Devillers, and A. V. Raisanen, "Beam switching conformal antenna array for mm-wave communications," IEEE Antennas and Wireless Propagation Letters, vol. 15, 28-31, 2016. Apr. 2015.
Si, L.-M., W. Zhu, and H.-J. Sun, "A compact, planar, and CPW-fed metamaterial-inspired dual-band antenna," IEEE Antennas and Wireless Propagation Letters, vol. 12, 305-308, Feb. 2013.
Raman, S. and G. M. Rebeiz, "94GHz slot-ring antennas for monopulse applications," Antennas and Propagation Society International Symposium, 1995, AP-S, Digest, vol. 1, 722-725, IEEE, Jun. 1995.
Zhai, G., Y. Cheng, Q. Yin, S. Zhu, and J. Gao, "Uniplanar millimeter-wave log-periodic dipole array antenna fed by coplanar waveguide," International Journal of Antennas and Propagation, vol. 2013. 6 pp. Oct. 2013.
Elsheakh, D. M. and M. F. Iskander, "Circularly polarized triband printed quasi-Yagi antenna for millimeter-wave applications," International Journal of Antennas and Propagation, vol. 2015. 10pp. Feb. 2015.
Jackson, R. W., "Considerations in the use of coplanar waveguide for millimeter-wave integrated circuits," IEEE Transactions on Microwave Theory and Techniques, vol. 34, No. 12, 1450-1456, Dec. 1986.
Jilani, S. F., S. M. Abbas, K. P. Esselle, and A. Alomainy, "Millimeter-wave frequency reconfigurable T-shaped antenna for 5G networks," 2015 IEEE 11th International Conference on Wireless and Mobile Computing, Networking and Communications (WiMob), 100-102, IEEE, Oct. 2005.
Dadgarpour, A., B. Zarghooni, B. S. Virdee, and T. A. Denidni, "Single end-fire antenna for dual-beam and broad beamwidth operation at 60 GHz by artificially modifying the permittivity of the antenna substrate," IEEE Transactions on Antennas and Propagation, vol. 64, No. 9, 4068-4073, Sep. 2016.
Alhalabi, R. A. and G. M. Rebeiz, "High-efficiency angled-dipole antennas for millimeter-wave phased array applications," IEEE Transactions on Antennas and Propagation, vol. 56, No. 10, 3136-3142, Oct. 2008.
Alhalabi, R. A. and G. M. Rebeiz, "Differentially-fed millimeter-wave Yagi-Uda antennas with Differentially-fed millimeter-wave Yagi-Uda antennas with," IEEE Transactions on Antennas and Propagation, vol. 58, No. 3, 966-969, Mar. 2010.
B. Yu, K. Yang, C. Sim and G. Yang, "A Novel 28 GHz Beam Steering Array for 5G Mobile Device With Metallic Casing Application," in IEEE Transactions on Antennas and Propagation, vol. 66, No. 1, pp. 462-466, Jan. 2018.
S. X. Ta, H. Choo and I. Park, "Broadband Printed-Dipole Antenna and Its Arrays for 5G Applications," in IEEE Antennas and Wireless Propagation Letters, vol. 16, pp. 2183-2186, May 2017.
M. Li et al., "Eight-Port Orthogonally Dual-Polarized Antenna Array for 5G Smartphone Applications," in IEEE Transactions on Antennas and Propagation, vol. 64, No. 9, pp. 3820-3830, Sep. 2016.
N. H. Shahadan et al., "Steerable Higher Order Mode Dielectric Resonator Antenna With Parasitic Elements for 5G Applications," in IEEE Access, vol. 5, pp. 22234-22243, Oct. 2017.
X. Zhu, J. Zhang, T. Cui and Z. Zheng, "A Miniaturized Dielectric-Resonator Phased Antenna Array with 3D-Coverage for 5G Mobile Terminals," 2018 IEEE 5G World Forum (5GWF), Silicon Valley, CA, Jul. 2018, pp. 343-346.
W. El-Halwagy, R. Mirzavand, J. Melzer, M. Hossain and P. Mousavi, "Investigation of Wideband Substrate-Integrated Vertically-Polarized Electric Dipole Antenna and Arrays for mm-Wave 5G Mobile Devices," in IEEE Access, vol. 6, pp. 2145-2157, 2018. Dec. 2017.
A. Dadgarpour, M. Sharifi Sorkherizi and A. A. Kishk, "Wideband Low-Loss Magnetoelectric Dipole Antenna for 5G Wireless Network With Gain Enhancement Using Meta Lens and Gap Waveguide Technology Feeding," in IEEE Transactions on Antennas and Propagation, vol. 64, No. 12, pp. 5094-5101, Dec. 2016.
S. Zhang, I. Syrytsin and G. F. Pedersen, "Compact Beam-Steerable Antenna Array With Two Passive Parasitic Elements for 5G Mobile Terminals at 28 GHz," in IEEE Transactions on Antennas and Propagation, vol. 66, No. 10, pp. 5193-5203, Oct. 2018.
N. Shoaib, S. Shoaib, R. Y. Khattak, I. Shoaib, X. Chen and A. Perwaiz, "MIMO Antennas for Smart 5G Devices," in IEEE Access, vol. 6, pp. 77014-77021, Oct. 2018.
Wani, Zamir, Mahesh P. Abegaonkar, and Shiban K. Koul. "Millimeter-wave antenna with wide-scan angle radiation characteristics for MIMO applications." International Journal of RF and Microwave Computer Aided Engineering: 2019,29:e21564. 9 pp. Oct. 2018.
Z. Wani, M. P. Abegaonkar, and S. K. Koul, "A 28-GHz Antenna for 5G MIMO Applications," Progress In Electromagnetics Research Letters, vol. 78, 73-79, Aug. 2018.
A. Dadgarpour, B. Zarghooni, B. S. Virdee and T. A. Denidni, "One- and Two-Dimensional Beam-Switching Antenna for Millimeter-Wave MIMO Applications," in IEEE Transactions on Antennas and Propagation, vol. 64, No. 2, pp. 564-573, Feb. 2016.
M. Sun, Z. N. Chen and X. Qing, "Gain Enhancement of 60-GHz Antipodal Tapered Slot Antenna Using Zero-Index Metamaterial," in IEEE Transactions on Antennas and Propagation, vol. 61, No. 4, pp. 1741-1746, Apr. 2013.
I. T. Nassar and T. M. Weller, "A Novel Method for Improving Antipodal Vivaldi Antenna Performance," in IEEE Transactions on Antennas and Propagation, vol. 63, No. 7, pp. 3321-3324, Jul. 2015.
L. Chen, Z. Lei, R. Yang, J. Fan and X. Shi, "A Broadband Artificial Material for Gain Enhancement of Antipodal Tapered Slot Antenna," in IEEE Transactions on Antennas and Propagation, vol. 63, No. 1, pp. 395-400, Jan. 2015.

(56) References Cited

OTHER PUBLICATIONS

B. Zhou, H. Li, X. Zou, and T.-J. Cui, "Broadband and High-Gain Planar Vivaldi Antennas Based on Inhomogeneous Anisotropic Zero-Index Metamaterials," Progress In Electromagnetics Research, vol. 120, 235-247, Oct. 2011.

* cited by examiner

28 GHz

30 GHz

28 GHz

28GHz

CONFORMAL ANTENNA MODULE WITH 3D-PRINTED RADOME

CROSS-REFERENCE TO RELATED APPLICATIONS

The present application claims the benefit of the filing date of U.S. Provisional Patent Application No. 63/033,884 filed Jun. 30, 2020, the disclosure of which is hereby incorporated herein by reference.

TECHNICAL FIELD

The present disclosure relates to conformal antenna modules, more particularly to conformal antenna modules operating in a millimeter-wave frequency band, such as for 5G telecommunication applications.

BACKGROUND

Recent improvements have made it possible to improve both telecommunication speed and capacity using millimeter-wave frequency bands. However, millimeter-wave signals (also referred to as 5G signals) are more susceptible to interference from a user's body and hands as to compared to lower-frequency radio waves such as 4G LTE or 3G signals, since the lower frequency radio waves have a greater wavelength, which is less susceptible for penetration losses. Additionally, millimeter-wave signals are suspected by some to pose a larger radiation risk to users as compared to lower-frequency radio waves. As such, smartphones and other handheld devices that are intended to be 5G compatible, that is capable of transmitting and receiving signals in a millimeter-wave frequency band, are subject to difficulties such as signal interference and perceived risks.

Additionally, handheld devices may be held or oriented in multiple ways. For example, FIG. 1 illustrates a common usage scenario for a handheld device 100 in which the device is being held in a portrait or upright orientation. In the portrait orientation, the user commonly holds the device using one hand 110. The hand that the user holds the device may vary depending on the user's preference, although the hand is usually positioned on a side of the device and towards the bottom of the device.

In order for an antenna of a handheld device to be operational in the portrait orientation, the antenna must radiate in at least a direction away from the user's body and hands, and in a direction towards a base station, regardless of with which hand the user holds and operates the handheld device. Additionally, the antenna should be integrated along the panel of the handheld device to avoid interference and mutual coupling with a radio frequency (RF) motherboard of the handheld device.

FIG. 2 illustrates a second common usage scenario for the handheld device 100 in which the device is being held in a landscape or sideways orientation. Here, the axis of the handheld device 100 is perpendicular to that of the portrait orientation, meaning that the handheld device 100 is rotated 90 degrees from the portrait orientation along a depth axis of the device. In the landscape orientation, the user commonly engages the handheld device with both hands, particularly one hand on each side. Additionally, the side of the device that points upward while the device is sideways may vary depending on the user's preference. In order for an antenna of a handheld device to be operational in the landscape orientation, the antenna must radiate in at least a direction away from the user's body and hands, and in a direction towards the base station, although the user holds and operates the handheld device with both hands.

Moreover, since the handheld device 100 can be used interchangeably between the portrait and landscape orientations, it is necessary for the antenna of the device to be designed to accommodate both use scenarios. That is, the antenna must be capable of radiating in the direction of the base station regardless of whether the user is holding the device in a portrait or a landscape orientation, and regardless of with which hand or hands the user is holding the device. Additionally, to improve portability and usability of handheld devices, and to provide for easy integration with current and future commercially available device models, the antenna should have as small a physical footprint as possible.

One known approach to avoid signal interference and direct signals away from the user is to provide the handheld device with a phased array having beam scanning capabilities. This approach requires the introduction of phase shifters to the antenna, as well as additional associated electronic components. FIG. 3*a* shows a single-element inset-fed strongly resonant patch antenna formed on a planar substrate in the XY plane and designed to operate at a millimeter-wave frequency band such as at a 28 GHz frequency band. FIG. 3*b* shows a phased array including four copies of the patch antenna of FIG. 3*a*, and which are placed at about half-wavelength apart from each other at the operating frequency. FIG. 4 shows the beam scanning properties of the phased array in the elevation plane (or YZ plane) in FIG. 3*b*, as measured in the YZ plane.

However, the added components of the phased array design of FIG. 3*b* adds space, weight and production cost to the design, all of which are generally unwanted. Additionally, it is observed that when the beam is scanned away from boresight, the gain of the beam decreases and there is deterioration in the radiation pattern integrity. Therefore, the phased array approach may not be suitable for devices that are operated from multiple orientations, such as portrait and landscape orientations.

Additionally, millimeter-wave based systems require an ability to perform dynamic beamforming at the device end in order to search out the appropriate signal from a base station or access point. Therefore, smartphones and other handheld devices having 5G compatibility should include functionality to perform dynamic beamforming.

SUMMARY

One aspect of the present disclosure is directed to an apparatus including a planar substrate including a fold extending along a lateral axis, wherein the fold divides the planar substrate between a first portion and a second portion, a first port formed at an end of the planar substrate on the first portion of the substrate, and a first antenna coupled to the first port and including one or more first radiator elements formed on the second position of the substrate, and one or more first feed lines connecting the first port to the one or more first radiator elements.

In some examples, the first antenna may be configured to operate at a millimeter-wave operating frequency band.

In some examples, the millimeter-wave operating frequency band may include 28 GHz.

In some examples, the fold may be at a 90-degree angle, and the apparatus may be adapted to be integrated within a casing of a handheld device.

In some examples, the first antenna may be a phased array antenna including a plurality of first radiator elements and a network of first feed lines connecting the first port to each of the plurality of first radiator elements.

In some examples, the first antenna may have a fractional input impedance bandwidth of about 10%

In some examples, the first antenna may have a front-to-back radiation ratio of 10 dB or greater within the operating frequency band.

In some examples, the one or more first radiators may be a single radiator and a single first feed line, and the first antenna may be a wideband antenna including one or more stubs coupled to the single first feed line and adapted to increase a fractional input impedance bandwidth of the first antenna.

In some examples, the first antenna may have a fractional input impedance bandwidth of about 13%.

In some examples, the first antenna may have a front-to-back radiation ratio of 10 dB or greater within the operating frequency band.

In some examples, the apparatus may further include a second port formed at the end of the planar substrate on the first portion of the substrate, and a second antenna coupled to the second port.

In some examples, the second antenna may be a wideband antenna and include a second radiator formed on the second position of the substrate, a second feed line extending in a longitudinal direction and connecting the second port to the one or more second radiators, and one or more stubs coupled to the second feed line and adapted to increase a fractional input impedance bandwidth of the second antenna.

In some examples, the second radiator may be configured to radiate in a direction perpendicular to the longitudinal direction.

In some examples, a spacing between the first antenna and the second antenna may be on the order of 1 millimeter.

In some examples, a mutual coupling between the first antenna and the second antenna may be less than 20 dB across the operating frequency band.

In some examples, the apparatus may further include a third port formed at a side of the planar substrate on the second portion of the substrate, and a third antenna coupled to the third port.

In some examples, the third antenna may include one or more third radiator elements formed on the second position of the substrate, and one or more third feed lines connecting the third port to the one or more third radiator elements.

In some examples, a spacing between the first antenna and the third antenna may be on the order of 1 millimeter.

In some examples, a mutual coupling between the first antenna and the third antenna may be less than 20 dB across the operating frequency band.

In some examples, a gain of the second antenna within the operating frequency band may be more than double a gain of the third antenna.

In some examples, the apparatus may further include a radome including a casing made of a dielectric material.

In some examples, the casing may be adapted to cover each of the plurality of first radiator elements, the second radiator element and the one or more third radiator elements.

In some examples, the casing may include an upper surface and a lower surface encasing each of the first radiator elements, the second radiator element and the one or more third radiator elements.

In some examples, the upper surface may further include a first portion having a first thickness and positioned over the first antenna and the third antenna, and a second portion having a second thickness less than the first thickness and positioned over the second antenna.

In some examples, the casing may have a dielectric constant of about 2.75.

In some examples, the casing may have a dielectric loss tangent of about 0.01.

In some examples, the casing may have a surface resolution of about 200 μm or less.

In some examples, the apparatus may further include a second fold parallel to the fold and further dividing the substrate into first, second and third portions.

In some examples, the second portion may be between the first and third portions, and each of the radiator elements may be in the second portion.

In some examples, a height of the second portion in a direction perpendicular to the lateral axis may be 6 mm or fewer.

In some examples of the mobile device, the fold included in the substrate of the apparatus may be adapted to conform to a corner of the mobile device housing.

In some examples, the mobile device may include a processor configured to receive an indication of an orientation of the mobile device being one of a first orientation or a second orientation, transmit and receive signals between the mobile device and a base station using the first antenna when the indicated orientation of the mobile device is the first orientation, and transmit and receive signals between the mobile device and the base station using the second antenna when the indicated orientation of the mobile device is the second orientation.

In some examples, the first orientation may be a portrait orientation, and the second orientation may be a landscape orientation.

In some examples, the processor may be further configured to receive a first instruction to perform a data transfer or point-to-point link operation, in response to the first instruction, excite the second port to perform the data transfer or point-to-point link operation using the second antenna, receive a second instruction to perform a broadcast operation, and in response to the second instruction, excite the third port to perform the data transfer or point-to-point link operation using the third antenna.

Another aspect of the present disclosure is directed to an apparatus including a planar substrate, a first port formed on the planar substrate, a first antenna formed on the planar substrate and coupled to the first port, wherein the first antenna is a phased array antenna comprising a plurality of first radiator elements and a network of first feed lines connecting the first port to each of the plurality of first radiator elements, a second port formed on the planar substrate, and a second antenna formed on the planar substrate and coupled to the first port, wherein the second antenna comprises at least one second radiator element and a second feed line connecting the second port to the at least one second radiator element, wherein the at least one second radiator element and one of the plurality of first radiator elements are configured to form a shared radiator, wherein the shared radiator is configured to provide a flow of energy from the at least one second radiator element to the plurality of first radiator elements, and wherein each of the first and second antennas is configured to operate at a millimeter-wave operating frequency band.

In some examples, the millimeter-wave operating frequency band may include 28 GHz.

In some examples, each of the plurality of first radiator elements and the at least one second radiator element may be an inset-fed patch antenna element.

In some examples, the first plurality of the network of first feed lines may be configured to split power from the first port approximately equally among the plurality of first radiator elements.

In some examples, the flow of energy from the at least one second radiator element may be provided through the network of first feed lines to the plurality of first radiator elements according to a decreasing intensity for each element that is farther from the shared radiating element.

In some examples, the apparatus may be configured to produce a first gain when the second antenna is activated, and to produce a second gain that is lower than the first gain when the first antenna is activated.

In some examples, the first antenna may have a fractional input impedance bandwidth of about 10%, and the second antenna has a fractional input impedance bandwidth of about 9%.

In some examples, the planar substrate may include a first fold extending along a lateral axis of the first antenna, wherein the fold divides the planar substrate between a first portion and a second portion; and a second fold extending along a lateral axis of the second antenna, wherein the fold divides the planar substrate between the first portion and a third portion.

In some examples, the wherein the first portion may include each of the plurality of first radiator elements and the at least one second radiator element.

In some examples, the second portion may include at least part of the network of first feed lines, and wherein the third portion include the second feed line.

In some examples, the first fold and second fold may be configured to conform a shape of the folded substrate to a corner of a device housing.

In some examples, the apparatus may be configured to produce a first gain when the second antenna is activated, and to produce a second gain that is lower than the first gain when the first antenna is activated.

In some examples, the first gain may be about 9 dBi, and the second gain may be about 5 dBi.

In some examples, the apparatus may exhibit at least one of (i) a fractional input impedance bandwidth of about 11% for the first antenna and about 6% for the second antenna; (ii) a front-to-back radiation ratio of 15 dB or greater for the first antenna and 10 dB or greater for the second antenna within the operating frequency band; or (iii) a beamwidth of about 20° for the first antenna and about 50° for the second antenna.

In some examples, the apparatus may be conformed to an interior corner of a mobile device housing. The first portion of the apparatus may be planar with a side edge of the device housing, and the side edge of the device housing may have an interior height of between 4.4-6.6 mm. The shared radiator may be configured to direct radiation in a direction away from a user of the mobile device when the mobile device is held in a landscape orientation or portrait orientation depending on the application at hand.

Yet another aspect of the disclosure is directed to an apparatus including an electrical ground, a first planar substrate, a first port formed on a first end of the first planar substrate and connected to the electrical ground, a first antenna formed on the first planar substrate and coupled to the first port, wherein the first antenna is configured to radiate in a first direction, a second port formed on a second end of the first planar substrate opposite the first end and connected to the electrical ground, and a second antenna formed on the first planar substrate and coupled to the second port, wherein the second antenna is configured to radiate in a second direction different from the first direction, wherein a gap between the first and second antennas is between 0.5 mm and an operating wavelength of the apparatus.

In some examples, mutual coupling between the first and second antennas may be 20 dB or less.

In some examples, the apparatus may be configured to produce a first gain when the first antenna is activated, and to produce a second gain that is lower than the first gain when the second antenna is activated. For instance, the first gain may be about 6 dBi, and the second gain may be about 3 dBi.

In some examples, the apparatus may exhibit at least one of: (i) a 10-dB fractional bandwidth between about 3-6% for each respective operating frequency band of each of the first and second antennas, and wherein each respective operating frequency band includes 28 GHz; (ii) a front-to-back radiation ratio of 6 dB or greater for the first antenna and 14 dB or greater for the second antenna within each antenna's respective operating frequency band; or (iii) a beamwidth of about 110° for the first antenna and about 80° for the second antenna within each antenna's respective operating frequency band.

In some examples, the apparatus may further include a third antenna formed on a second planar substrate, wherein the first and second planar substrates are parallel and stacked in a direction orthogonal to a plane of each of the first and second substrates, and wherein the first and second substrates are separated by a gap between about one-fiftieth and one-eighth of an operating wavelength of the apparatus.

In some examples, mutual coupling between the first and third antennas may be 20 dB or less, and wherein mutual coupling between the second and third antennas may be 20 dB or less.

In some examples, the third antenna may be an angled dipole radiator.

In some examples, an arm of the angled dipole radiator may be positioned at an acute angle relative to a feed line of the third antenna.

In some examples, the arm may have a length of about 2 mm, and the second substrate may have a width of between 4-6 mm.

In some examples, the third antenna may exhibit at least one of: (i) a fractional bandwidth of about 12% over a range of frequencies including 28 GHz; (ii) a forward gain of about 3 dBi; or (iii) a front-to-back radiation ratio of 4.5 dB.

In some examples, a width of the apparatus may be between 4-7 mm.

In some examples, a height of the apparatus may be about 1.25 mm, and mutual coupling between any two antennas of the first, second or third antennas may be 20 dB or less.

In some examples, the apparatus may be conformed to an interior surface of a mobile device housing.

In some examples, the apparatus may be co-planar with a side edge of the device housing, and the side edge of the device housing may have an interior height of between 6-7 mm.

Another aspect of the present disclosure is directed to a mobile device including a housing and an apparatus according to any of the embodiments described herein.

DETAILED DESCRIPTION

Figure 1:
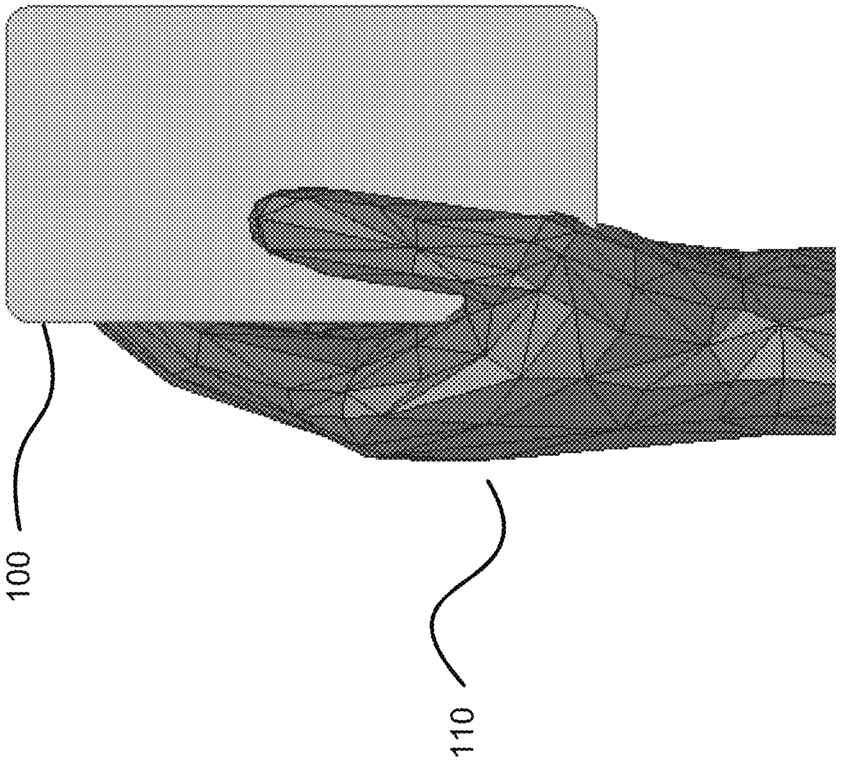
FIGS. 1 and 2 are perspective views of a conventional handheld device.
Figure 2:
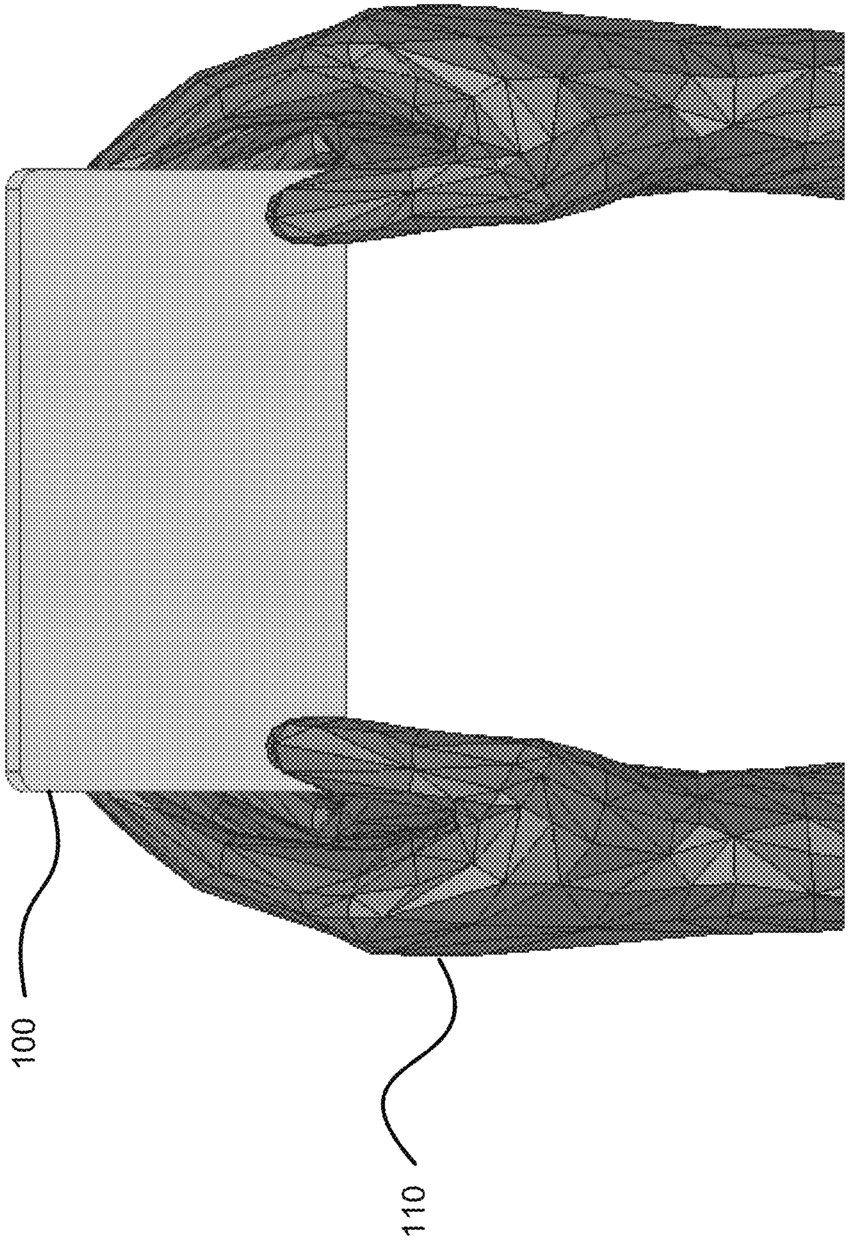
Figure 3B:
FIG. 3*b* is a schematic diagram of a conventional phased array including four copies of the patch antenna of FIG. 3*a*.
Figure 3A:
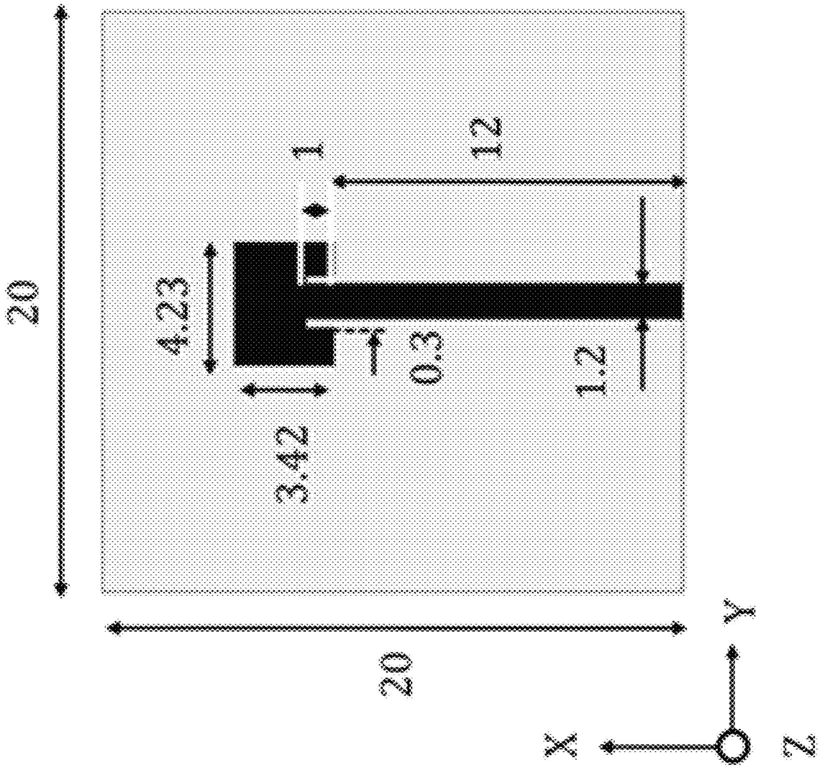
FIG. 3*a* is a schematic diagram of a conventional single-element inset-fed patch antenna.
Figure 4:
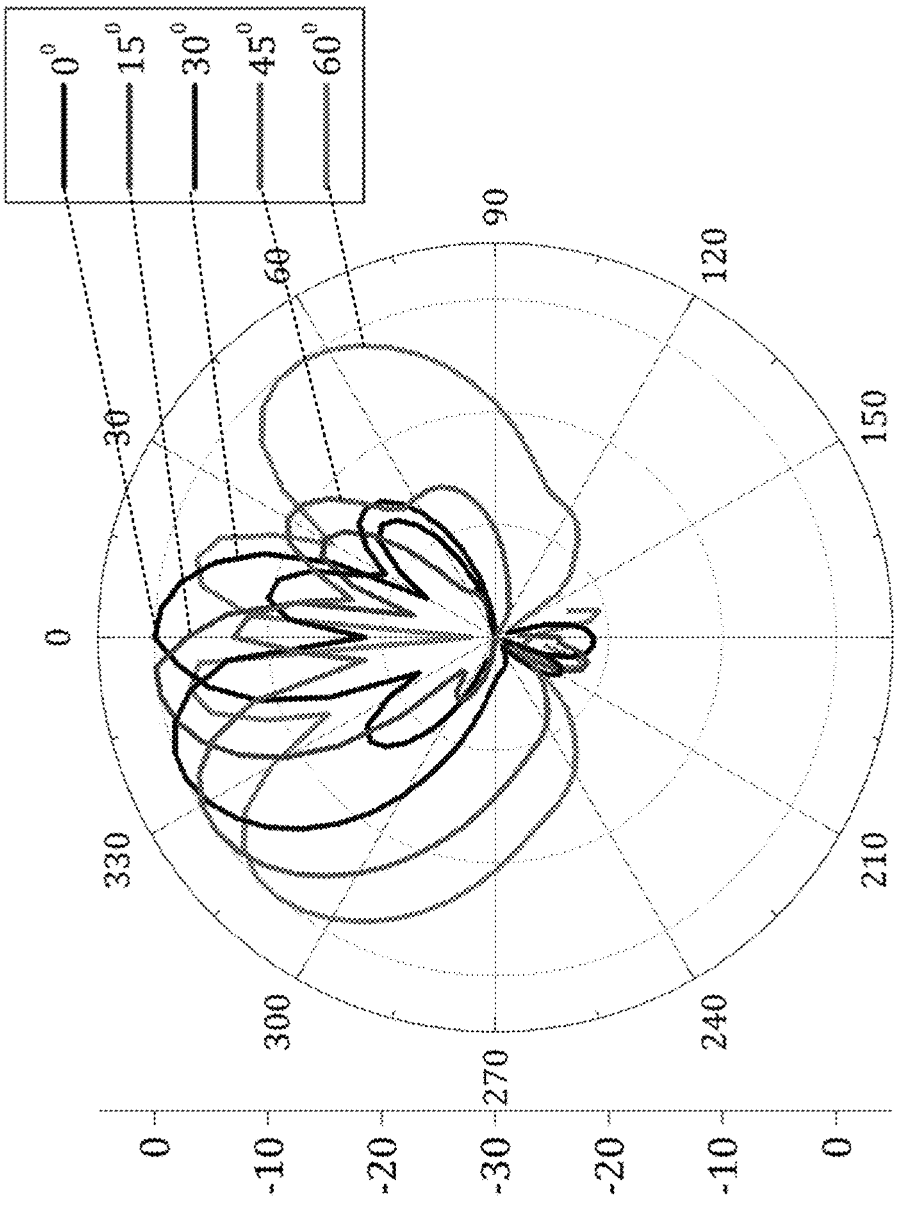
FIG. 4 is a radiation pattern graph of the phased array in FIG. 3*b*.
Figure 5:
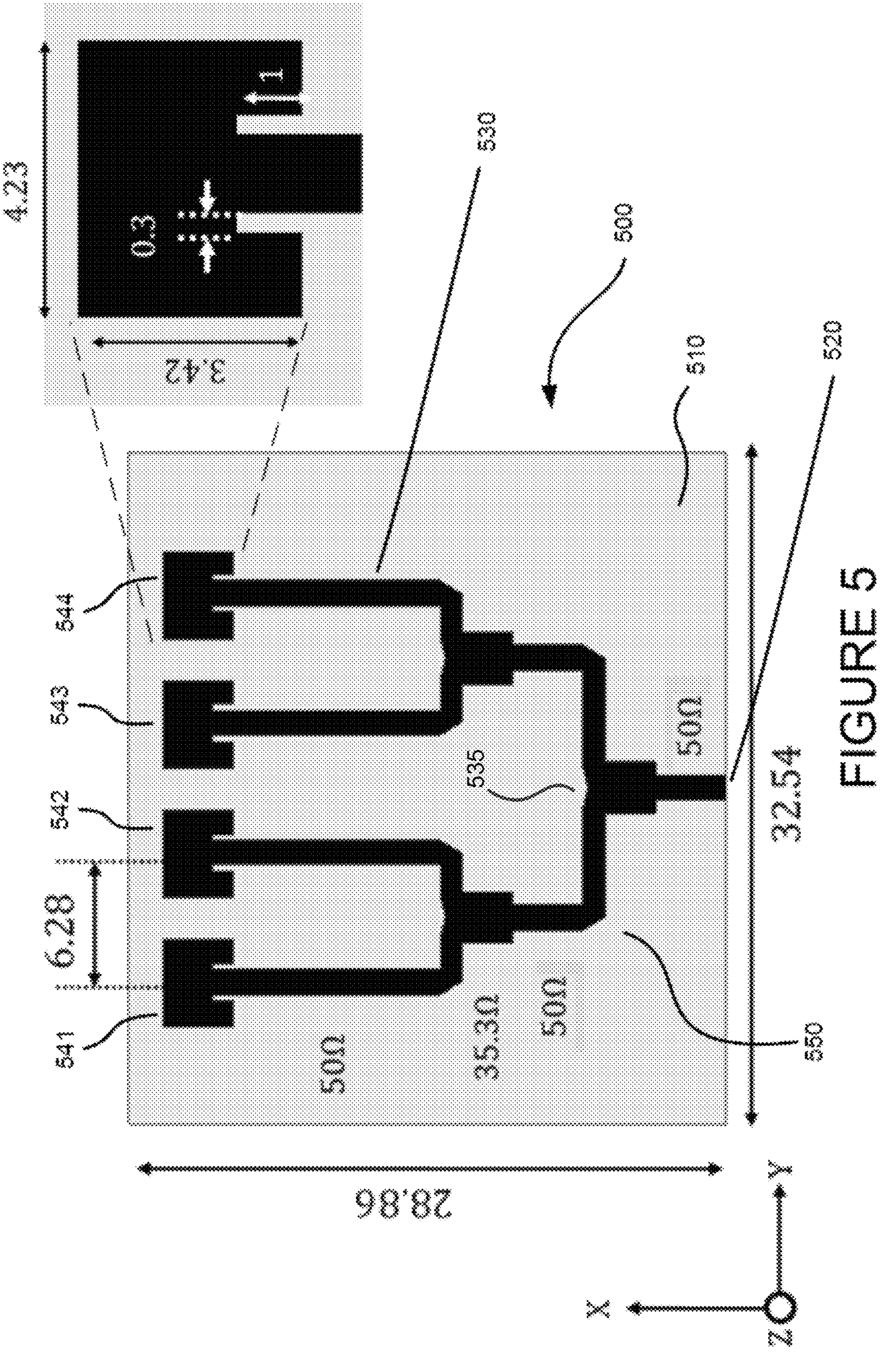
FIG. 5 is a schematic diagram of a planar phased array antenna in accordance with an aspect of the disclosure.

FIG. 5 shows a planar phased array antenna 500 designed to cater to a handheld device held in a portrait orientation. The phased array antennas may be configured to operate at a millimeter-wave frequency band including 28 GHz. The antenna 500 is formed on a substrate 510, such as a Nelco NY9220 substrate. In the example of FIG. 5, the substrate 510 has a thickness of about 0.508 mm, a dielectric constant of 2.2±0.02 and a dielectric loss tangent of about 0.0009. Also, in the example of FIG. 5, the antenna is about 32.54 mm wide and about 28.86 mm long.

The antenna 500 includes a feed port 520 at one end of the substrate 510. A feed line 530 extends in a direction from the feed port 520 towards an opposing end of the substrate 510. The feed line 530 may be a standard 50Ω line.

The antenna 500 also includes radiators 541-544 positioned at an opposing end of the feed line 530 from the feed port 520. The feed line 530 may have a distance of about 10 mm or longer placed in order to minimize interference from the electrically large end launch connector.

The number of radiators included in the antenna may be chosen to achieve a desired gain in the boresight. In the example of FIG. 5, four radiators are provided. This has been found to achieve a gain of about 8.5 dBi. Each of the elements 541-544 may also be fed by a respective 50Ω transmission line, whereby the feed line 530 includes multiple lines forming a feed network. The lines may be split at power dividers, and V-shaped notches 535 may be introduced at the power dividers in order to improve impedance matching. In order to design a wideband transition from the feed port 520 line to the radiators 541-544, a corporate feed network with appropriate quarter wave transformers may be provided. FIG. 5 shows one such example feed network 550 for connecting each of the radiators 541-544 to the feeing port 520. The spacing between the radiators may be optimized for maximum gain in the boresight. In the example of FIG. 5, this spacing was found to be about 6.28 mm. Additionally, good isolation between antenna elements could be maintained be increasing impedance at the power dividers, although care should be taken to avoid introducing parasitics into the feed network. In the example of FIG. 5, each radiator is a standard inset-fed patch antenna operating at 28 GHz.

If the antenna 500 of FIG. 5 were integrated onto a handheld device in planar form, the antenna would radiate towards the user since the beam would be directed towards the user. Also, the physical footprint of the antenna 500 would be relatively high and might be unsuitable for compact handheld devices such as smartphones. In order to correct the direction in which the antenna radiates and in order to decrease an overall footprint of the antenna, the antenna may be folded along the Y axis.

Figure 6A:
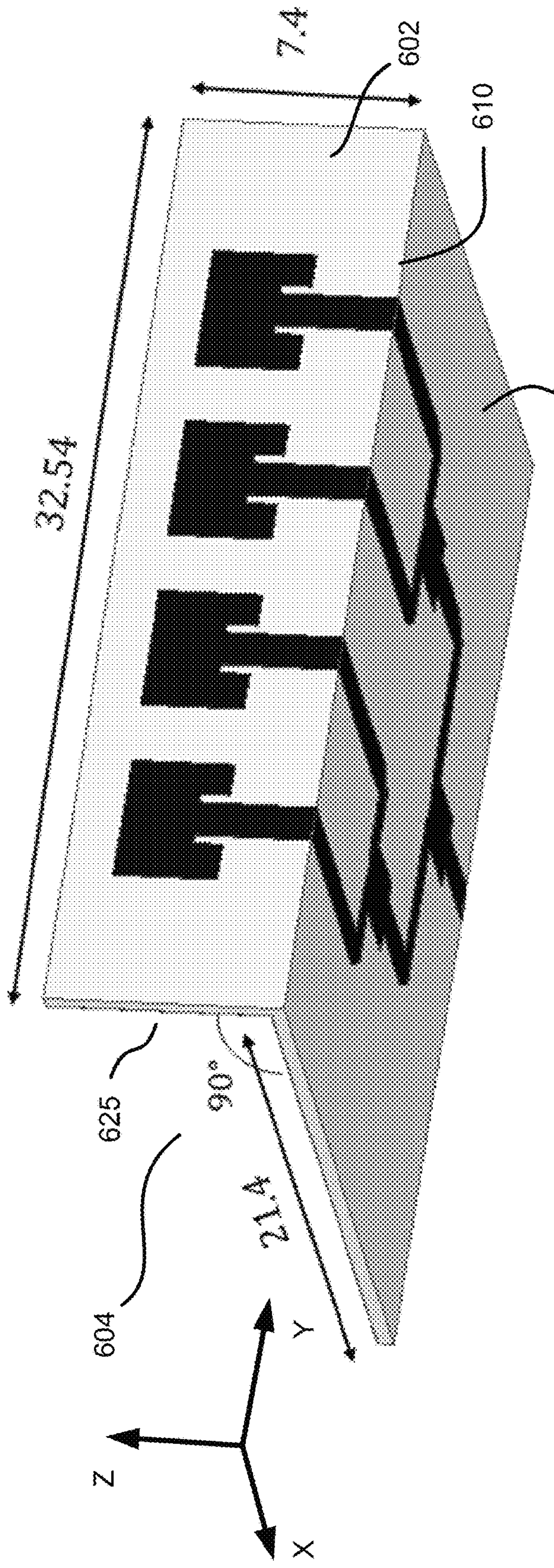
FIG. 6*a* is a schematic diagram of a conformal phased array antenna in accordance with an aspect of the disclosure.

FIG. 6*a* shows the antenna 500 having a fold 610 along the Y axis. In the example of FIG. 6*a*, the fold is a 90-degree fold, such that a first portion 620 of the antenna is orthogonal to a second portion 625. The antenna 500 may be bent such that a front end 602 of the antenna is adapted to engage an inner surface of the handheld device casing. An opposing end of the antenna is show in FIG. 6*a* as a back end 604. A location of the fold 610 may be selected so as to be positioned at a front corner or a back corner of the handheld device into which the antenna is disposed, such as a corner of a smartphone. Additionally, the location of the fold may be between the feed port 520 and the radiators 541-544. The feed port may be positioned in the first portion 620 and the radiators 541-544 within the second portion 625 of the substrate. This would allow for the radiators 541-544 to point upwards in the Z direction and for the radiation to radiate away from the device user and towards the base station.

Figure 6B:
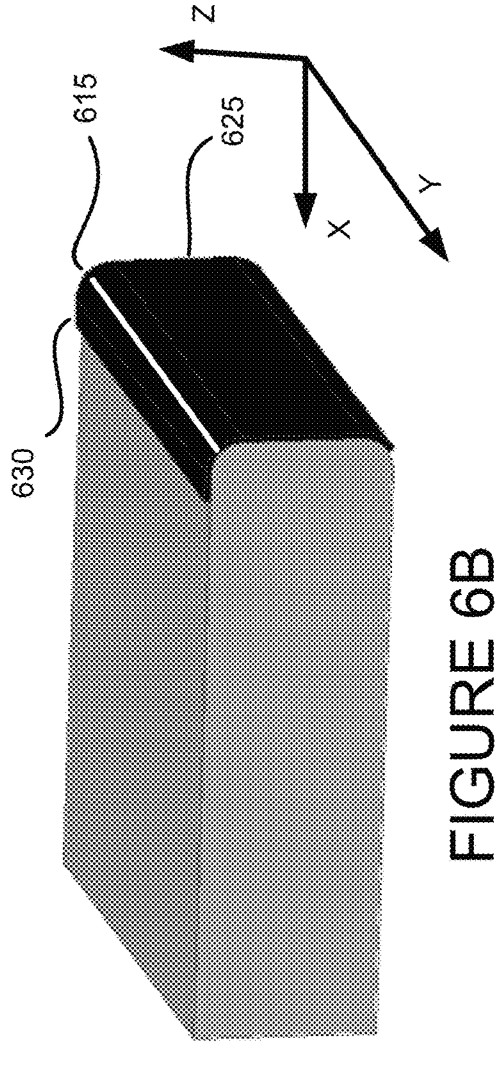
FIG. 6*b* is a perspective view of an example conformal phased array antenna in accordance with an aspect of the disclosure.

In the example of FIG. 6*a*, the height of the folded portion of the antenna 500 in the Z direction is about 7.4 mm. In practice, the overall height of the antenna in the Z-direction may be reduced to about 6 mm when the antenna is wrapped around the mold of the device. The height of the folded portion of the antenna may be reduced from 7.4 mm to 6 mm by adding a second fold in the second portion. In the example of FIG. 6*b*, the antenna 500 includes a second fold 615 along the Y axis. In the example of FIG. 6*b*, the second fold 615 is a 90-degree fold to accommodate a shape of the device casing into which the antenna conforms, and such that a third portion 630 of the antenna is orthogonal to the second portion 625 and parallel to the first portion 620. The 6 mm height is compatible with many currently-available commercial smartphones and other portable 5G-compatible electronics, although the second portion 625 may be adapted to have a different height depending on the dimensions of the device casing into which the antenna is designed to conform.

Figure 7:
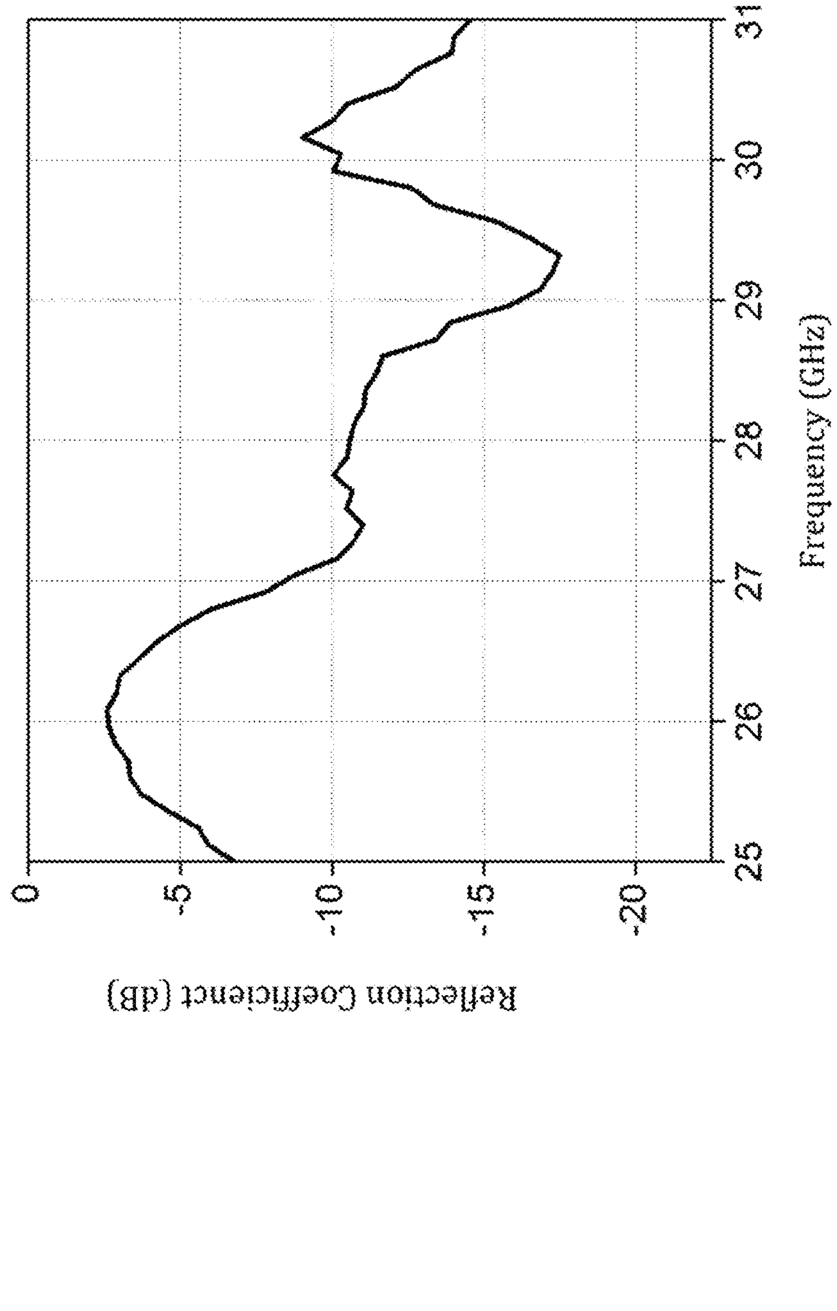
FIG. 7 is a graph illustrating the input reflection coefficient of the conformal phased array antenna of FIG. 6*a*.

FIG. 7 is a graph illustrating the input reflection coefficient of the conformal phased array of FIG. 6*a*. As can be seen from FIG. 7, the input reflection coefficient of the antenna is 10 dB or better for frequencies from 27 GHz to 30 GHz, indicating that a 10.5% fractional input impedance bandwidth is achieved.

Figure 8A:
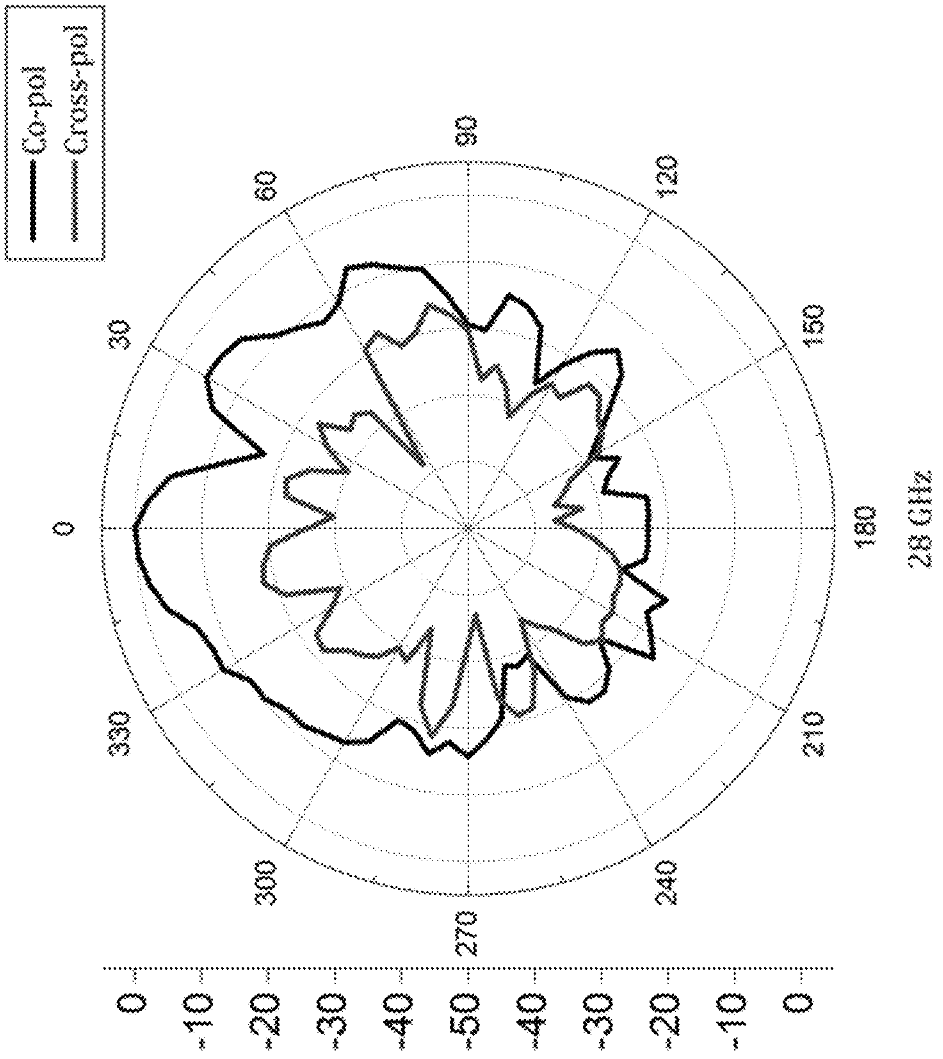
FIGS. 8*a* and 8*b* are radiation pattern graphs illustrating H-plane radiation patterns for the conformal phased array antenna of FIG. 6*a*.
Figure 8B:
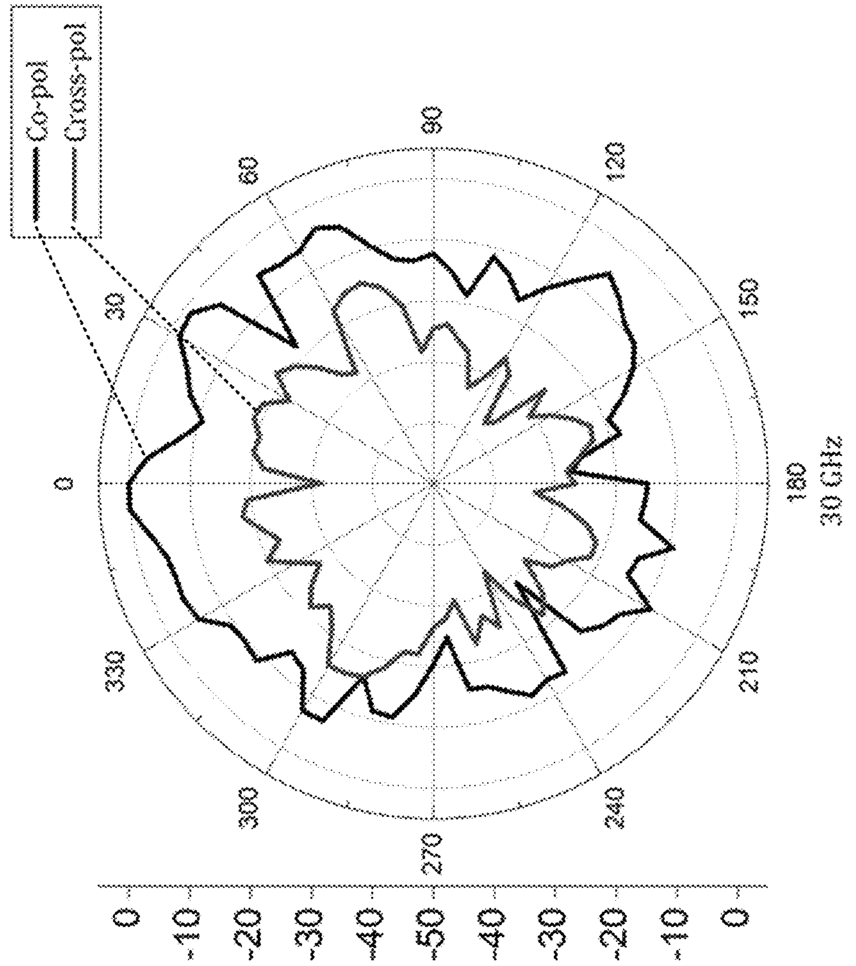
Figure 9A:
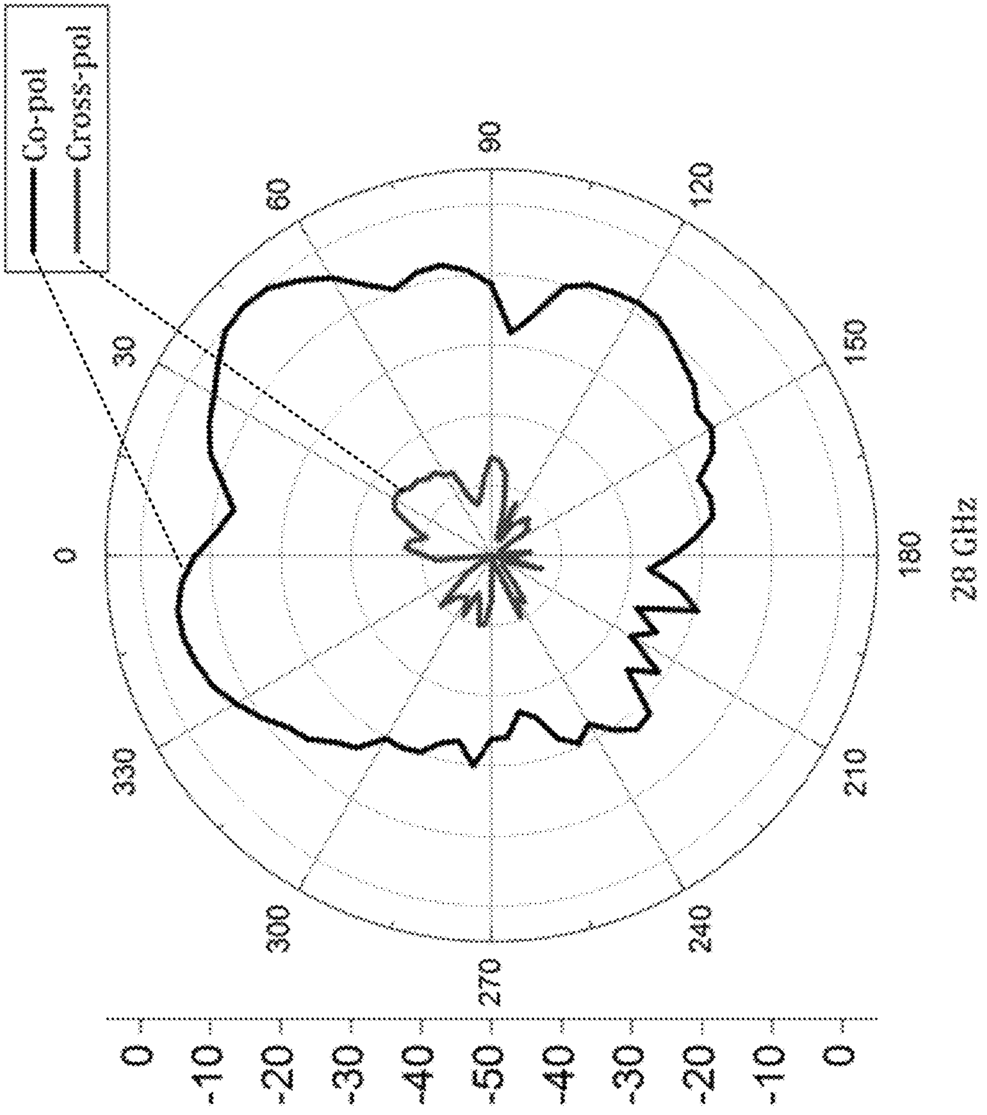
FIGS. 9*a* and 9*b* are radiation pattern graphs illustrating the E-plane radiation patterns for the conformal phased array antenna of FIG. 6*a*.
Figure 9B:
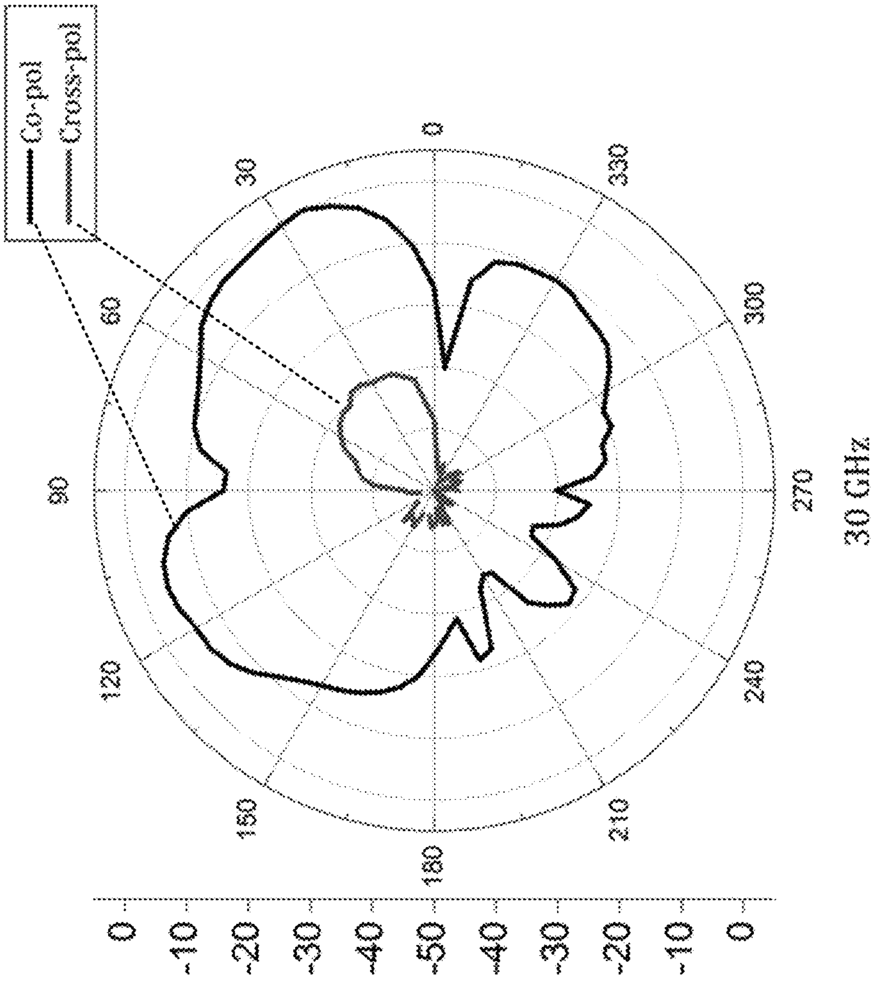

FIGS. 8*a* and 8*b* are radiation pattern graphs illustrating the H-plane radiation patterns (in the YZ plane) for the conformal phased array of FIG. 6*a* operating at 28 GHz and 30 GHz, respectively. FIGS. 9*a* and 9*b* are radiation pattern graphs illustrating the E-plane radiation patterns (in the XZ plane) for the conformal phased array of FIG. 6*a* operating at 28 GHz and 30 GHz, respectively. Because the beamforming is happening in the H-plane, the antenna is designed to exhibit a narrower beamwidth in the H-plane as compared to the E-plane. The front-to-back ratio of radiation between the front side 602 of the antenna (e.g., facing outward from the handheld device) and the back side 604 of the antenna (e.g., facing inward towards the handheld device) is more than 20 dB across the band of operation. This indicates that when the conformal phased array is integrated into a casing of a 5G-compatible handheld device, most radiation is directed away from the user instead of towards the user. Additionally, the cross-polarization level across the spectrum of operation remains below 20 dB in all directions for both H-plane radiation and E-plane radiation. It should be recognized that the E-plane radiation patterns have a wider beamwidth than in the H-plane, due to the phased array being one-dimensional. Distortion in the E-plane radiation patterns is due to both the fold present in the antenna and the electrically long feed network.

Figure 10:
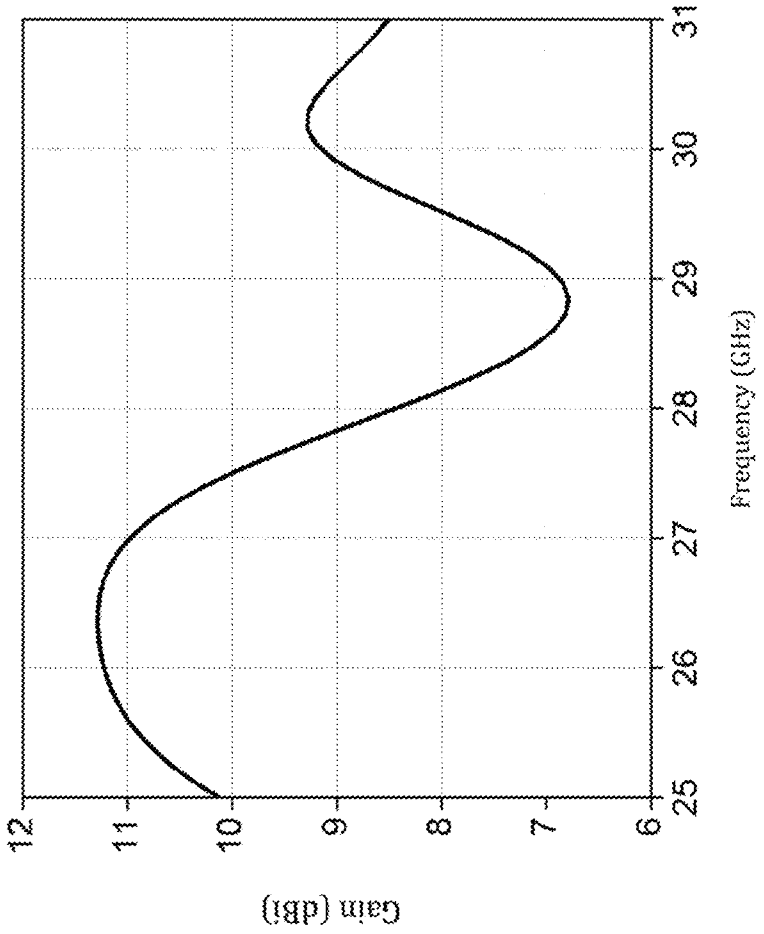
FIG. 10 is a graph illustrating broadside gain of the conformal phased array antenna of FIG. 6*a*.

FIG. 10 is a graph showing broadside gain of the conformal antenna of FIG. 6*a* for a range of transmission/reception frequencies at the 28 GHz frequency band. As can be seen from FIG. 10, the gain is close to 8.5 dBi when operating at 28 GHz. This gain is considered high for the occupied physical footprint, and is made possible due to the use of a conformal antenna.

In order to provide a similar level of operation while a user is holding the device in landscape mode, signals emitted from the conformal phased array antenna must radiate orthogonally with respect to the beam radiated from the antenna of FIG. 6*a*. This may be accomplished by providing a second antenna element to the conformal antenna. However, for the second antenna element to cater to operating a handheld device that is 90 degrees rotated, the second antenna's feed line and the beam radiated from the second antenna should be rotated 90 degrees relative to one another such that they are orthogonal to one another.

Figure 11:
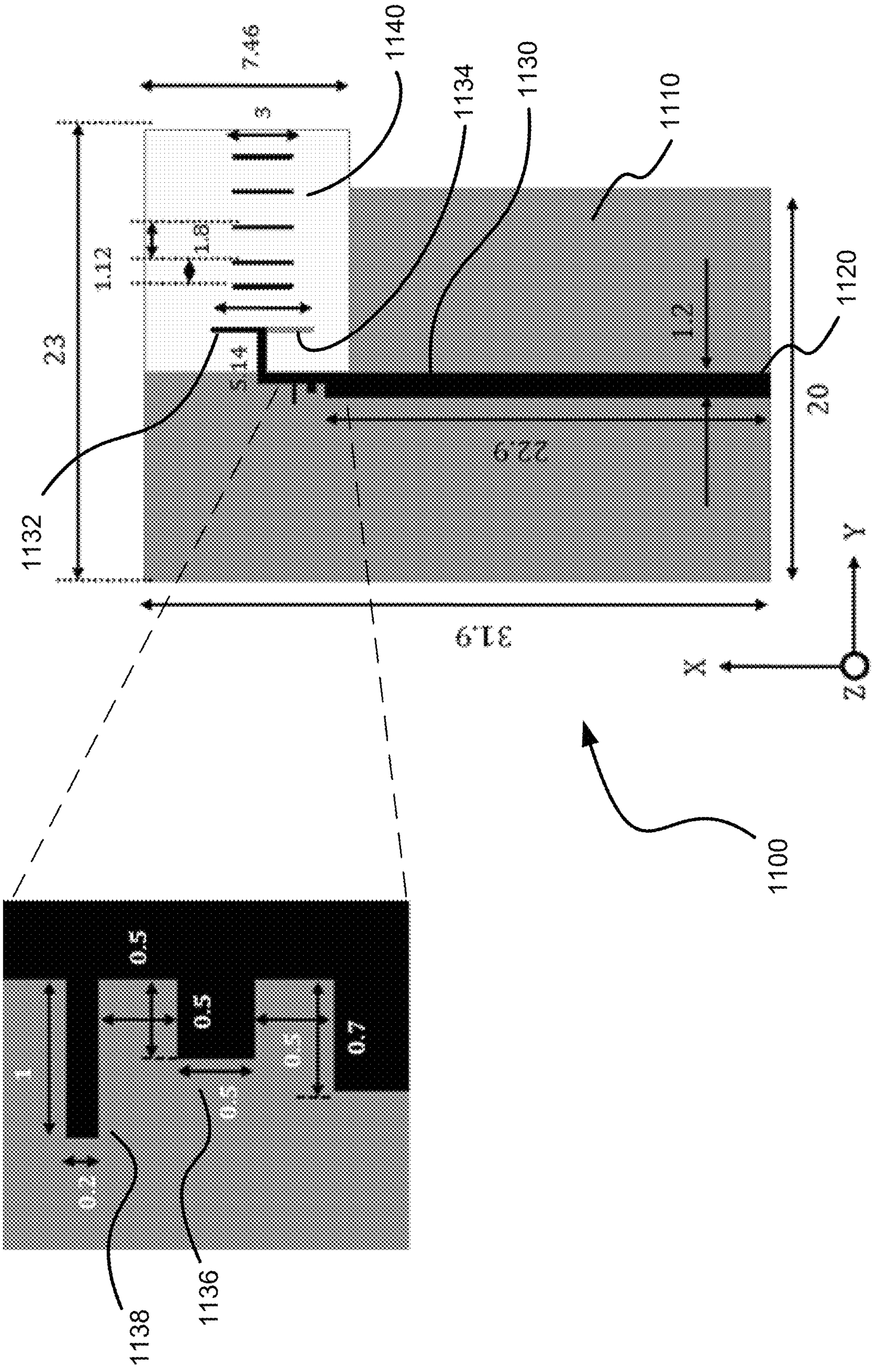
FIG. 11 is a schematic diagram of a wideband antenna in accordance with an aspect of the disclosure.

FIG. 11 shows a schematic of a wideband antenna 1100 that meets the above requirements of a second antenna element. In some examples, the wideband antenna may be provided as a standalone antenna, separate from the phased array antenna described above. In other examples, the wideband antenna may be provided as a second antenna that complements the phased array antenna described above. In the example of FIG. 11, the wideband antenna 1100 is about 20 mm wide in order to accommodate connection of an end-launch connector (not shown), and about 31.9 mm long. However, other dimensions may be used depending on the specific application.

In the example of FIG. 11, a feed port 1120 is provided at one end of the substrate 1110, and a feed line 1130 extends from the end of the substrate having the feed port 1120 and in a direction along the X axis towards an opposing end of the substrate 1110. In the example of FIG. 11, the feed line 1130 has a length of about 22.9 mm, and is about 1.2 mm wide along the Y axis. The feed line 1130 feeds two dipole arms 1132, 1134. The dipole arms 1132, 1134 are perpendicular with respect to the feed line 1130, extending longitudinally along the Y axis. The feed line 1130 is further connected to stubs 1136, 1138 that extend longitudinally from the feed line 1100 along the Y axis. The stubs 1136, 1138 are shown in greater detail in the inset of FIG. 11, including example dimensions for the arrangement of the example wideband antenna of FIG. 11. The stubs 1136, 1138 are provided in order to achieve a wider impedance bandwidth, as compared to if no stubs were provided. The wideband antenna 1100 further includes parasitic radiators 1140 positioned so as to aid in gain enhancement of the wideband antenna 1100. An example positioning of the parasitic radiators 1140 is shown in FIG. 11. The stubs also ensure that the radiation is along the Y-axis direction. It should be understood that alternative arrangements of stubs and parasitic radiators may be possible depending on the specific characteristics of a given antenna, and are not limited to the values and dimensions show in the example of FIG. 11.

Figure 12:
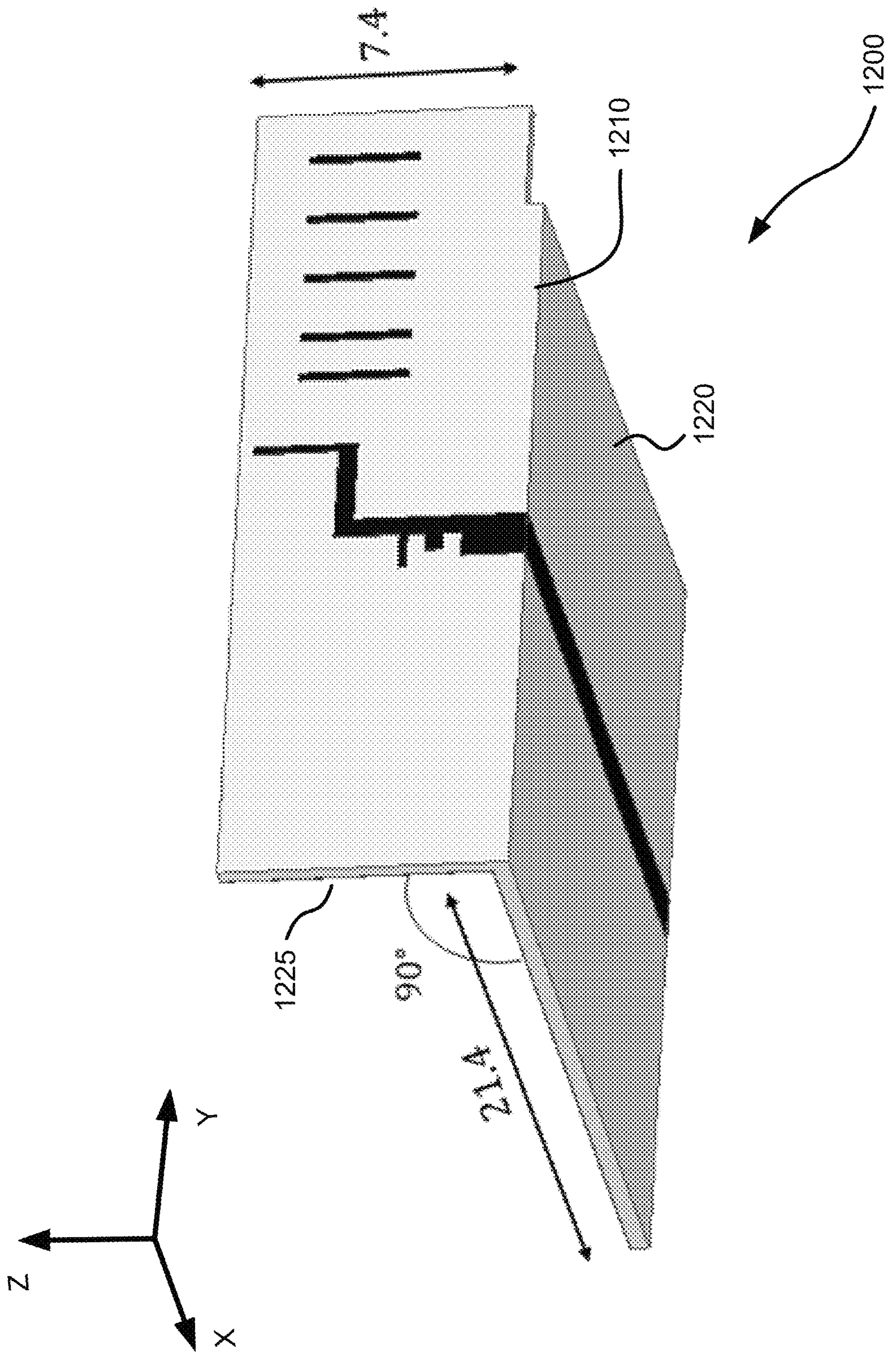
FIG. 12 is a schematic diagram of a conformal wideband antenna in accordance with an aspect of the disclosure.

Like the phased array antenna of FIGS. 6 and 7, the wideband antenna 1100 may be folded to yield a conformal design. FIG. 12 shows an example conformal antenna 1200 produced by folding the wideband antenna 1100 of FIG. 11. The conformal antenna 1200 includes a fold 1210 extending along the Y axis of the conformal antenna 1200, such that the fold 1210 intersects with the feed line 1110 at a point lower than the dipole arms 1132, 1134 along the X direction. Stated another way, the fold 1210 may divide the substrate 1110 of the wideband antenna 1100 into a first portion 1220 and a second portion 1225, whereby the feed port 1120 is located in the first portion 1220 and the dipole arms 1132, 1134, the stubs 1136, 1138 and the parasitic radiators are all located in the second portion 1225.

Figure 13:
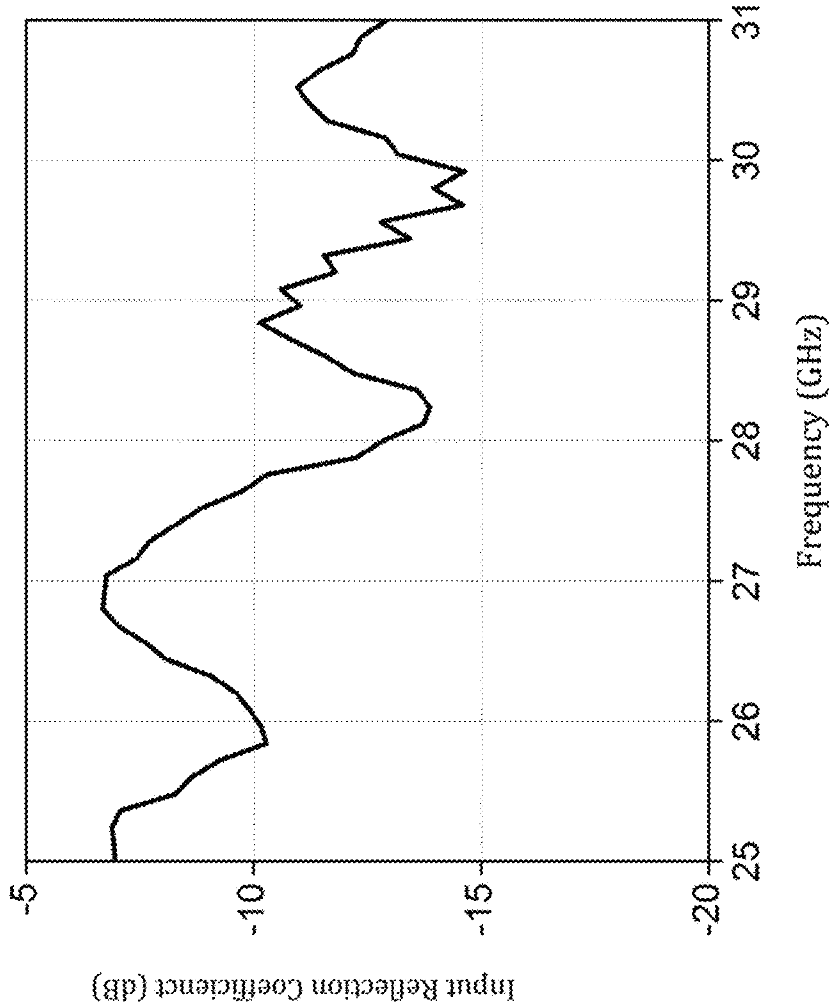
FIG. 13 is a graph illustrating the input reflection coefficient of the conformal wideband antenna of FIG. 12.

FIG. 13 is a graph illustrating the input reflection coefficient of the conformal wideband antenna of FIG. 12. As can be seen from FIG. 13, the input reflection coefficient is about 7 dB or better for frequencies from about 27 GHz to 31 GHz, indicating that a 13.8% fractional input impedance bandwidth is achieved.

Figure 14A:
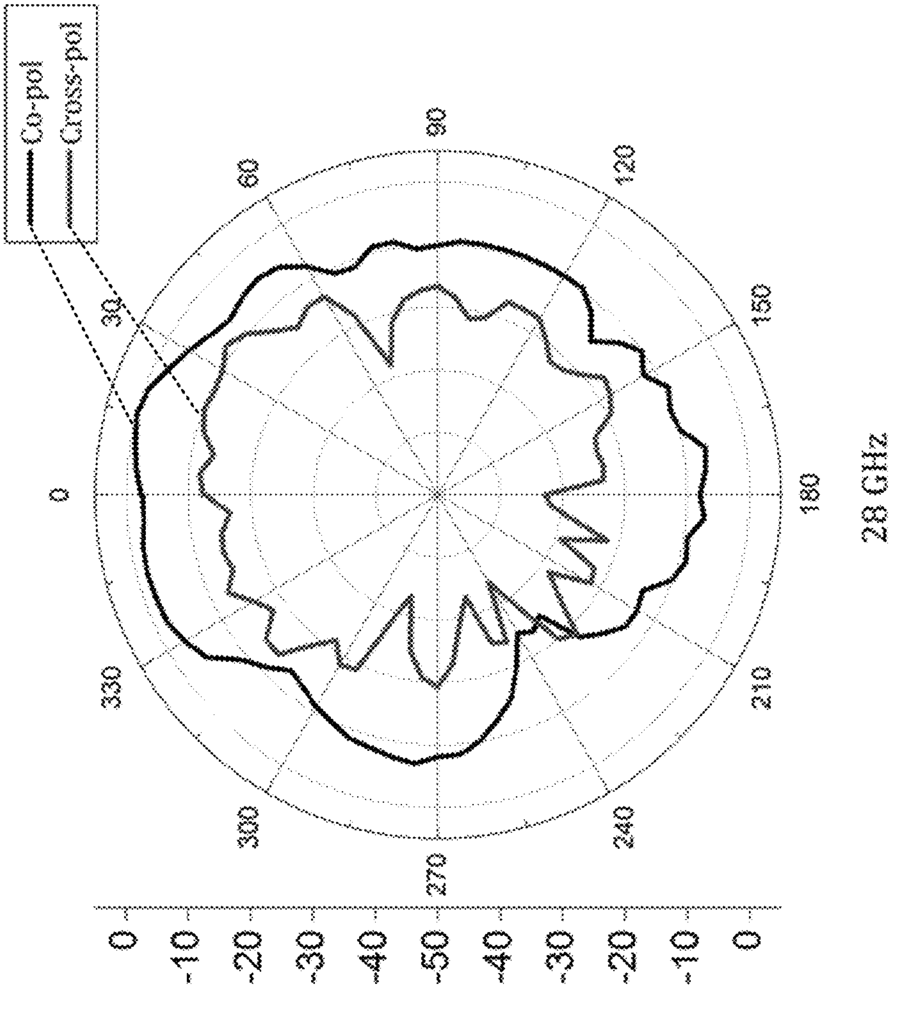
FIGS. 14*a* and 14*b* are radiation pattern graphs illustrating the H-plane radiation patterns of the conformal wideband antenna of FIG. 12.
Figure 14B:
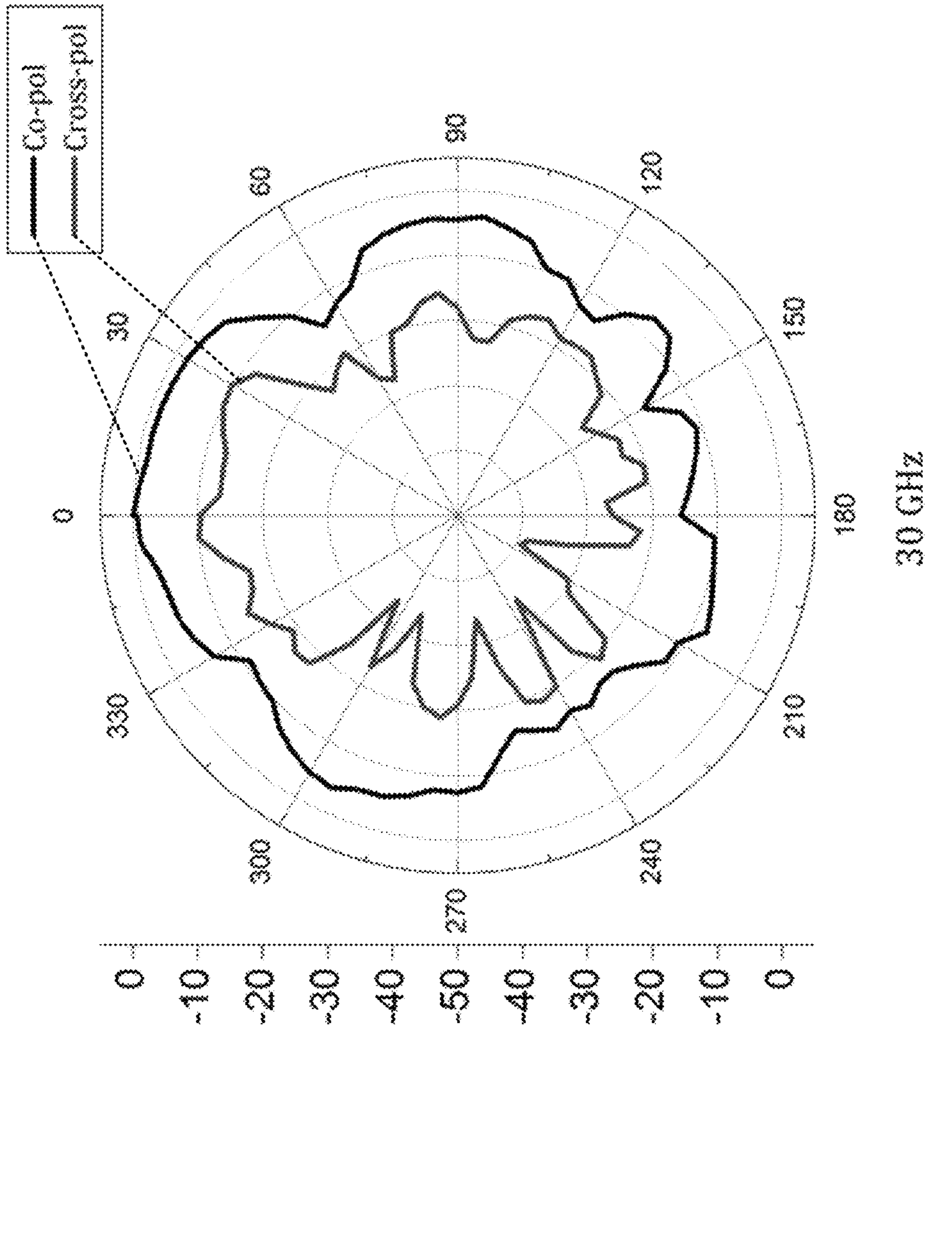
Figure 15A:
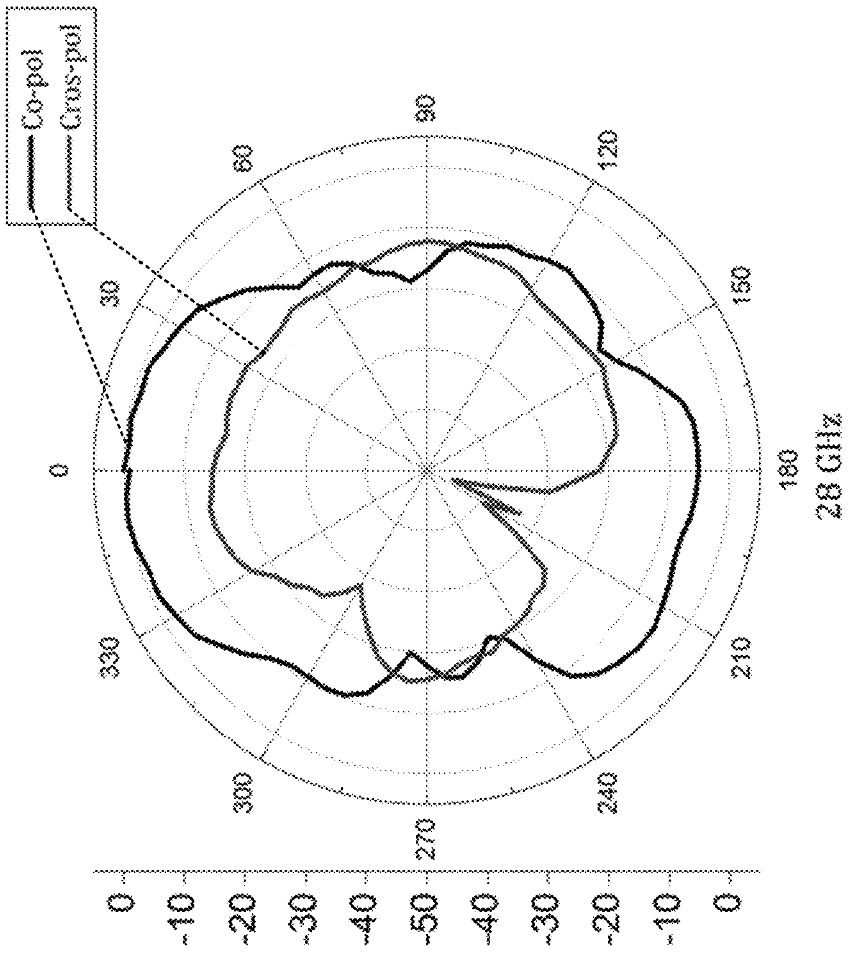
FIGS. 15*a* and 15*b* are radiation pattern graphs illustrating the E-plane radiation patterns of the conformal wideband antenna of FIG. 12.
Figure 15B:
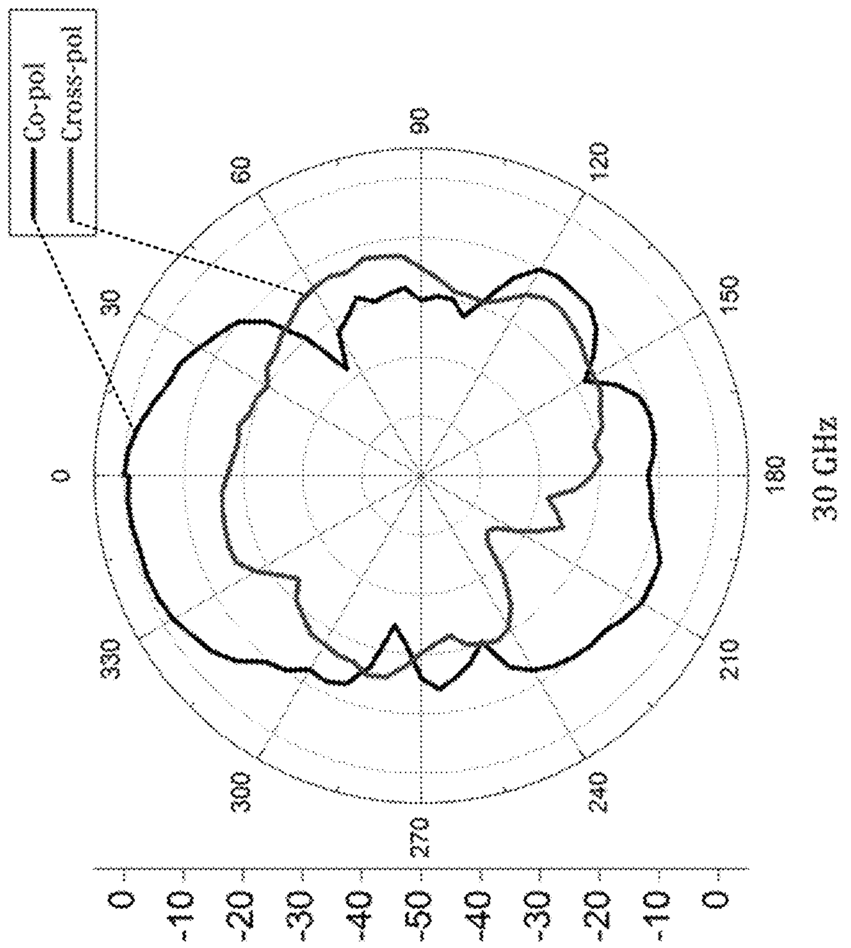

FIGS. 14*a* and 14*b* are radiation pattern graphs illustrating the H-plane radiation patterns (in the YZ plane) for the conformal wideband antenna of FIG. 12 operating at 28 GHz and 30 GHz, respectively. FIGS. 15*a* and 15*b* are radiation pattern graphs illustrating the E-plane radiation patterns (in the XZ plane) for the conformal wideband antenna of FIG. 12 operating at 28 GHz and 30 GHz, respectively. The front-to-back ratio of radiation is more than 10 dB across the band of operation, which indicates that when the conformal wideband antenna is integrated onto the device platform, most radiation is directed away from the user instead of towards the user. Additionally, the cross-polarization level across the spectrum of operation remains below 10 dB in all directions for both H-plane radiation and E-plane radiation.

Figure 16:
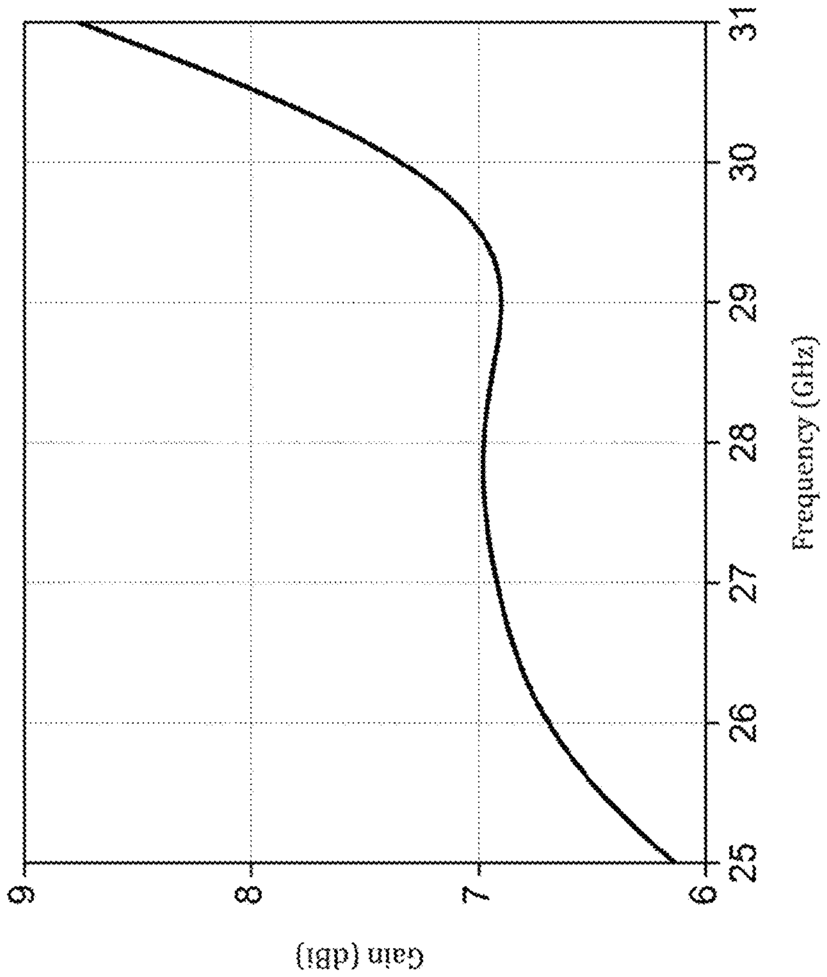
FIG. 16 is a graph illustrating forward gain of the conformal wideband antenna of FIG. 12.

FIG. 16 is a graph showing forward gain of the conformal wideband antenna of FIG. 12 for a range of transmission/reception frequencies. As can be seen from FIG. 16, the gain is about 7 dBi when operating at 28 GHz. This gain is considered high for the occupied physical footprint, and is made possible due to the presence of the fold 1210.

Figure 17:
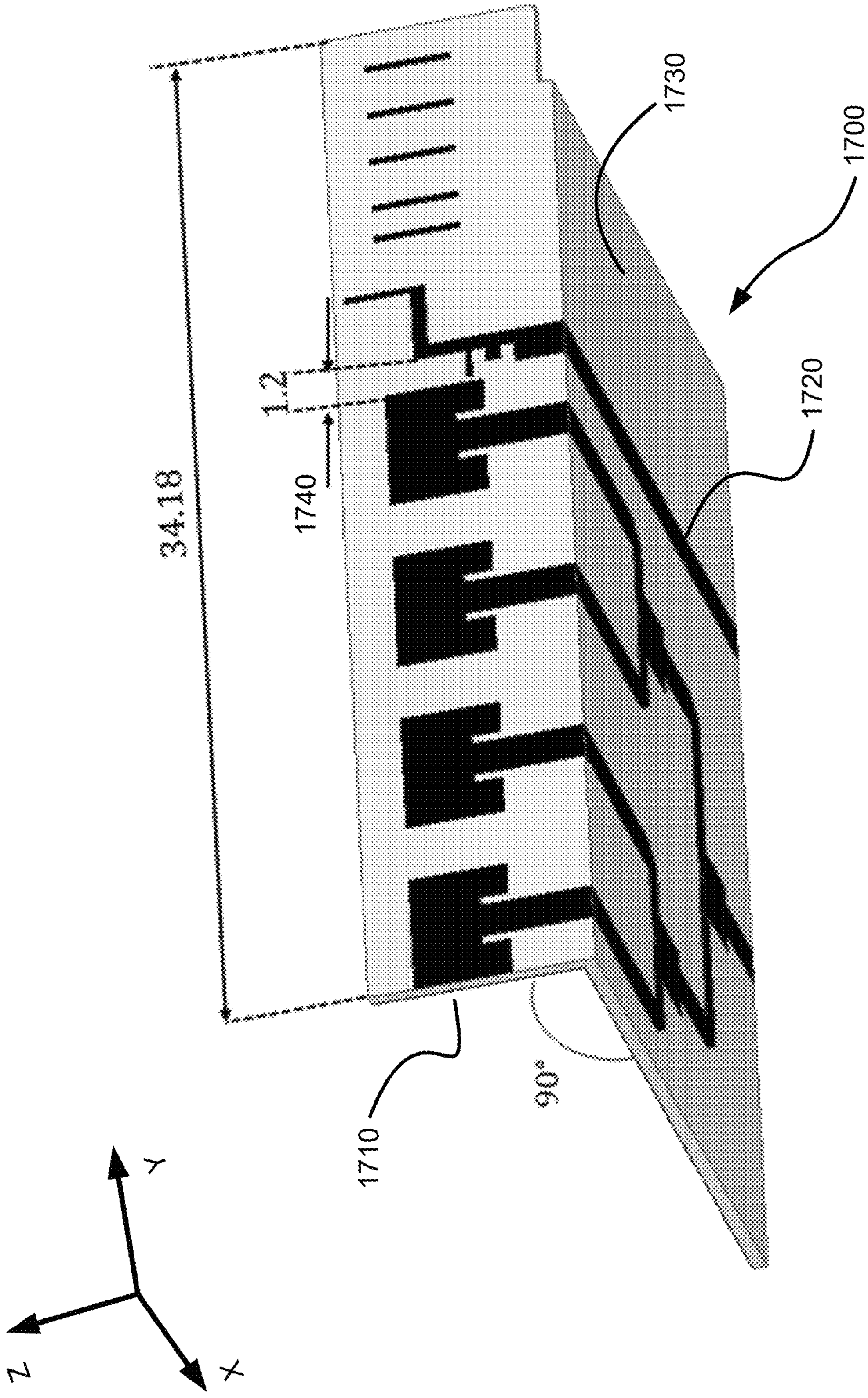
FIG. 17 is a schematic diagram of an integrated conformal antenna in accordance with an aspect of the disclosure.

Each of the above-proposed first phased array antenna and second wideband antenna may be integrated into a single module. FIG. 17 shows an integrated conformal antenna 1700 including each of a conformal phased array antenna 1710 comparable to the example antenna of FIG. 6*a* and a conformal wideband antenna 1720 comparable to the antenna of FIG. 12. The antennas 1710, 1720 are integrated in a common dielectric 1730. A spacing 1740 is provided between the respective radiators of the two antenna elements 1710, 1720. In the example of FIG. 17, the spacing is on the order of 1 mm, and more particularly about 1.2 mm.

The integrated conformal antenna (also referred to herein as an "integrated orthogonal pattern diversity module") is designed to cater to operation of a 5G-compatible handheld device in both landscape and portrait orientations. Additionally, the fold provided in the integrated antenna reduces the physical footprint of the antenna, while also reducing radiation directed towards the user in both of the operation orientations.

Figure 18:
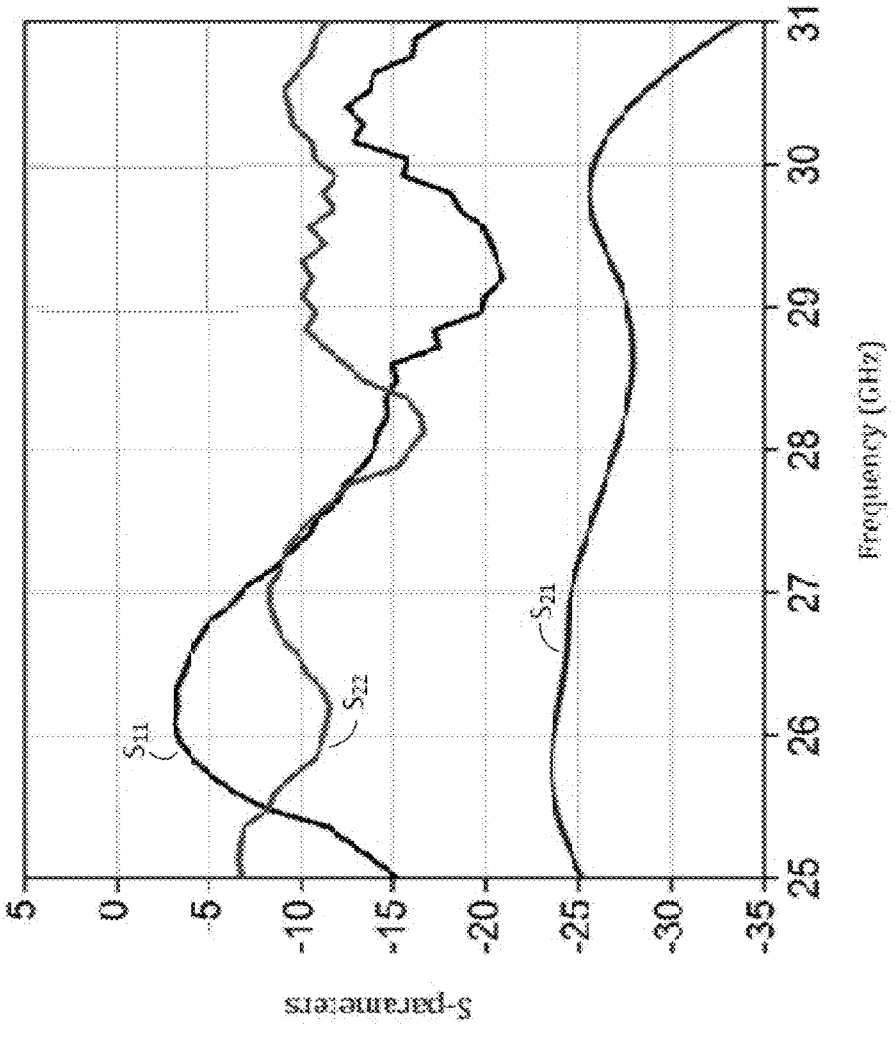
FIG. 18 is a graph illustrating S-parameters of the integrated conformal antenna of FIG. 17.

FIG. 18 is a graph showing S-parameters of the integrated orthogonal pattern diversity module of FIG. 17. Reflection coefficients (S11, S22) for the module are about −10 dB or better when operating in the 28 GHz frequency band, or more particularly between 28 and 31 GHz. Insertion loss (S21) for the module is about −25 dB or better across the same operating band. This demonstrates that the input reflection coefficients of the respective ports for the phased array antenna and the wideband antenna remain intact despite being spaced close to one another. The mutual coupling is less than 20 dB across the operating band.

Figure 19:
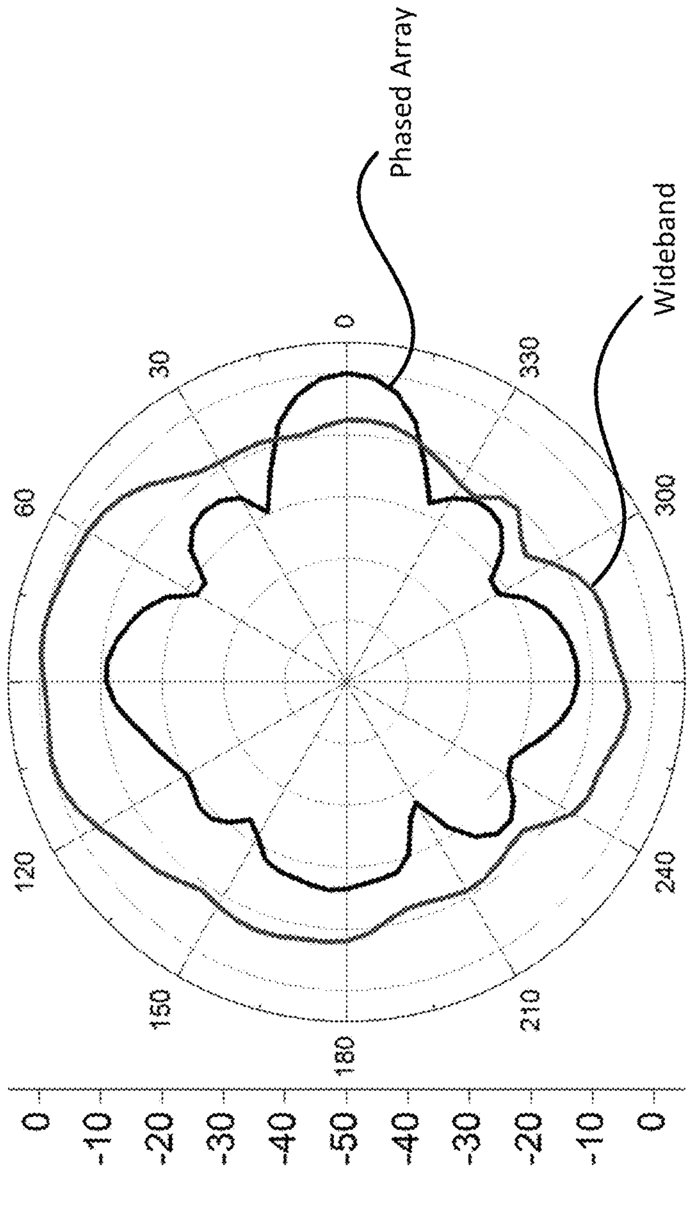
FIG. 19 is a radiation pattern graph illustrating the radiation patterns of the integrated conformal antenna of FIG. 17.

FIG. 19 is a radiation pattern graph illustrating the radiation patterns for the respective antennas 1710, 1720 of FIG. 17 operating at 28 GHz.

Figure 20:
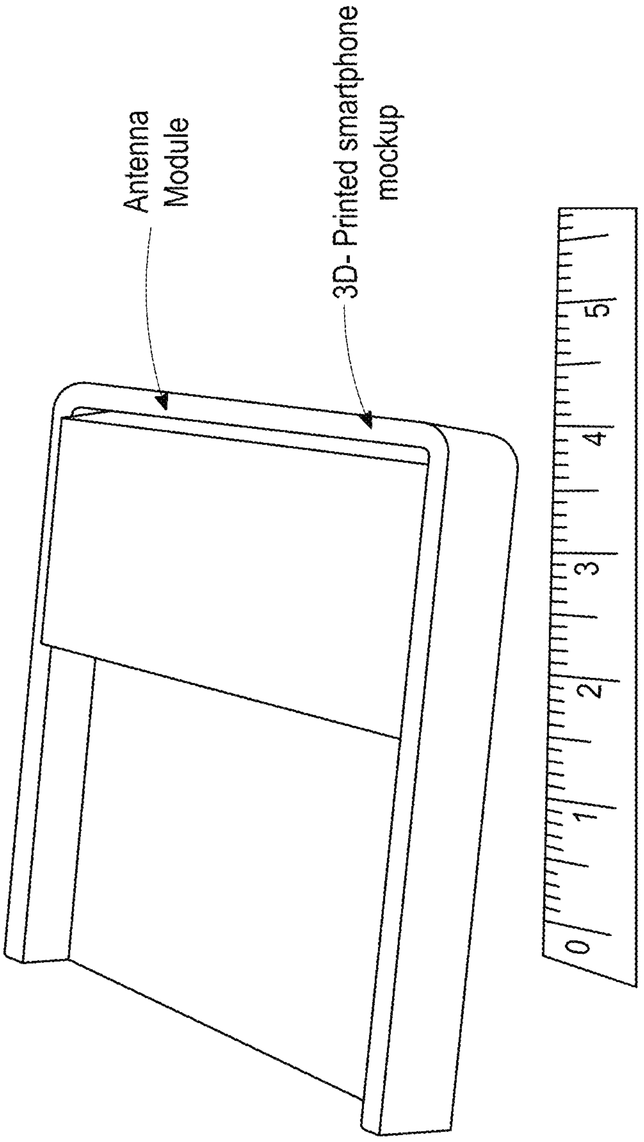
FIG. 20 is a photograph of a prototype of the integrated conformal antenna of FIG. 17.

FIG. 20 is a photograph of a prototype of the integrated antenna module of FIG. 17. The prototype is integrated using a 3D-printed casing. This demonstrates how the integrated antenna module may be integrated with the casing of a commercial 5G-compatible handheld device such as a smartphone.

In the above examples, the integrated conformal antenna includes two antennas connected to respective ports: a first phased array antenna connected to a first port and a second wideband antenna connected to a second port. However, in other examples, the integrated conformal antenna may be adapted to include additional antennas connected to additional corresponding ports. Adding more antennas can be used to provide further improvements to the handheld device, such as orthogonal pattern diversity, dual-polarization and gain switchability.

Figure 21:
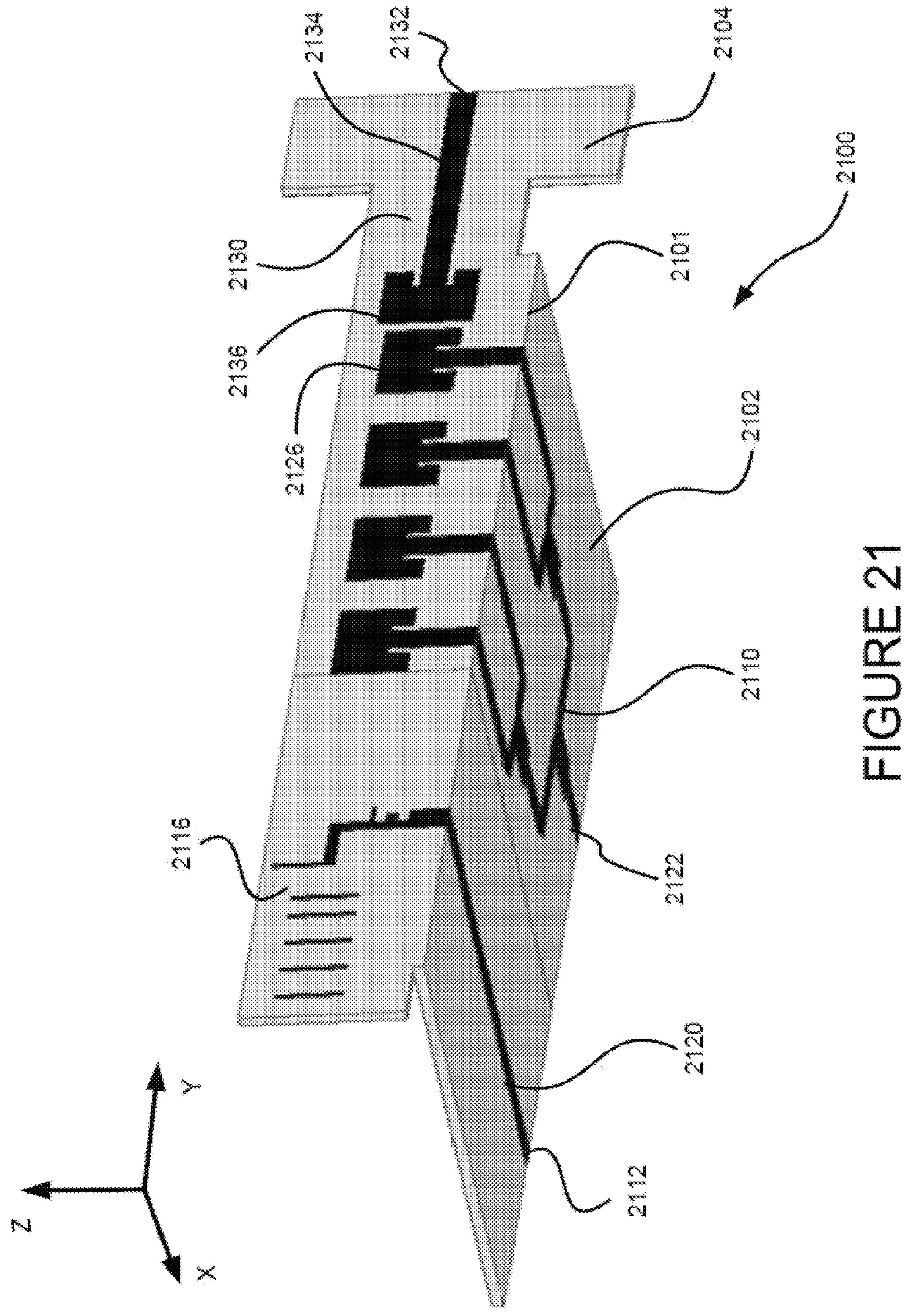
FIG. 21 is a schematic diagram of another integrated conformal antenna in accordance with an aspect of the disclosure.

For example, FIG. 21 is a schematic of an integrated conformal antenna 2100 having three antenna elements, each with a respective port, and a fold 2101. The first antenna element, a phased array antenna 2110, and a second antenna element, a wideband antenna 2120, are comparable to the antennas of the integrated antenna module of FIG. 17, and extend from a port at a first portion 2102 formed by the fold 2101 to one or more radiators at the second portion 2104 formed by the fold 2101. The first portion 2102 may occupy the XY plane, and the second portion 2104 the YZ plane. A third antenna element, a patch antenna 2130, is positioned on the second portion 2104 of the integrated conformal antenna. The third antenna element 2130 is positioned in proximity electrically to the second antenna element 2120 in order to maintain a low mutual coupling and to support radiation for the third antenna element 2130. In the example of FIG. 21, the distance between the second and third antenna elements 2120, 2130 is about 0.5 mm.

A feed line 2134 of the third antenna element extends from a port 2132 on a side edge of the second portion 2104 and along the Y axis, which is perpendicular to the direction in the second antenna element extends in the second portion (that is, along the Z axis), As such, the radiator 2136 of the third antenna element 2130 is rotated 90 degrees from an orientation of the radiators 2126 of the second antenna element 2120. The 90-degree rotational difference between the second antenna radiator 2126 and the third antenna radiator 2136 ensures orthogonal polarization between the second and third ports 2122, 2132 to maintain a dual-polarized antenna.

The arrangement of the antenna elements 2110, 2120, 2130 in FIG. 21 also supports controlling switching between high gain and low gain elements of the integrated conformal antennas. For instance, low gain antenna elements, such as the third antenna element, may be excited during an initial scanning process or during a broadcast application. After detecting an appropriate signal from a base station or access point, high gain antenna element, such as the first or second antenna elements, may be excited to maintain the signal. Gain switchability may also be advantageous for performing dynamic beamforming. For instance, dynamic beamforming may be performed using the low gain elements, and afterwards, operation may switch to the high gain elements.

It is generally necessary to prevent exposure of the example integrated antennas to external environments, since copper metallization of the antenna elements are vulnerable to deterioration, which in turn could deteriorate the radiation characteristics of the corresponding elements of the module. As such, when integrating any of the above example antenna elements into a device such as a mobile terminal, it is necessary to provide shielding from external elements. One shielding solution is a radome. However, care must be taken that the characteristics of the individual antenna elements do not detune when integrated with the radome.

Figure 22:
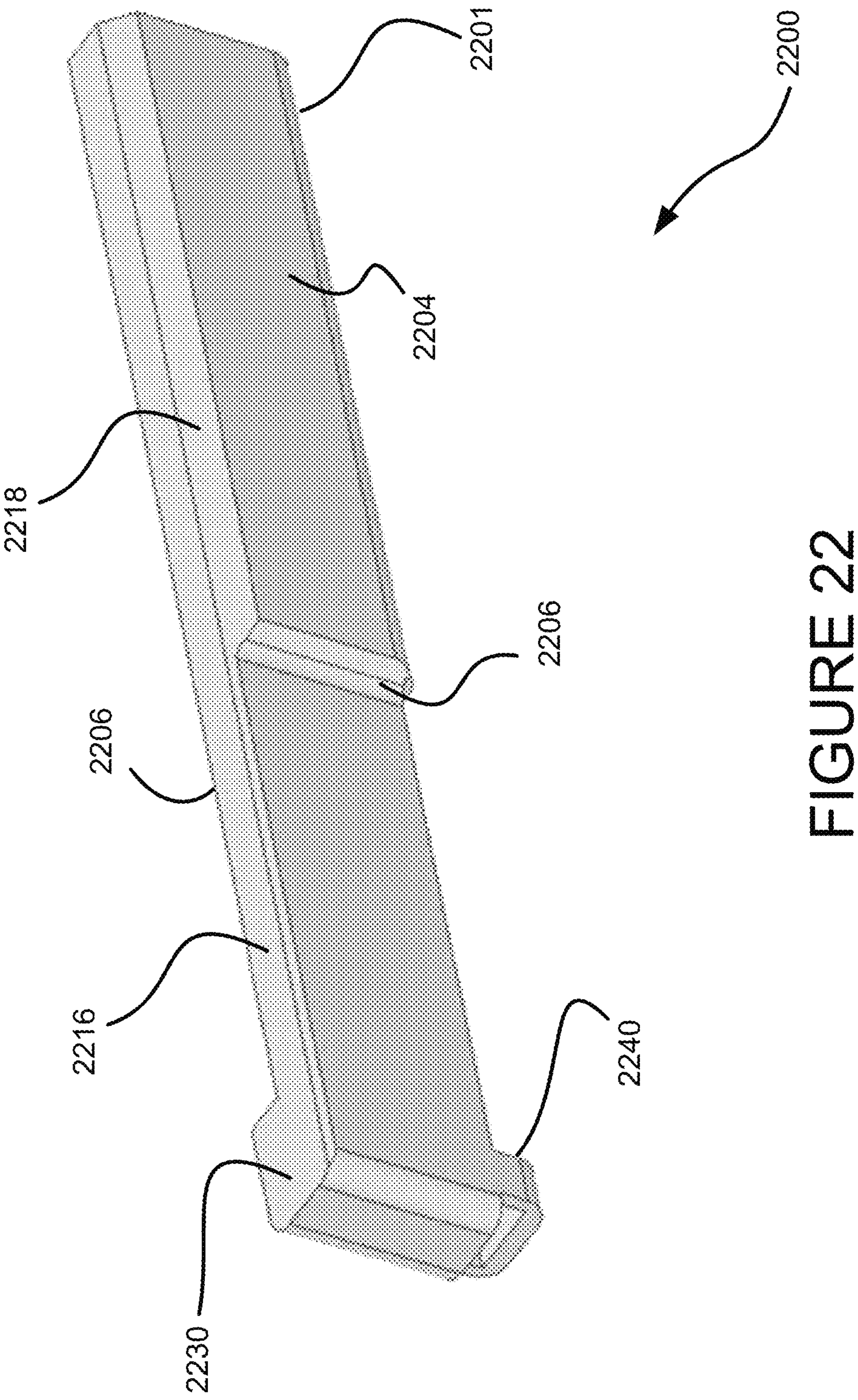
FIG. 22 is a perspective view of an example radome in accordance with an aspect of the disclosure.

FIG. 22 shows a schematic for an example radome 2200 adapted to be integrated with a three-port conformal antenna module, such as the module shown in FIG. 21. The radome 2200 includes a casing 2201 that may be designed for improved or optimal gain and impedance invariance, while having a reduced or minimal physical footprint compared with other known shielding solutions. In some examples, the radome may be designed using industry standard 3D-printing methods, such as polylactic acid (PLA) based printing methods. The casing 2201 may be made of a dielectric material. In some examples, the material may have a dielectric constant of about 2.75 and a dielectric loss tangent of about 0.01. The surface resolution may be about 200 μm or less.

Figure 23:
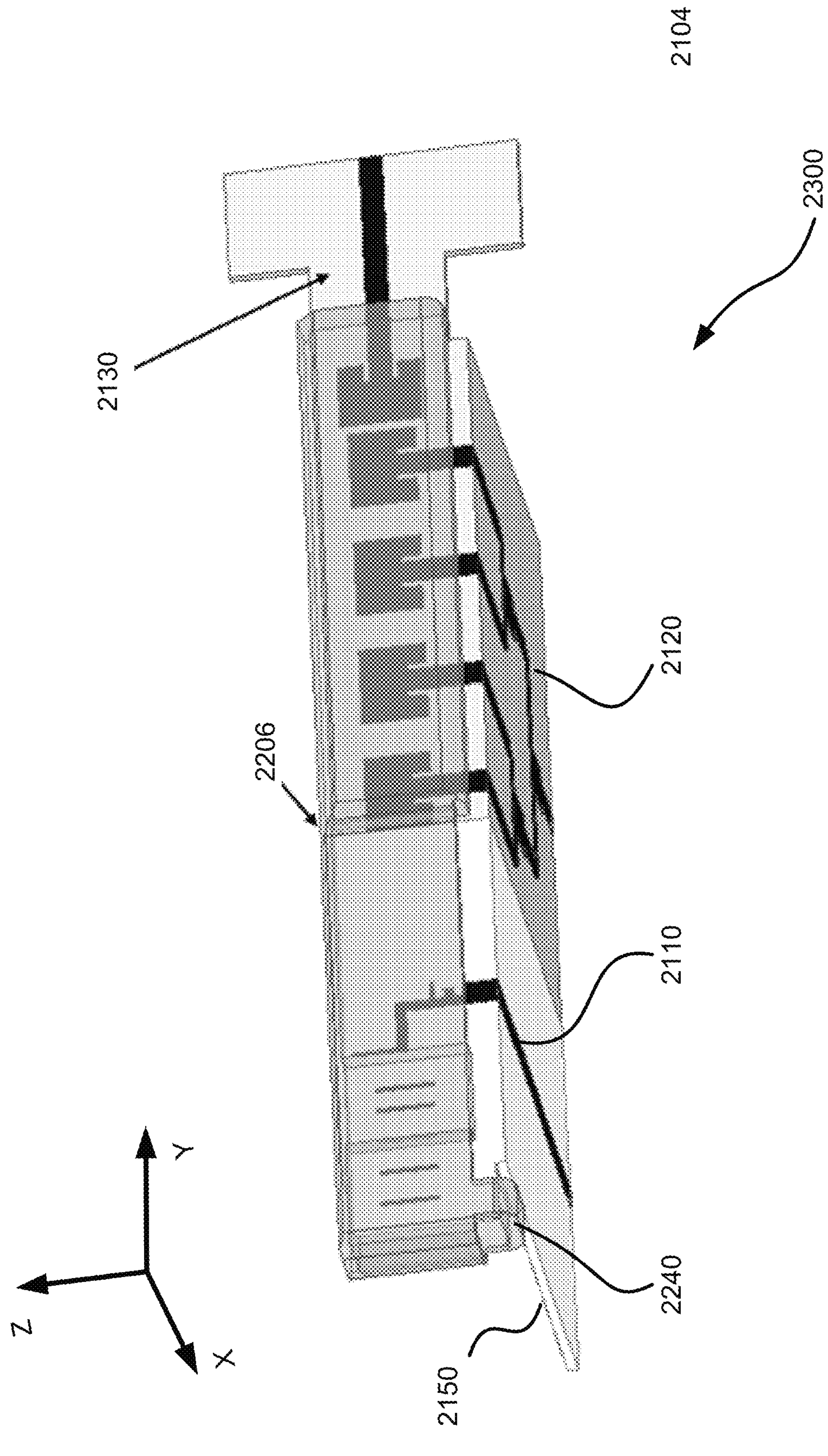
FIG. 23 is a diagram of the integrated conformal antenna of FIG. 21 integrated with the radome of FIG. 22.

FIG. 23 shows a schematic of the radome 2200 of FIG. 22 integrated with a three-port conformal antenna, such as the antenna 2100 of FIG. 21. In the example of FIG. 23, the casing 2201 of the radome 2200 encloses the second portion 2102 of the conformal antenna 2100. Since the radiators 2116, 2126, 2136 connected to each of the three ports 2112, 2122, 2132 of the conformal antenna are positioned on the folded portion 2102, the radome 2200 may enclose each of the radiators.

In the example of FIG. 22, the casing 2201 of the radome 2200 has an overall thickness of about 2 mm in the X direction. Other radomes may be designed with a different thickness. The thickness may be selected such that the casing of the radome fits within the casing of the corresponding device into which the antenna is integrated. Generally, a radome having a thickness of 2 mm or less will fit into many currently available commercial devices, such as smartphones.

The casing 2201 may include an upper surface 2204. Different portions of the upper surface 2204 may have different thickness. Additionally, a minimum spacing or greater may be provided between the radiator elements of the conformal integrated antenna and the upper surface 2204 of the casing 2201. The spacing may be increased without affecting the gain, although the overall size of the antenna module would be raised by the added spacing. In the example of FIG. 22, it can be seen that the thickness of the upper surface 2204 of the casing 2201 may vary from one location to the next. In particular, a step 2206 is provided on the upper surface 2204 of the casing 2201 between a first portion 2216 and a second portion 2218 of the radome 2200. The first portion 2216 may be positioned over the wideband antenna 2210, and the second portion 2218 may be positioned over the phased array antenna 2110 and the patch antenna 2130. The step 2206 provides an additional thickness over the phased array antenna 2110 and the patch antenna 2130. The step 2206 may include smooth edges, as opposed boxed edges such as in a box-cut transition. This may be done to avoid deteriorating the patterns of the phased array antenna 2110 within the integrated environment. In the example of FIG. 22, the thickness of the first portion 2216 is about 0.5 mm, whereas the thickness of the second portion 2218 is about 2 mm.

The upper surface 2204 of the casing may also be positioned a certain distance from the radiator elements of the antenna, such that a spacing between the casing and radiators is provided. In the example of FIG. 23, the spacing between the first portion 2216 and the radiator elements of the wideband antenna 2210 may be about 1.2 mm, in order to ensure invariance of the input impedance of the antenna post integration with the radome. The spacing between the second portion 2218 and the radiator elements of the phased array antenna 2120 and patch antenna 2130 may be about 0.5 mm, in order to enhance gain close to 1 dB with respect to the antenna array alone.

Additionally, the casing of the radome may extend over the radiators along a plane orthogonal to the radiating apertures for each of the second antenna element 2120 and third antenna element 2130. As such, the upper surface 2204 of the casing 2201 does not deteriorate the characteristics of those antennas. The radome may also be designed to be insensitive to the polarization of the antennas.

The radome may also include other protrusions to improve the front-to-back ratio of the antenna. In the example of FIG. 22, a protrusion 2230 is provided on a lower surface 2206 of the casing 2201 opposite the upper surface 2204. The protrusion extends along the X axis away from the antenna, and is positioned near the dipole arms 2122 of the wideband antenna 2120.

The radome casing 2201 may further include one or more protrusions for alignment purposes. For example, in FIG. 22, a portion 2240 of the upper surface 2204 of casing 2201 is extended downward in the Z direction towards the fold in the antenna. The protruding portion 2240 may be designed to align with an edge 2150 of the antenna, such that when the radome is integrated with the folded portion of the antenna, alignment of the radome and radiating elements can be ensured by checking an alignment of the protruding portion 2240 and the edge.

In the example of FIGS. 21 and 23, the integrated conformal antenna is shown as including feed lines for each of the ports. Additionally, in the example arrangement of FIGS. 21 and 23, sufficient clearance is provided so that an end-launch connector (not shown) may be connected to the ports. However, in other examples, it should be recognized that the ports of the integrated conformal antenna may be directly attached to their respective connection points without leaving clearance for end-launch connectors, and as such the feed lines may also be omitted as unnecessary.

It should be noted that the casing does not fully enclose the folded portion 2102 of the antenna. For instance, in FIG. 23, a portion of the feed line for the third port 2136 is not enclosed by casing 2201. As such, it is still possible to integrate an electronics board (not shown) of the device (e.g., smartphone) with an end of the antenna without having to enclose the electronics board within the radome casing. In this respect, it should be recognized that the radome described herein is designed to accommodate both current and future devices such as mobile terminals.

In some examples, the casing 2201 may cover only the radiating elements. In other examples, such as in FIG. 23, the radome may partially enclose the feed lines connecting the radiating elements to their respective ports. Because the feed lines radiate much less than the radiating elements, partial enclosure of the feed lines does not significantly impact performance of the antennas.

Figure 24:
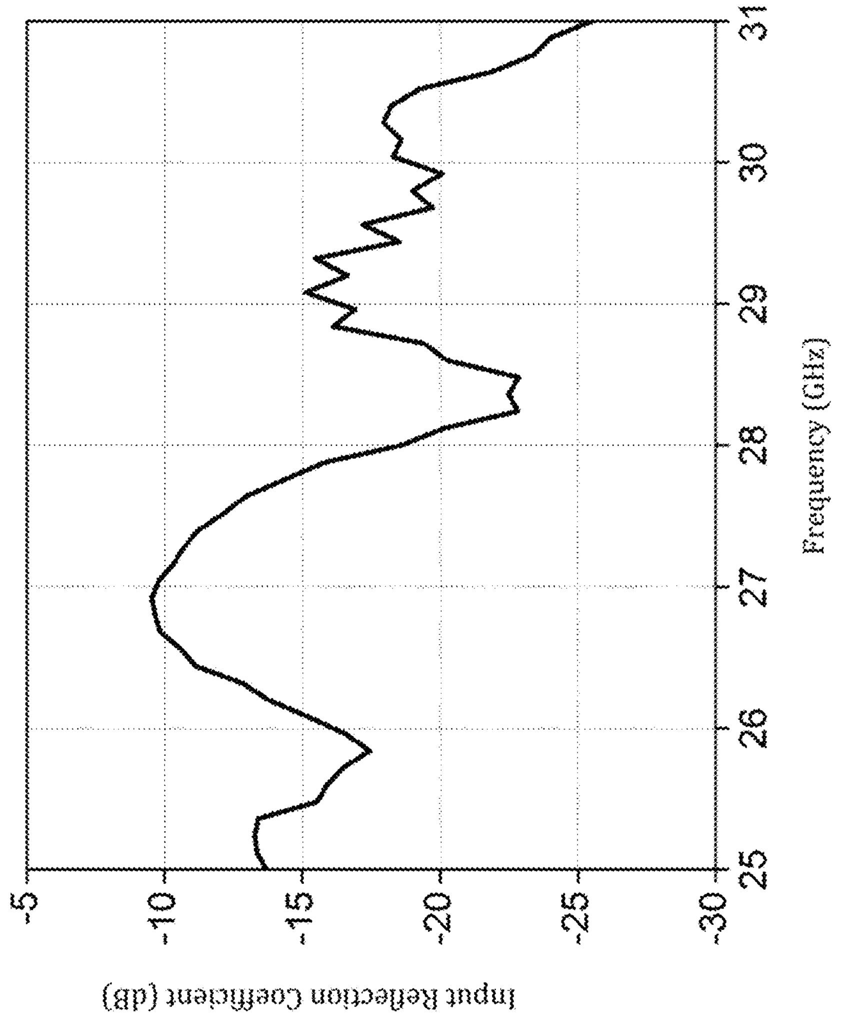
FIGS. 24, 25 and 26 are graphs illustrating input reflection coefficients for respective ports of the integrated conformal antenna and radome of FIG. 23.
Figure 25:
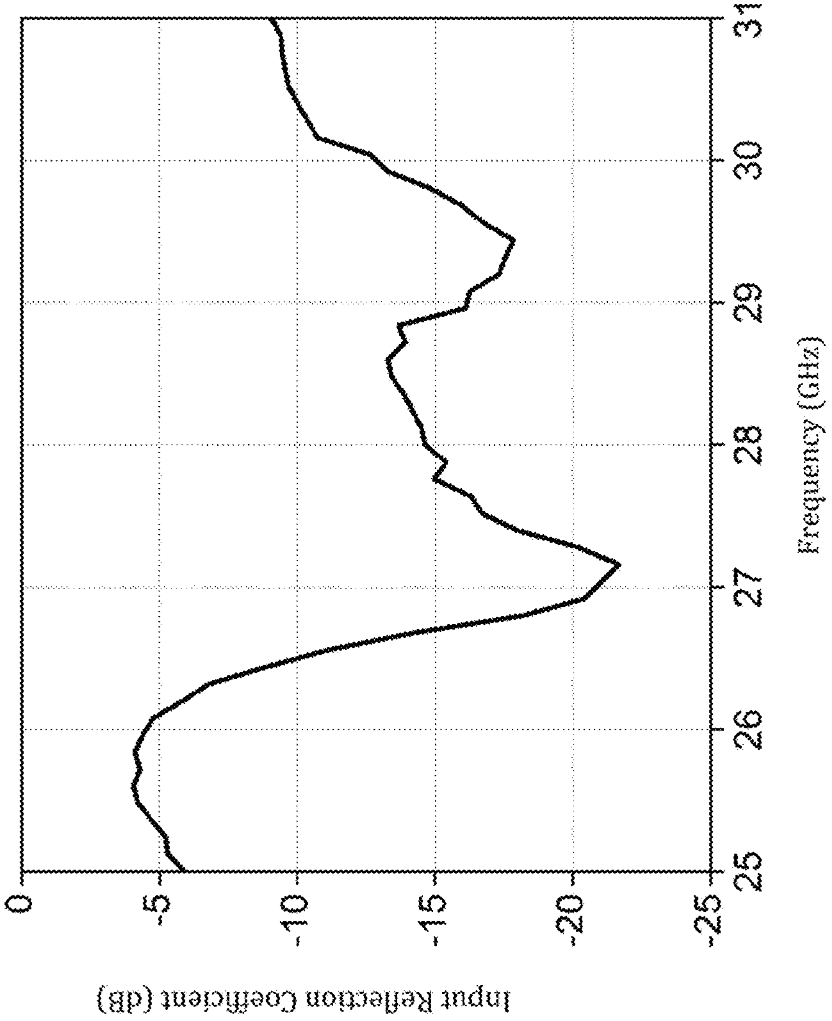
Figure 26:
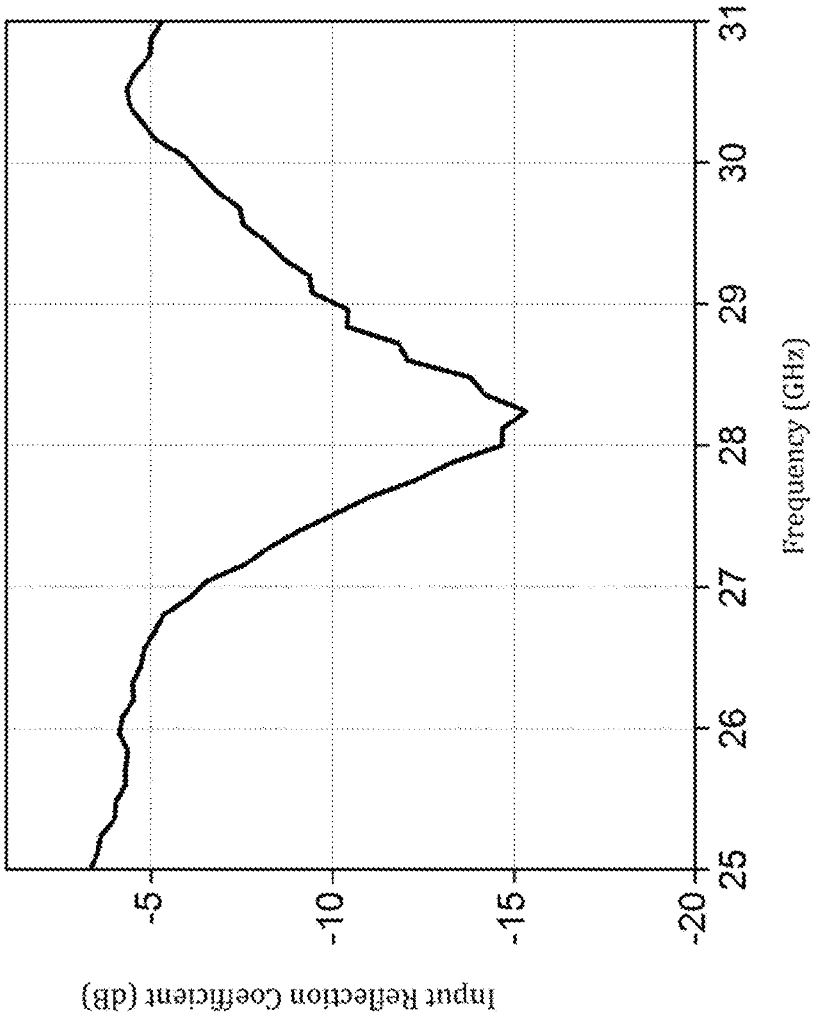

FIGS. 24, 25 and 26 show input reflection coefficients for each of the first, second and third ports, respectively, of the integrated conformal antenna of FIG. 23 having a radome positioned over and covering the radiating elements of the corresponding antennas. As can be seen from these figures, the presence of the radome does not significantly impact the input reflection coefficient for any of the ports.

As can be seen from FIG. 24, the input reflection coefficient for the wideband antenna 2110 is about −10 dB or better for frequencies from about 27 GHz to 31 GHz, indicating that at least the same 13.8% fractional input impedance bandwidth as shown in FIG. 13, or better, is still achieved. As can be seen from FIG. 25, the input reflection coefficient of the phased array antenna 2120 is about −10 dB or better for frequencies from 27 GHz to 30 GHz, indicating that at least the same 10.5% fractional input impedance bandwidth as shown in FIG. 7, or better, is still achieved. As can be seen from FIG. 26, the input reflection coefficient of the patch antenna 2130 is about −10 dB or better for frequencies from 27.5 GHz to 29 GHz, which is comparable to the input reflection coefficient shown in FIG. 18 across the same range of frequencies. Although the above graphs demonstrate operational characteristics of specific antenna elements, it should be recognized that similar results may be expected for other linearly polarized wideband elements having low gain.

Figure 27:
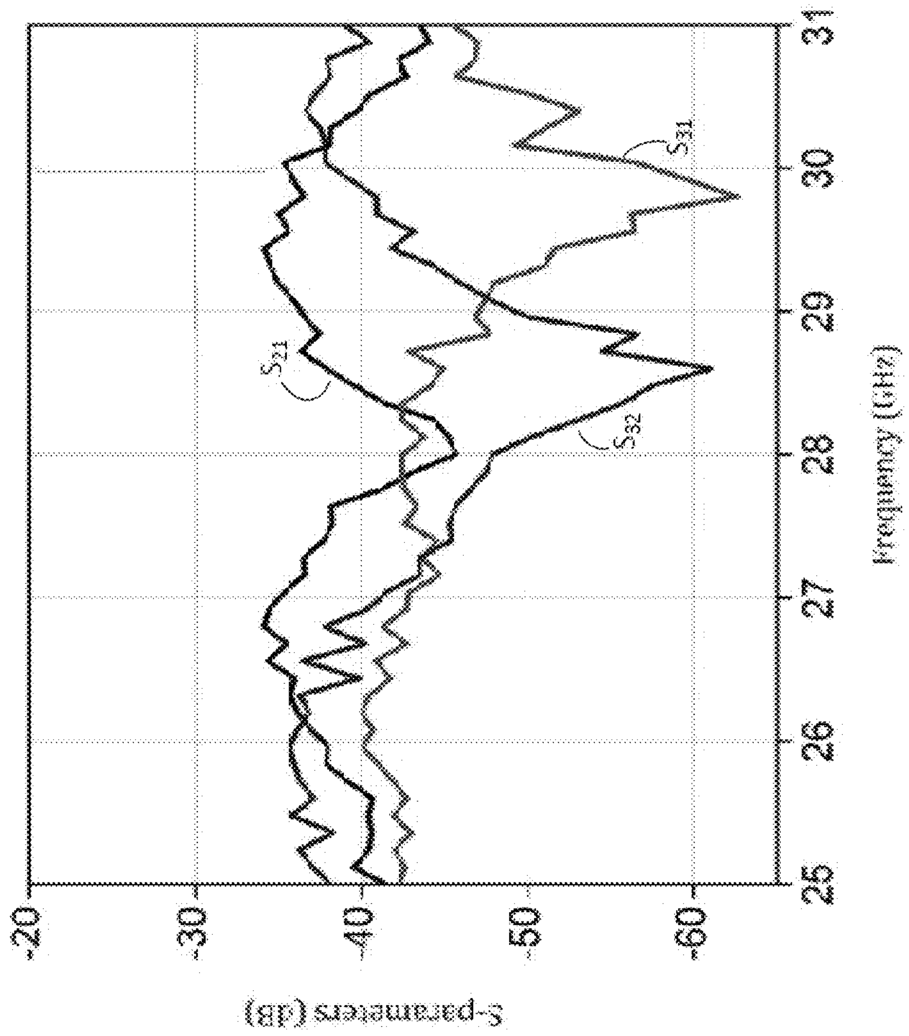
FIG. 27 is a graph illustrating mutual coupling between the respective antenna elements of the integrated conformal antenna and radome of FIG. 23.

FIG. 27 shows mutual coupling between the three antenna elements while integrated with the radome as in FIG. 23. As can be seen from the graph, the presence of the radome does not significantly impact this mutual coupling, as the mutual coupling is less than −35 dB for each pair of ports across the band of operating frequencies, in this particular case from 27 to 31 GHz. This indicates that the characteristics of the individual antenna elements remain intact even when these elements are assembled close to each other, such as within 1.2 mm as demonstrated in FIG. 17. In the example of FIG. 23, the wideband antenna 2110 and phased array antenna 2120 are actually 9.1 mm apart, although experimentation has shown that performance would be roughly unchanged for distances between 1.2 mm and 9.1 mm.

Figure 28A:
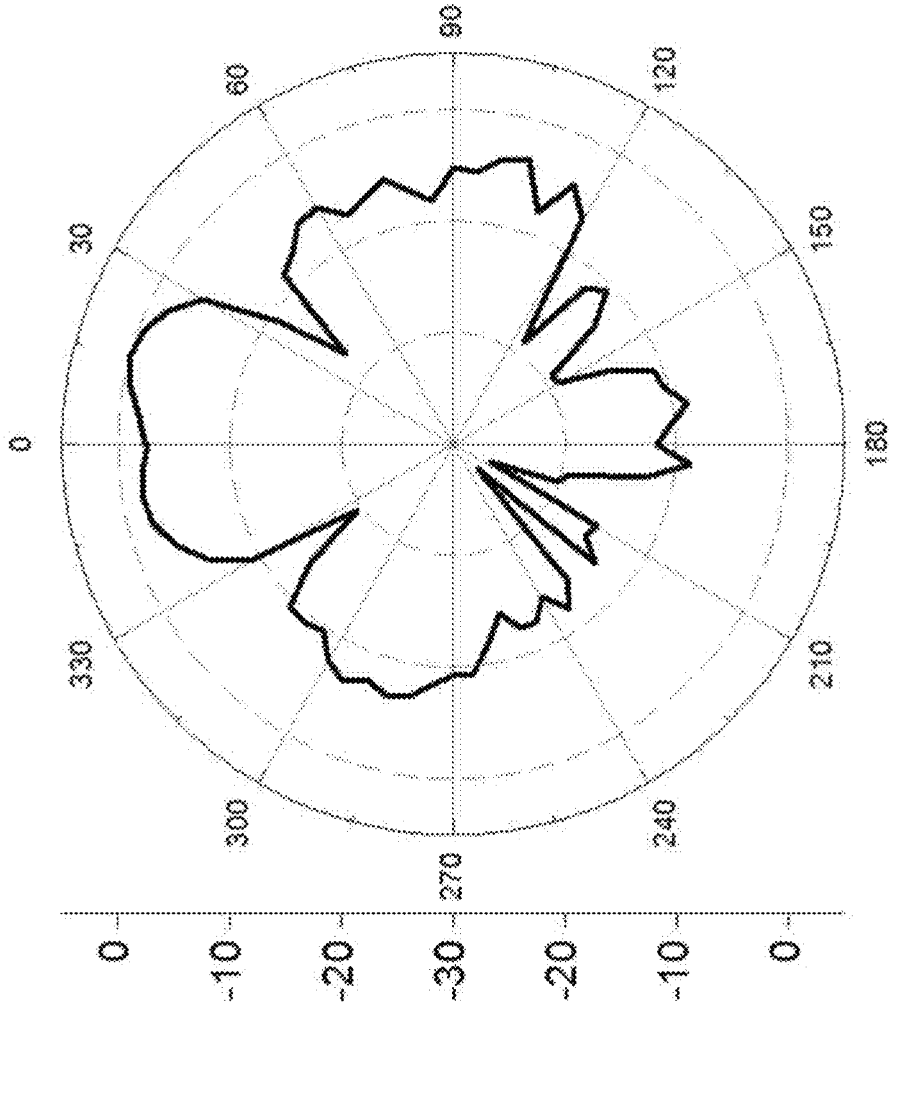
FIGS. 28*a*, 28*b*, 29*a*, 29*b*, 30*a*, and 30*b* are radiation pattern graphs illustrating the H-plane radiation patterns for respective antennas of the integrated conformal antenna and radome of FIG. 23.
Figure 28B:
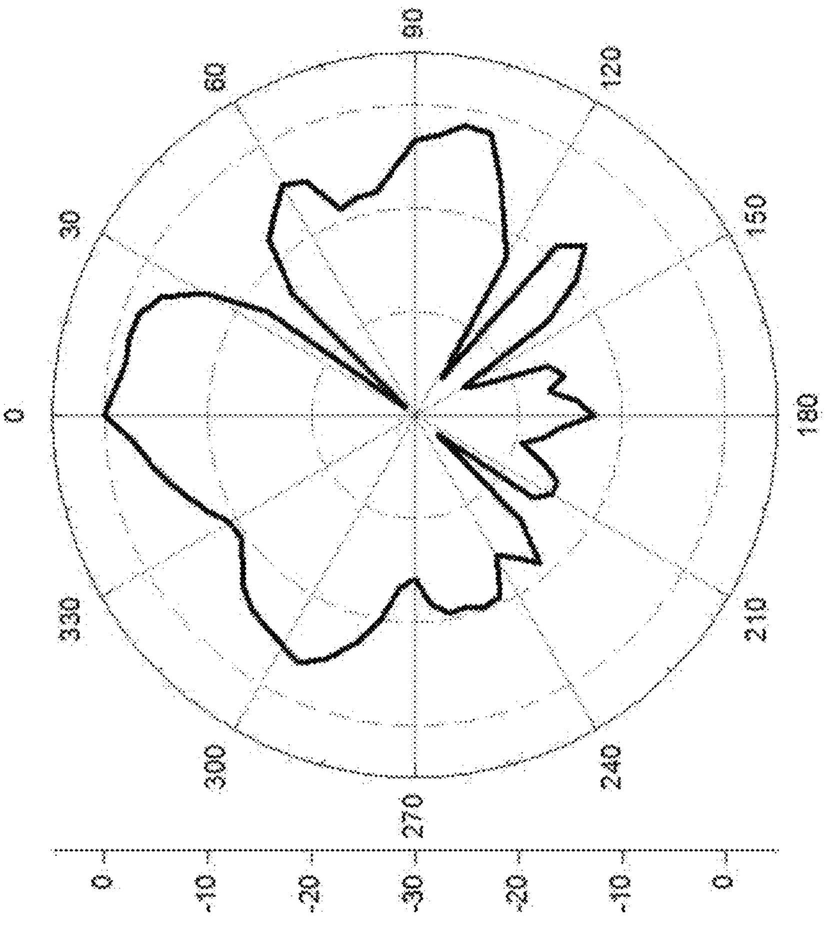
Figure 29A:
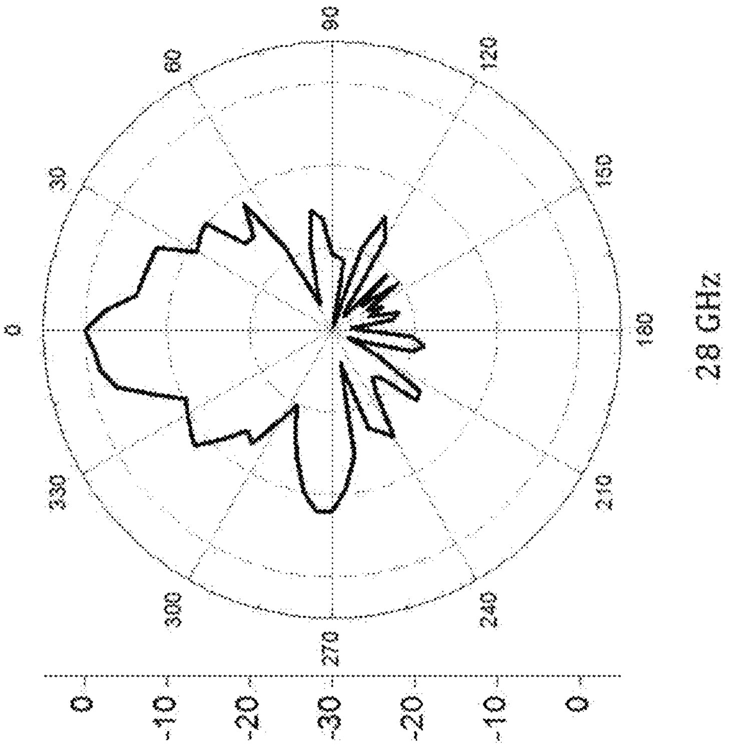
Figure 29B:
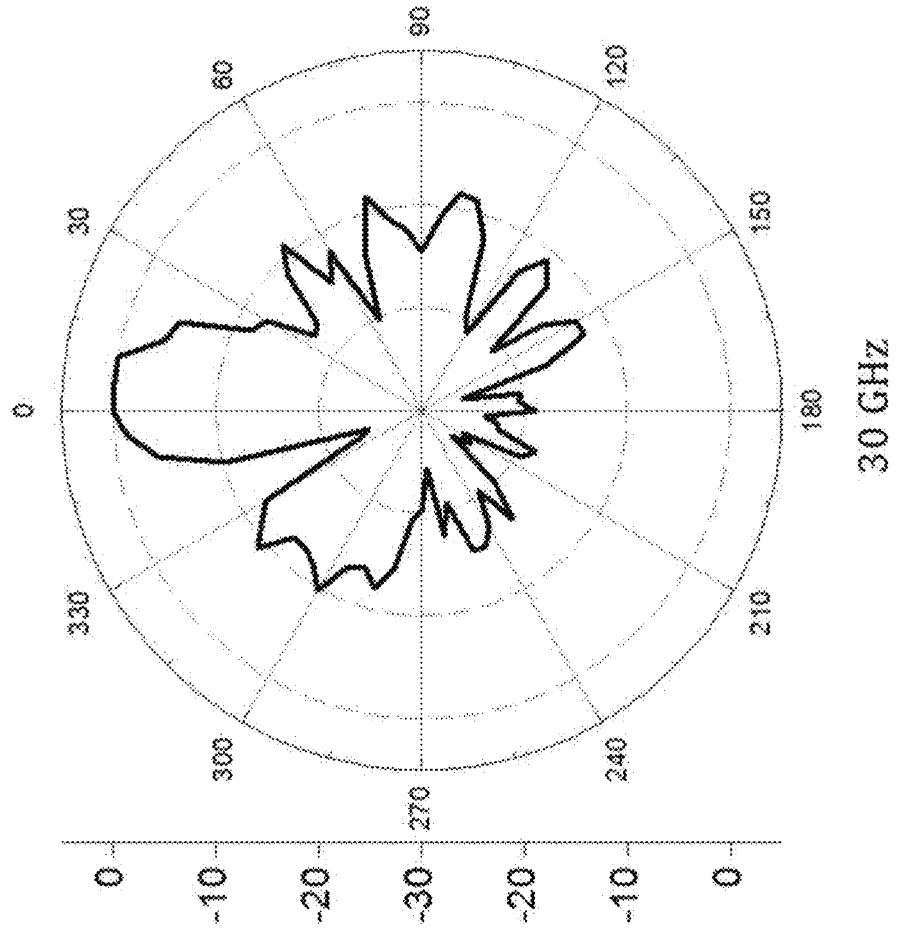
Figure 30A:
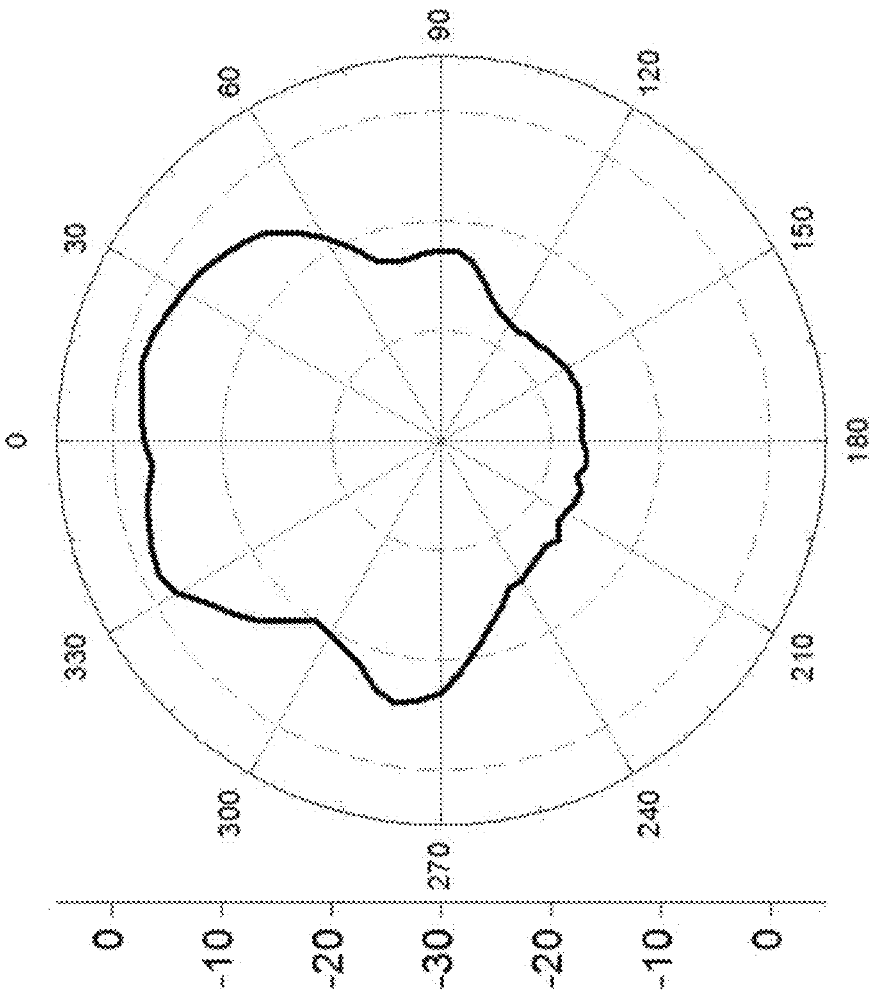
Figure 30B:
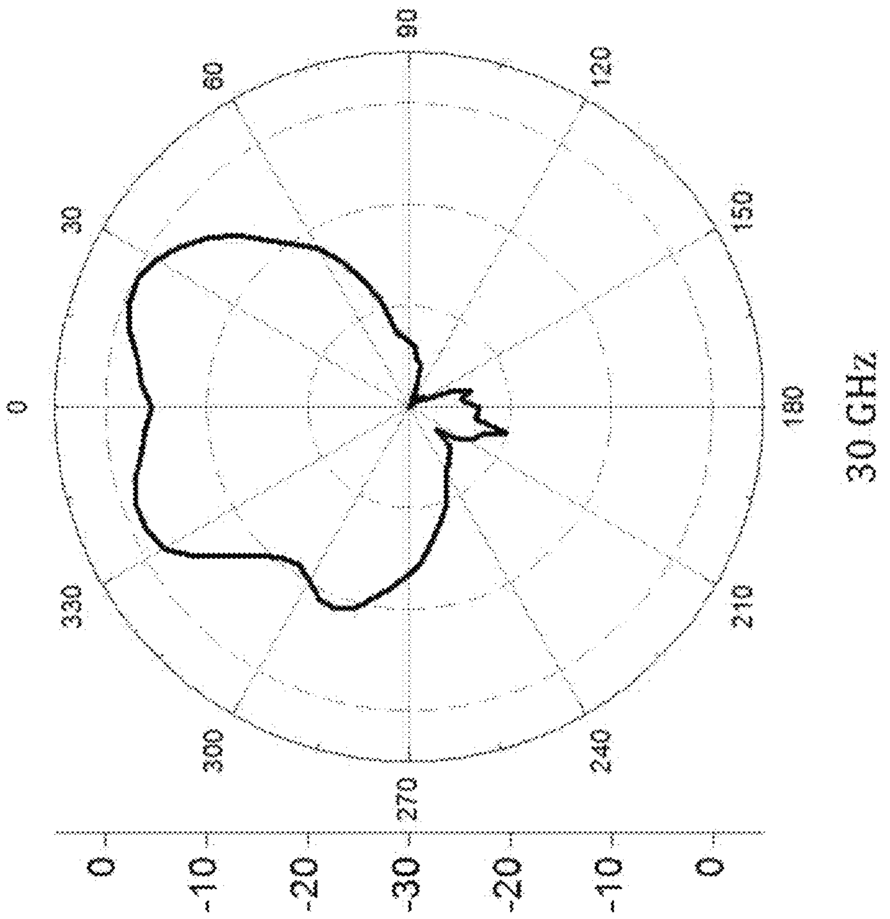

FIGS. 28*a* and 28*b* are radiation pattern graphs illustrating the H-plane radiation patterns (in the XY plane) for the wideband antenna 2110 of FIG. 23 operating at 28 GHz and 30 GHz, respectively. FIGS. 29*a* and 29*b* are radiation pattern graphs illustrating the H-plane radiation patterns (in the XY plane) for the phased array antenna 2120 of FIG. 23 operating at 28 GHz and 30 GHz, respectively. FIGS. 30*a* and 30*b* are radiation pattern graphs illustrating the H-plane radiation patterns (in the XZ plane) for the patch antenna 2130 of FIG. 23 operating at 28 GHz and 30 GHz, respectively.

FIG. 28*a* demonstrates that the antenna beam of the wideband antenna 2110 has a relatively stable radiation pattern in most directions when operating at 28 GHz. This allows for communication between the antenna and a base station without interference from the user's hands even when the device is held in a landscape orientation with both hands of the user covering opposite sides of the handheld device. The radiation pattern of the antenna beam is shown in FIG. 28*b* to deteriorate slightly when operating at 30 GHz. This may be due to parasitic elements from the radome enclosing the antenna. Beamforming at 30 GHz may be improved by increasing the spacing between the antenna and the casing of the radome in both front and back directions.

FIGS. 29*a*, 29*b*, 30*a* and 30*b* demonstrate that the antenna beam of the phased array antenna 2120 and patch antenna 2130 have relatively narrower beams as compared to the wideband antenna 2110 when operating at 28 GHz or 30 GHz. This makes the phased array antenna 2120 and patch antenna 2130 more suitable for operation in the portrait orientation, whereby radiation of the handheld device may be pointed away from the user and towards the base station.

FIGS. 29*a* and 29*b* demonstrate that the phased array antenna has a relatively high gain, but a relatively low beamwidth, as compared to the other antenna elements. The relatively high-gain antenna can be used for data transfer or point to point link operations by the device. The front-to-back ratio for this antenna is 25 dB or better between 28 GHz and 30 GHz. As a result, when the second port of the integrated conformal antenna of FIG. 23 is excited, radiation is direction towards the base station and away from the user.

By comparison, FIGS. 30*a* and 30*b* demonstrate that the beamwidth and gain are both lower in the patch antenna than in the phase array antenna. As such, the patch antenna would be suitable for use in broadcast applications, in which a wider beamwidth in needed.

Figure 31:
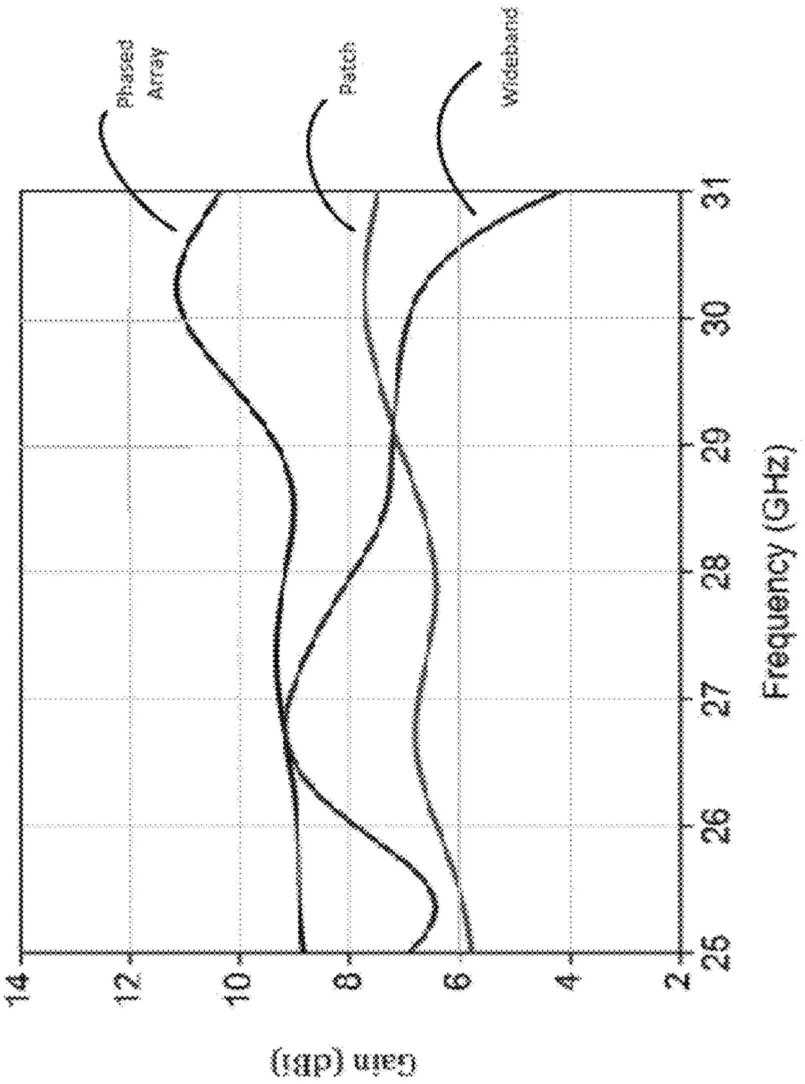
FIG. 31 is a graph illustrating gain of the integrated conformal antenna of FIG. 23 for a range of transmission/reception frequencies.

FIG. 31 is a graph showing gain of the integrated conformal antenna of FIG. 23 for a range of transmission/reception frequencies. As can be seen from FIG. 31, the different antenna elements of the integrated antenna have different respective gains, which allows for switching between high gain and low gain elements. For example, the phased array antenna connected to the second port has a gain of about 10 dBi at 30 GHz, and the patch antenna connected to the third port has a gain of about 6.5 dBi at 28 GHz, which is more than twice as low (3 dB) compared to the gain at the second port. Thus, a device including the integrated conformal antenna of FIG. 23 may switch between excitation of the second port and third port depending on the desired gain for a given operation (e.g., high gain for data transfer or point to point link, low gain for broadcast). The wideband antenna connected to the first port is shown to have a gain of about 8 dBi at 28 GHz.

Figure 32:
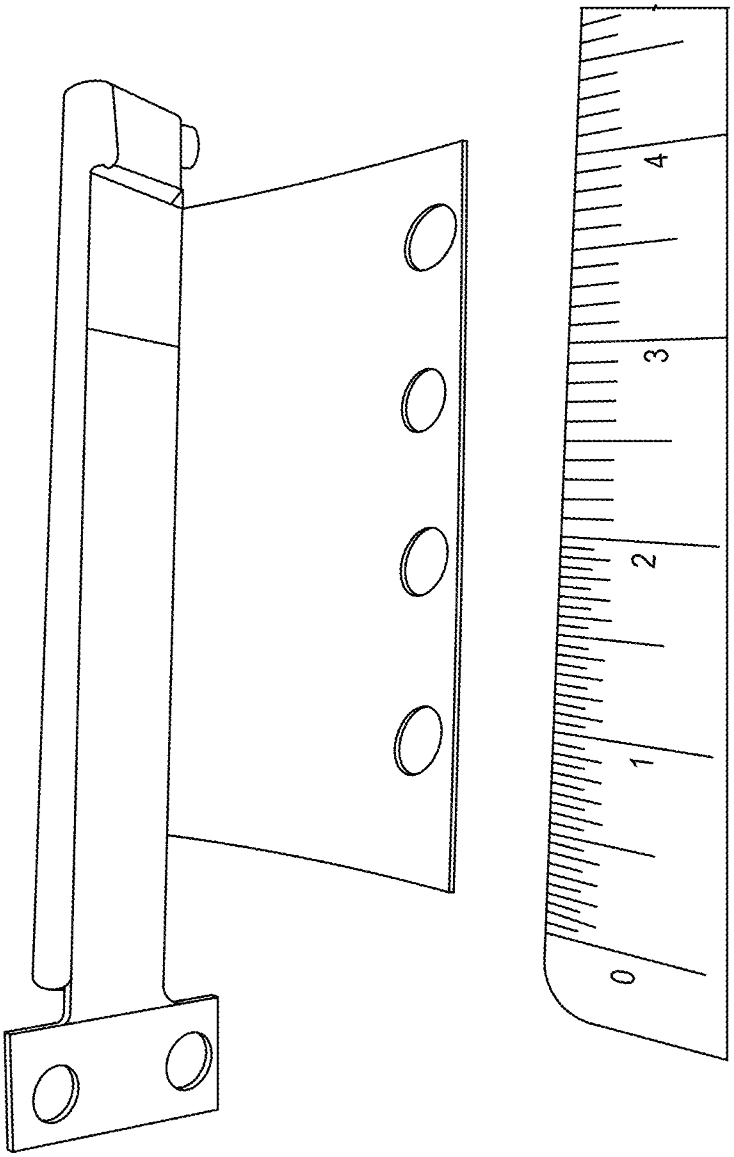
FIGS. 32 and 33 are photographs of prototypes used for testing the integrated conformal antenna of FIG. 23.
Figure 33:
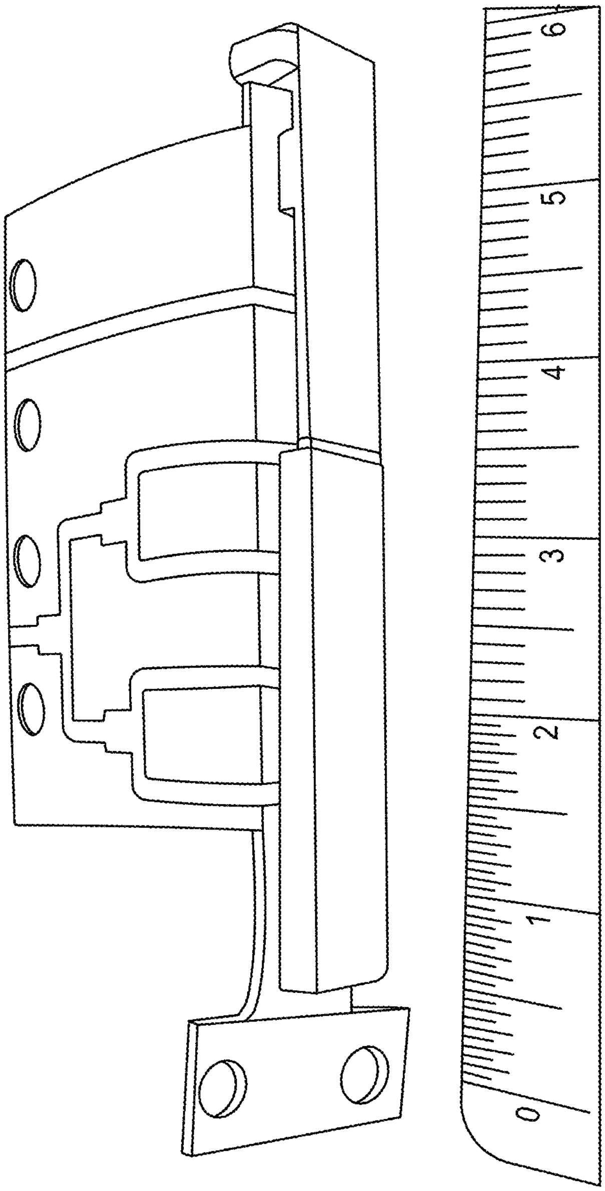

Testing has been conducted on prototypes of the example integrated conformal antenna to confirm that the ports also demonstrate dual-polarized gain switchability. The prototypes used in the testing are shown in the photographs of FIGS. 32 and 33. It is evident from the testing data that phased array and patch antennas connected to the second and third ports, respectively, demonstrate a dual-polarized gain switchability with one another.

In the above examples, the example integrated conformal antennas include a fold. However, in other examples, the integrated conformal antenna may be adapted to be planar. The design of a planar integrated conformal antenna 3400 introduces multiple folds along different axes, and particularly a first fold along the X-axis and a second fold along the Y-axis—in order to save space and effectively reduce the height of the antenna system.

Figure 34:
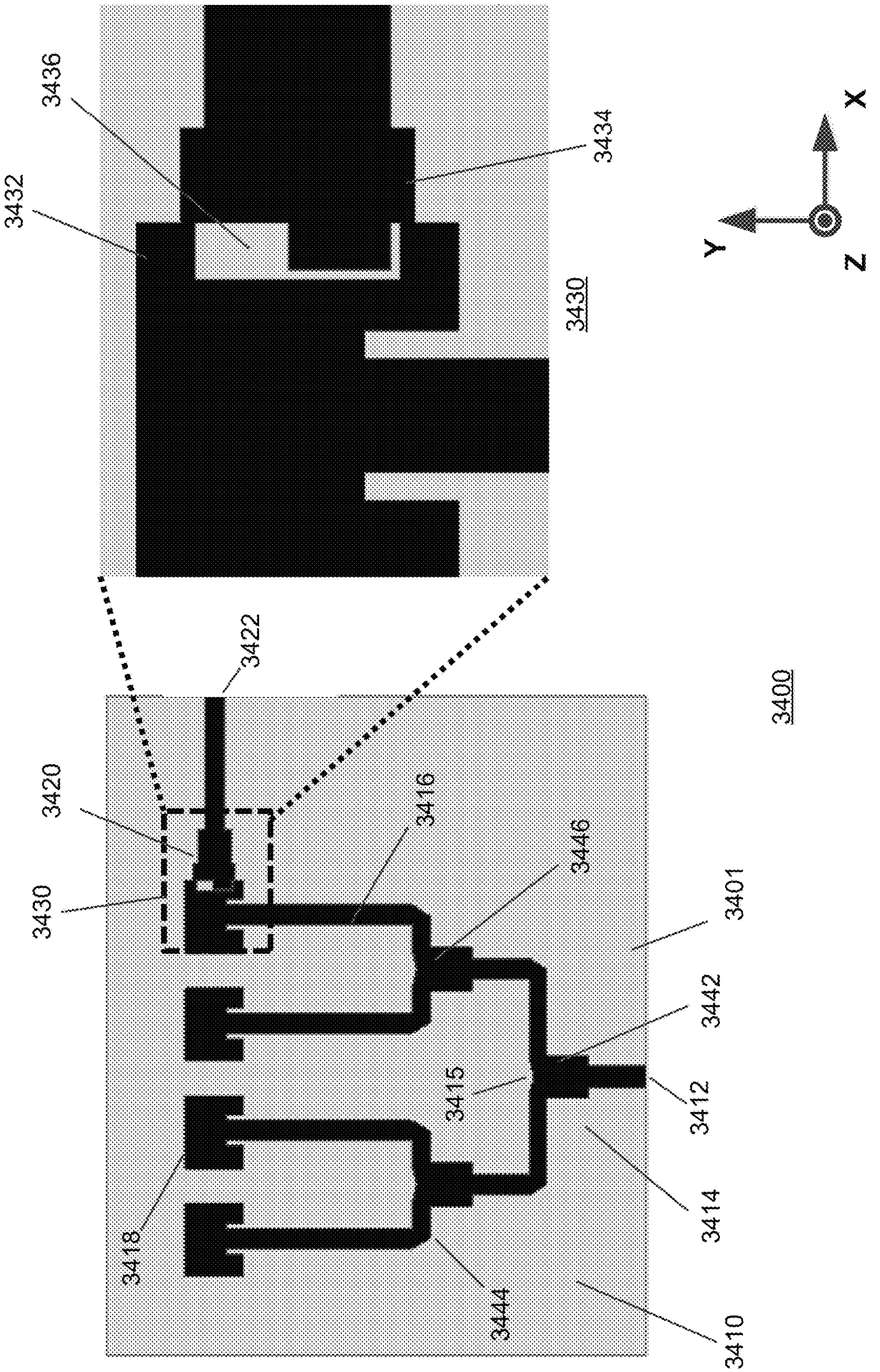
FIG. 34 is a schematic diagram of an example planar integrated antenna in accordance with another aspect of the disclosure.

FIG. 34 is a schematic of an example planar integrated antenna 3400. A first antenna element, a phased array antenna 3410, and a second antenna element, a patch antenna 3420, have some similar properties to the first and third antennas 2110, 2130, respectively, of the integrated antenna module of FIG. 21.

The planar integrated antenna 3400 may be formed on a substrate 3401. The substrate may be selected according to its properties. For example, elasticity of the substrate is one important property for yielding a conformable realization of a chemically etched antenna. For further example, low dielectric constant (such as 2.2) may be an important property of the dielectric in order to ensure propagation of low surface wave modes and to allow for a feed line with a subquarter wavelength width in order to minimize spurious radiation from the feed line itself. For further example, dielectric loss tangent may also be an important property of the dielectric since high loss tangent would result in deterioration of the forward gain by up to 1-2 dB. One suitable substrate may be a Rogers 5880 substrate having a thickness of about 0.5 mm, a dielectric constant of 2.2±0.02 and a relatively low dielectric loss tangent of about 0.0009.

A first port 3412 connected to the first antenna 3410 may be a standard 50Ω line to avoid mismatch with a port impedance of the same value. Arms of the power dividing phased antenna array 3410 may be fed from the first port 3412 through one or more quarter wave transformers 3414 formed on the substrate 3401. The quarter wave transformers may have a characteristic impedance of 35.3Ω. V-shaped notches 3415 may be introduced at the power dividers in order to improve impedance matching. Additionally, each of the four transmission lines 3416 of the array are loaded with an inset-fed patch antenna 3418. The patch antennas 3418 may be identical to one another. In the example of FIG. 34, the array includes four antennas. However, in other examples, more antennas may be included, although consideration of gain requirements should be taken into account, since reducing isolation between ports can lead to poor effective forward gain. Additionally, the spacing between antenna elements should be chosen so that sufficiently high gain is achieved. Additionally, another way of maintaining good isolation between antenna elements may be to increase impedance at the power dividers, although care should be taken to avoid introducing parasitics into the feed network.

Impedance of the power dividers may be optimized to match the impedance of the patch antennas 3418. Typically, an inset-fed patch antenna that is designed on an electrically thin substrate would have an impedance bandwidth of between about 3-4% in fractional bandwidth (FBW). However, a wider band may be achieved with wide impedance matching by the feed circuitry. If all the four patch antennas 3418 are fed in-phase, then the co-polarized radiating E-fields may combine in order to lead to a higher gain if the separation between the patch antennas is close to a half-wavelength. The first power divider 3442 can approximately equally split power in half to each arm and a similar function may be performed at the other two power dividers 3444, 3446 which feed the radiators in-phase causing a high gain or low beamwidth pattern. As the patch antennas 3418 are backed by an electrically large ground plane, the pattern is unidirectional with a front-to-back ratio that is greater than 10 dB across the band. This arrangement can achieve an impedance bandwidth of 26.2-29 GHz, which translates to 10.1% in FBW.

In order to achieve gain switchability between the first port 3410 and the second port 3420, several possible approaches could be implemented. One possible approach for applications using sufficiently wide transmission lines is to integrate an in-line pin diode or any other switchable series device for respective elements of the phased array. Another possible approach for applications with a sufficiently high profile (in the Z-axis direction) is to integrate a reconfigurable or switchable aperture over the phased array, whereby, when the aperture is activated, the beamwidth of the pattern changes. Alternatively, a shared radiating element may be used.

The example antenna array 3400 of FIG. 34 shows an arrangement using a shared radiating element 3430 to form a contiguous structure. Both the first port 3410 and the second port 3420 feed the shared radiating element 3430. The shared radiating element is integrated with a first stepped impedance transformer 3432 and a second stepped impedance transformer 3434. Widths of the transformers in the Y-axis direction may be 2.5 mm and 2 mm, respectively. A slot 3436 formed in the first stepped impedance transformer 3432 is provided to match impedance between the two ports with minimal mutual coupling therebetween. The slot size may be less than a quarter-wavelength in width, and even shorter in depth, so that no additional radiation or grating lobes appear due to the presence of the slot. In the example of FIG. 34, the slot 3436 dimensions may be about $0.2\lambda_0$ in width and $0.056\lambda_0$ in depth, for an operating wavelength $\lambda_0$ corresponding to 28 GHz. The contiguous structure yields a relatively high magnitude of E-field coupling to the second port, which cannot be avoided for the required radiation requirements.

In operation, activation of different ports of the antenna array 3400 can lead to dynamic beamforming or gain switchability. For instance, the beamforming pattern can be switched between a narrow beam (low gain) or a wide beam (high gain).

In a low gain mode of operation, the second port 3420 may be activated. This causes the shared radiating element 3430 to act as a primary radiator. Additionally, as there are no additional isolating networks between the other radiators the first port 3410, energy may flow from the activated shared radiating element 3430 to the other radiating elements of the inset-fed patch antennas 3418. Due to the arrangement of the inset-fed network, different amounts of energy flow to each of the other radiating elements, whereby intensity decreases for each element that is farther from the shared radiating element 3430. This diminishes the beamforming capability of the antenna array as compared to a typical corporate-fed antenna array. Due to this property, the beamforming pattern produced by the inset-fed patch antennas 3418 is widened by the presence of the shared radiating element 3430.

In a high gain mode of operation, the first port 3410 may be activated. This causes each of the radiating elements of the inset-fed antennas 3418 to act as a primary radiator. This allows for gain switchability between the first and second ports. Additionally, both the second port 3420 and the feed network of the first port 3410 are arranged to be Y-polarized, which results in the radiating edges of all of the inset-fed patches 3418 having the same Y-polarization. Thus, the double-folded design of FIG. 34 achieves the same gain switchability as other single-folded designs, such as that of FIG. 5, without requiring a change in the polarization when the gain mode of operation is switched.

Figure 35:
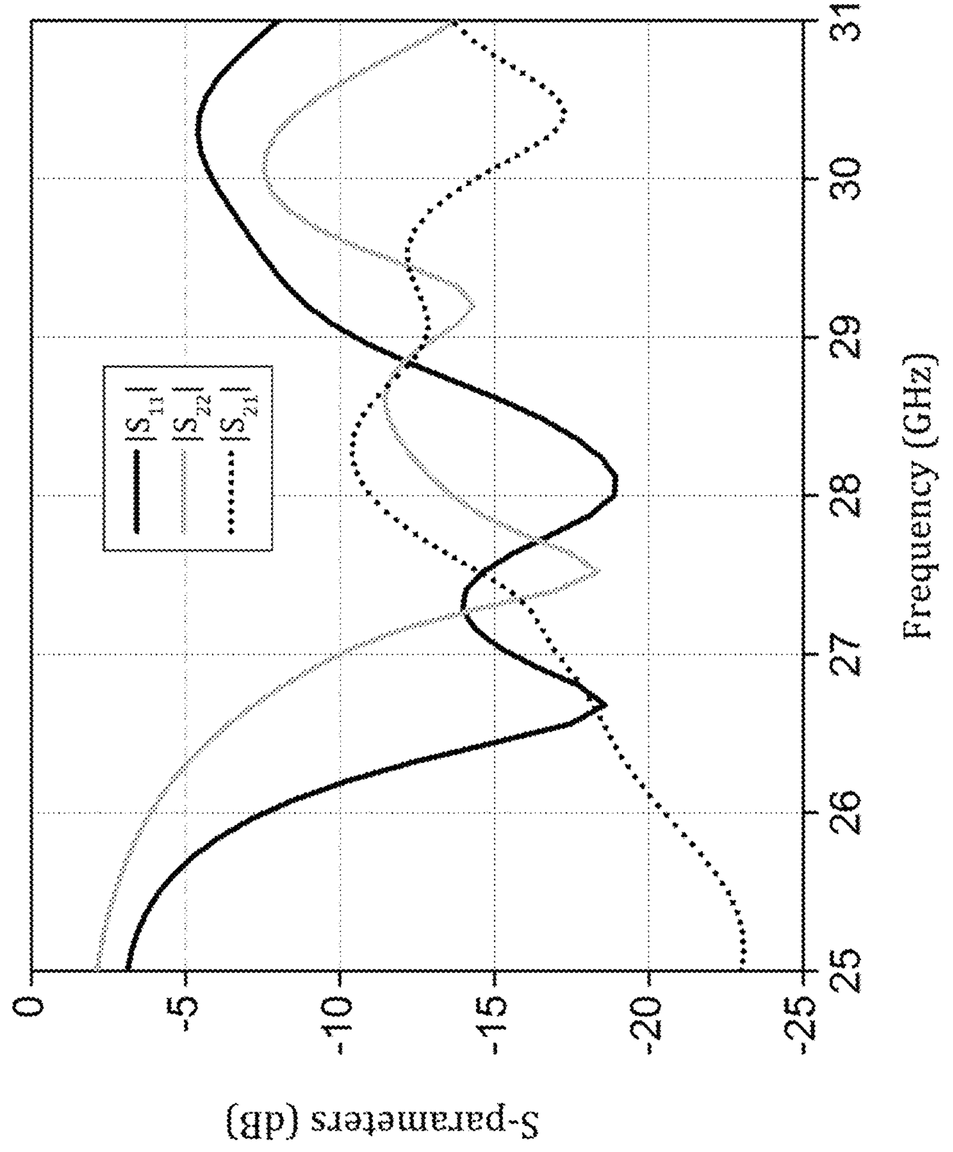
FIG. 35 is a graph illustrating input reflection coefficient of the planar integrated antenna of FIG. 34.

The electrically long feed network leads to gain deterioration without a significant deterioration in pattern integrity throughout the band, since the feed network and the radiating aperture are positioned in respective planes that are orthogonal to one another. FIG. 35 is graph illustrating transmission and reflection characteristics, particularly S-parameters, of the antenna array of FIG. 34. As can be seen in FIG. 35, an impedance bandwidth of first port 3410 for which $S_{11}$ was found to be −10 dB or better was about 26.2-29 GHz, which equates to an FBW of 10.1%. Similarly an impedance bandwidth of the second port 3420 for which $S_{22}$ was found to be −10 dB or better was about 27-29.6 GHz, which equates to an FBW of 9.2%. Thus, both the ports 3410, 3420 were found to operate within a 28 GHz band (e.g., 27-29 GHz) with a mutual coupling of less than 10 dB across the band, even with the added mutual coupling due to the compact design of the shared radiating element 3430, as compared to mutual coupling of other designs with shared ground. Additionally, FIG. 35 shows that the $S_{21}$ parameter of the simulated array is −15 dB or better between 27.5-29 GHz.

Figure 36A:
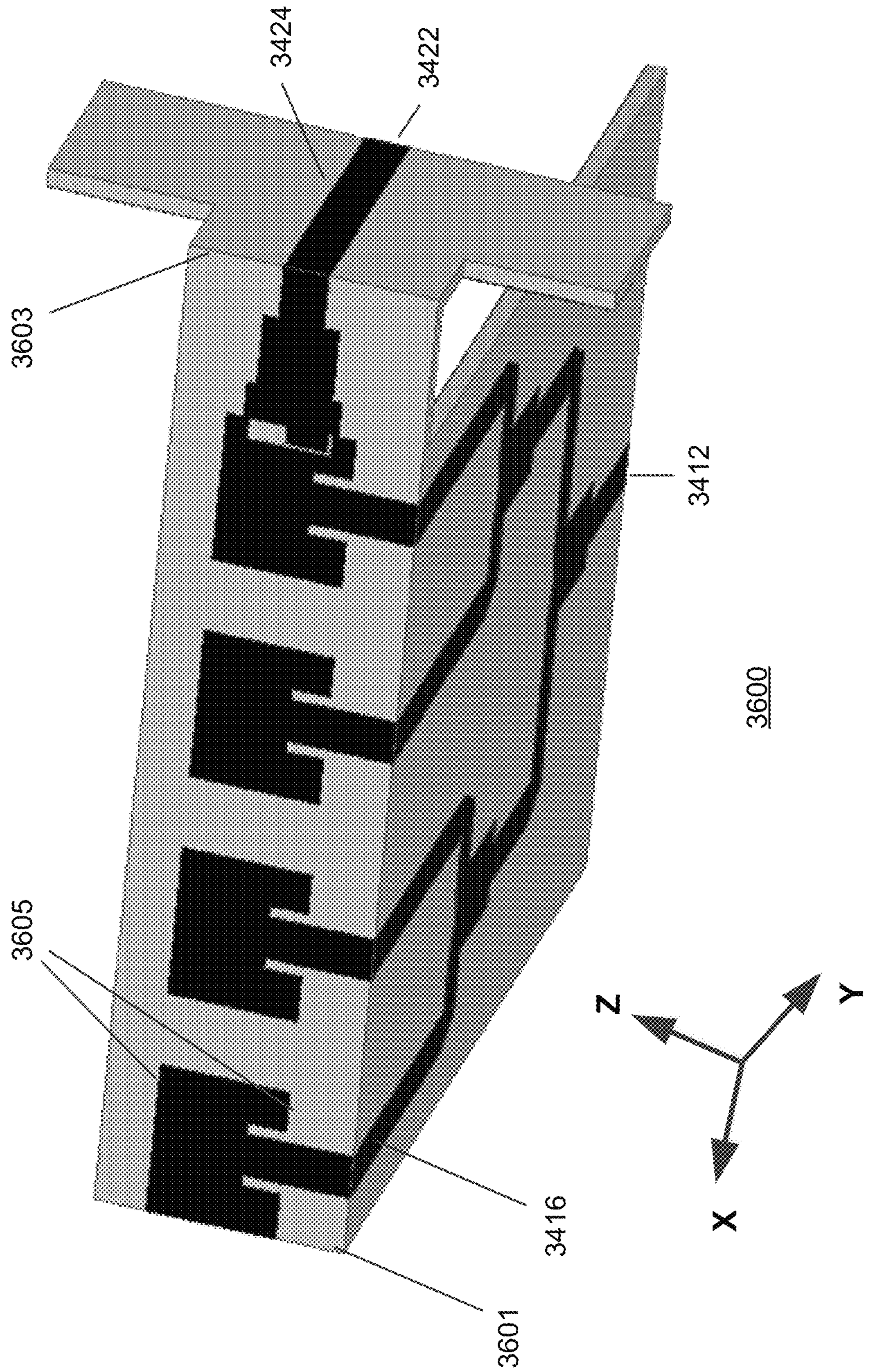
FIG. 36*a* is a schematic diagram of another example integrated antenna in accordance with another aspect of the disclosure.

FIG. 36*a* is a schematic of another example integrated antenna 3600. Like the example antenna 3400 of FIG. 34, the integrated antenna 3600 of FIG. 36*a* includes a shared resonating element. However, the integrated antenna 3600 of FIG. 36*a* differs in that it is not planar, as a first bend 3601 or fold is provided along the X-axis of the design of FIG. 34 across the transmission lines 3416 connected to the first port 3412, and a second bend 3603 or fold is provided along the Z-axis of the design of FIG. 34 across a transmission line 3424 connected to the second port 3422. The resulting antenna is capable of being conformed around the curved panel, and particularly at an interior corner, of a mobile device, such as a smartphone, without sacrificing pattern, gain, or impedance integrity of the antenna system. Thus, the antenna is considered to be "dual conformal" due to the presence of two folds in the antenna.

Simulations have shown that a clearance of 0.5 mm (or 0.046 $\lambda_0$ at 28 GHz) between the housing and each radiating edge 3605 of the radiating elements in the Z-axis direction is adequate for beamforming with reasonably good pattern integrity. Thus, for a patch radiator having a length of 3.4 mm (in the Z-axis) and width of 4.2 mm (in the X-axis), the actual space requirement for fitting the patch radiator within a housing is 4.4 mm in the Z-axis direction (the length of the radiator with a 0.5 mm clearance on either side). Clearances larger than 0.5 mm may be provided in order facilitate easy fabrication. For instance, in the example of FIG. 36*a*, a clearance of 3.2 mm on a transmission line-side of the patch radiator is shown, making the overall height of the design in the Z-axis direction equal to 6.6 mm. Thus, overall dimensions of the portion of the antenna in the XZ plane and including the radiating elements is about 27 mm in length along the X-axis, and about 6.6 mm in height along the Z-axis. A thickness of this portion may be about 0.508 mm. The ground plane of the design acts as a natural shield to RF (radio frequency) electronics. The example pattern of the antenna shown in FIG. 36*a* could be utilized even if a multi-layered board is integrated beneath it.

Figure 36B:
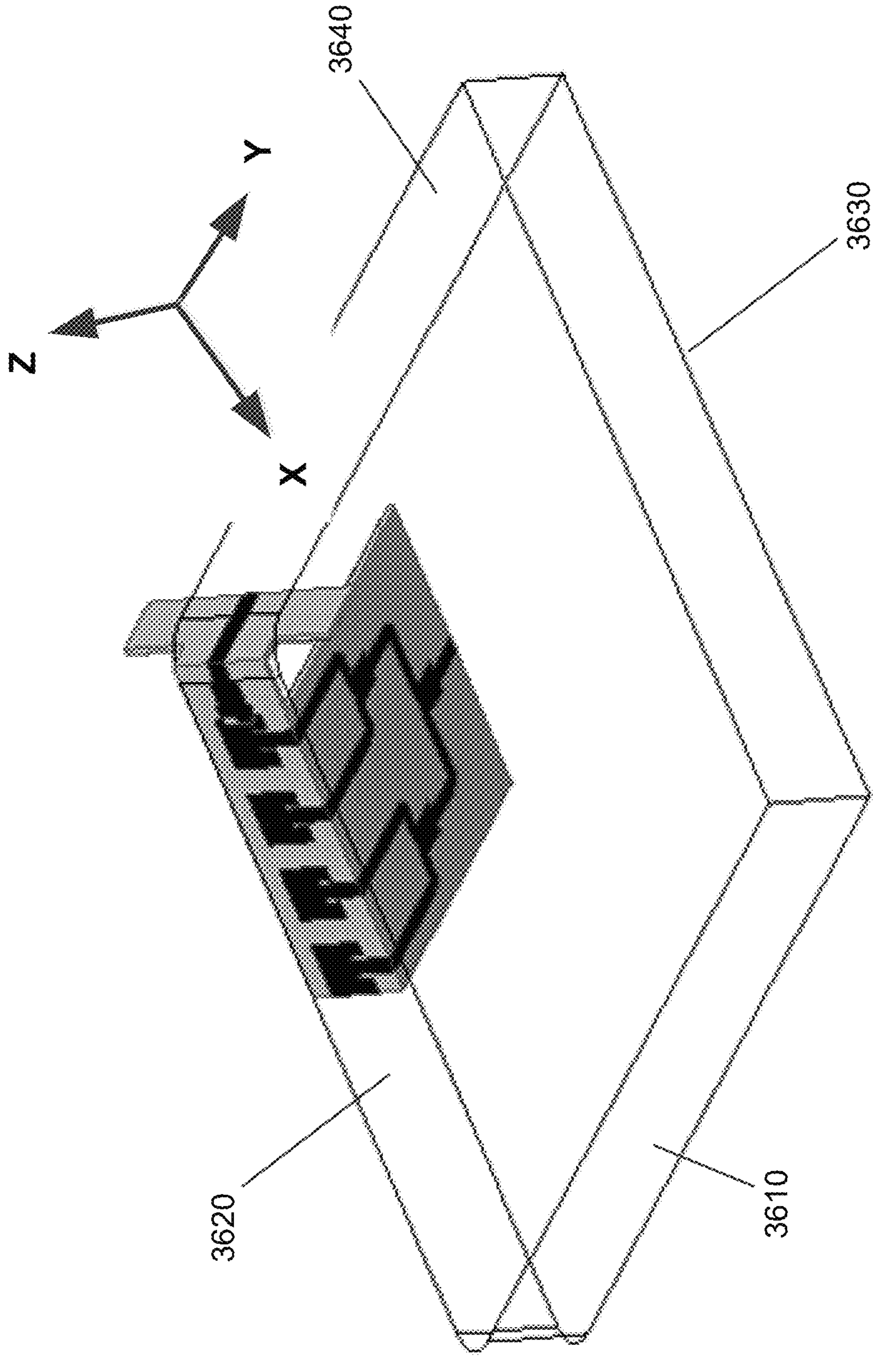
FIG. 36*b* is a perspective view of the integrated antenna of FIG. 36*a* conformed to a device housing.

FIG. 36*b* is a perspective view of the example integrated conformal antenna 3600 of FIG. 36*a* positioned inside of a housing 3610, such as that of a mobile device. As can be seen from FIG. 36*b*, the XZ plane of the integrated conformal antenna, which includes all of the radiating elements, can be positioned along an edge 3620 of the device housing 3610. The transmission lines connecting to the first port 3410 can be folded along a back plane 3630 of the device in the Y-axis direction. The transmission line connecting to the second port 3420 can similarly be folded in the Y-axis direction, but along another edge 3640 of the device housing 3610. As the feed network is orthogonal with respect to the radiating aperture, spurious radiation from the discontinuous power dividers may be kept to a minimum.

The example positioning of the integrated antenna 3600 as shown in FIG. 36*b* can be accomplished in a manner that directs the beams of the shared radiating element away from the user when the device is held in a landscape orientation. This avoids emittance of broadside radiation from the device. The broadside radiation, when directed towards a user's head or torso, such as when the device is held in the landscape orientation or portrait orientation depending on the placement of the antenna within the mobile device, undergoes an attenuation of at least 20 dB in the 28 GHz band. Thus, avoiding the antenna acting as a broadside radiator is advantageous for the antenna's operation.

One example technique for fabricating the integrated conformal antenna 3600 of FIG. 36*a* is by chemical etching the patterns onto the top plane of the substrate. Care should be taken to choose a substrate thickness that permits for bending in order for the antenna to be conformal to the subject device. For instance, in the case of a Rogers 5880, it may be advantageous for the substrate to have a thickness of about 0.1 mm instead of about 0.5 mm.

Figure 37:
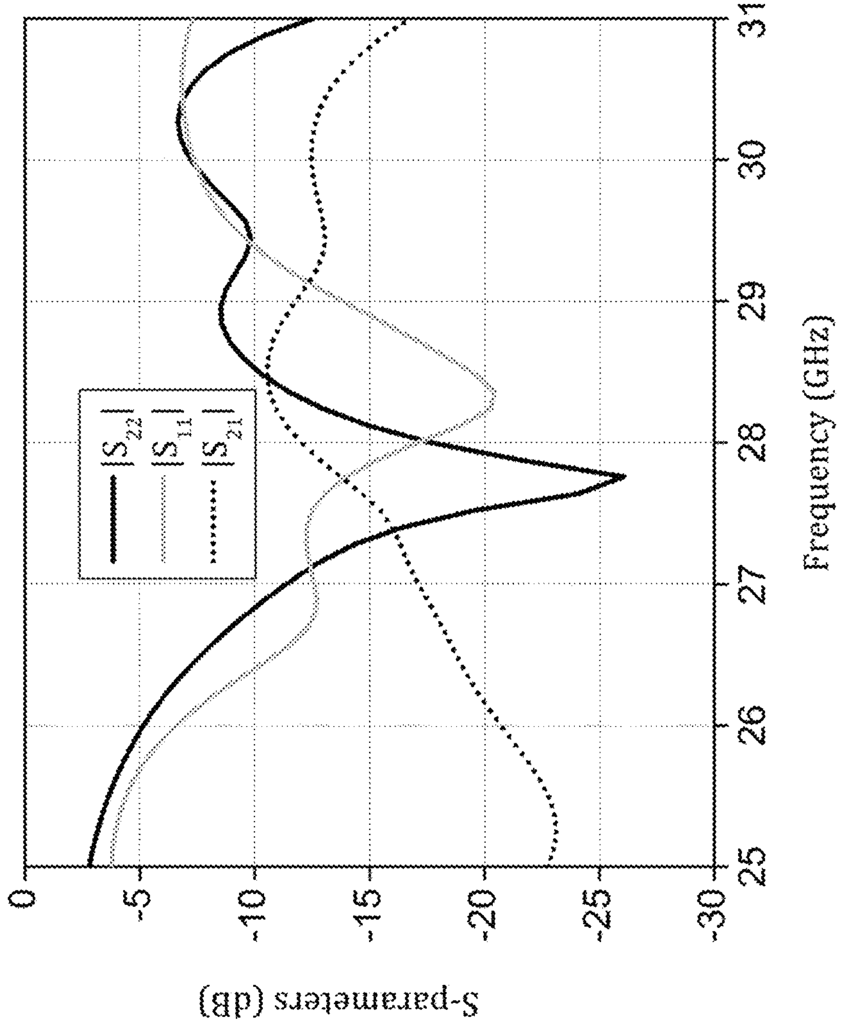
FIG. 37 is a graph illustrating input reflection coefficients of the integrated antenna of FIG. 36*a*.

FIG. 37 is graph illustrating transmission characteristics, particularly S-parameters, of the antenna array of FIG. 36*a*. These parameters differ from those shown in FIG. 35 due to the additional inductance introduced by the folds 3601, 3603 in the network feed lines. As can be seen in FIG. 37, an impedance bandwidth of first port 3410 for which $S_{11}$ was found to be −10 dB or better was about 26.4-29.4 GHz, which equates to an FBW of 10.8%. An impedance bandwidth of the second port 3420 for which $S_{22}$ was found to be −10 dB or better was about 26.7-28.5 GHz, which equates to an FBW of 6.5%. Thus, both the ports 3410, 3420 were found to operate within a 28 GHz band (e.g., 27-28.5 GHz) with a mutual coupling of less than 10 dB across the band. Additionally, FIG. 37 shows that the $S_{21}$ parameter of the simulated array is −15 dB or better between 27.5-30.5 GHz.

A bandwidth of the first port 3610 may be controlled based on a design of the radiating elements, the power divider network and the thickness of the substrate. If wider-band elements could be incorporated, then a wider bandwidth could be achieved. For instance, Wilkinson-based power dividers could be provided, although such a modification may result in a tradeoff between the bandwidth of the port and the pattern integrity at the band edges. For further instance, a thicker substrate behind the radiators (e.g., 0.75 mm) could be introduced, although such a modification may result in a tradeoff between bandwidth and flexibility or conformability.

Figure 38B:
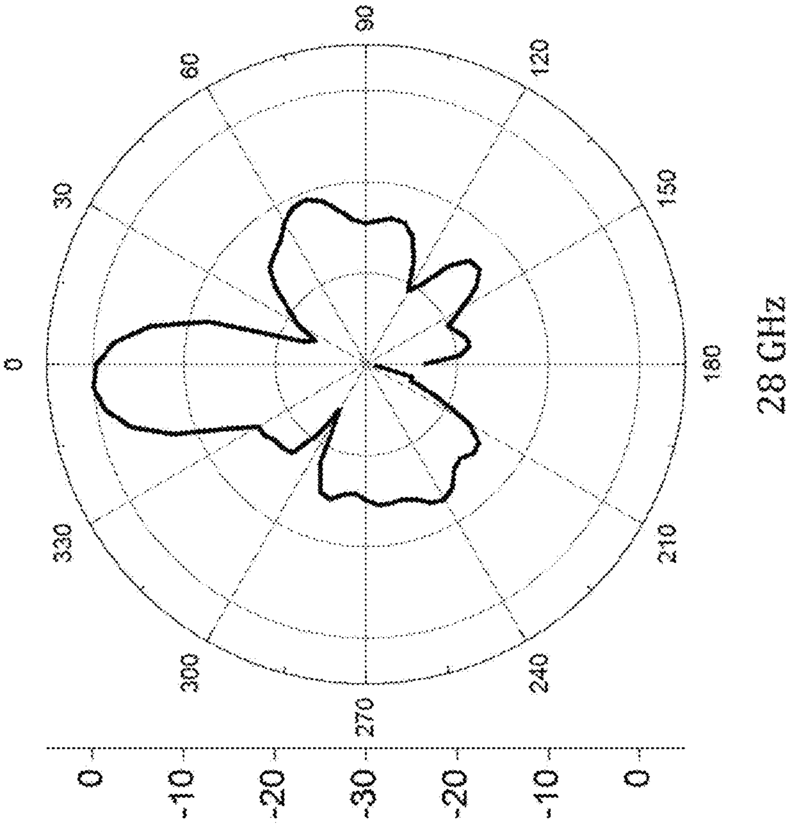
FIGS. 38*a* and 38*b* are radiation pattern graphs illustrating H-plane radiation patterns for a first port of the integrated antenna of FIG. 36*a*.
Figure 38A:
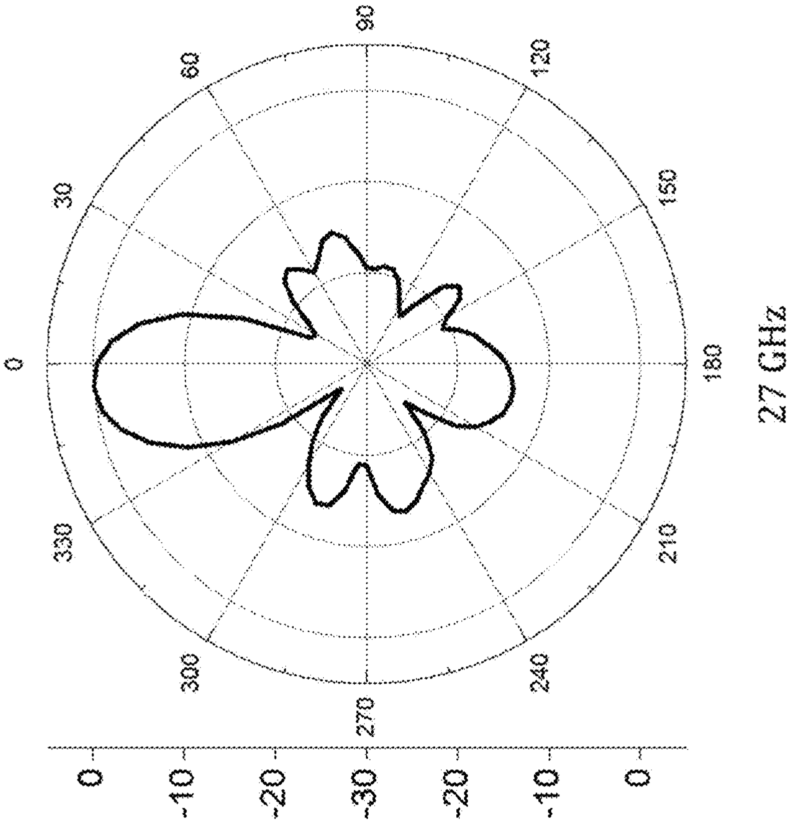

FIGS. 38*a* and 38*b* are graphs showing forward H-plane (XY plane) radiation patterns at 27 GHz and 28 GHz, respectively, when the first port is switched on. In this case, the beamwidth is about 20°. FIGS. 38*a* and 38*b* demonstrate a relatively high pattern integrity, which may be attributed to the aperture behavior of the corporate-fed array. The front-to-back ratio is greater than 15 dB across the band from 27-28 GHz, which indicates that minimal radiation is reflected towards the user engaged with the mobile device when the antenna system is activated. The already narrow beamwidth could be further shrunk by increasing the number of radiators, although such a modification may result in a tradeoff between beamwidth and coverage.

Figure 39B:
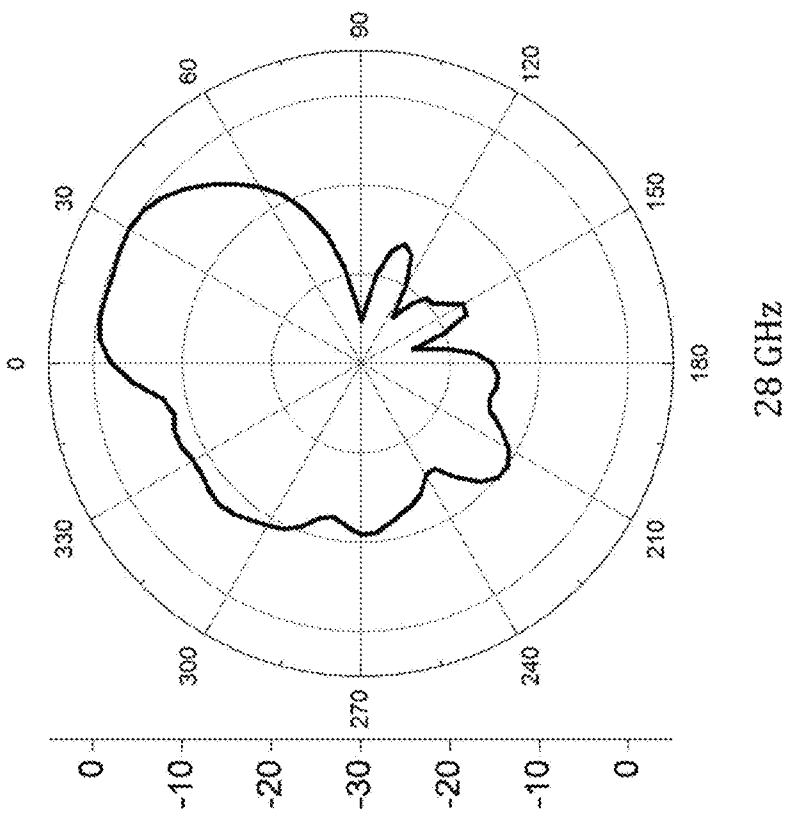
FIGS. 39*a* and 39*b* are radiation pattern graphs illustrating H-plane radiation patterns for a second port of the integrated antenna of FIG. 36*a*.
Figure 39A:
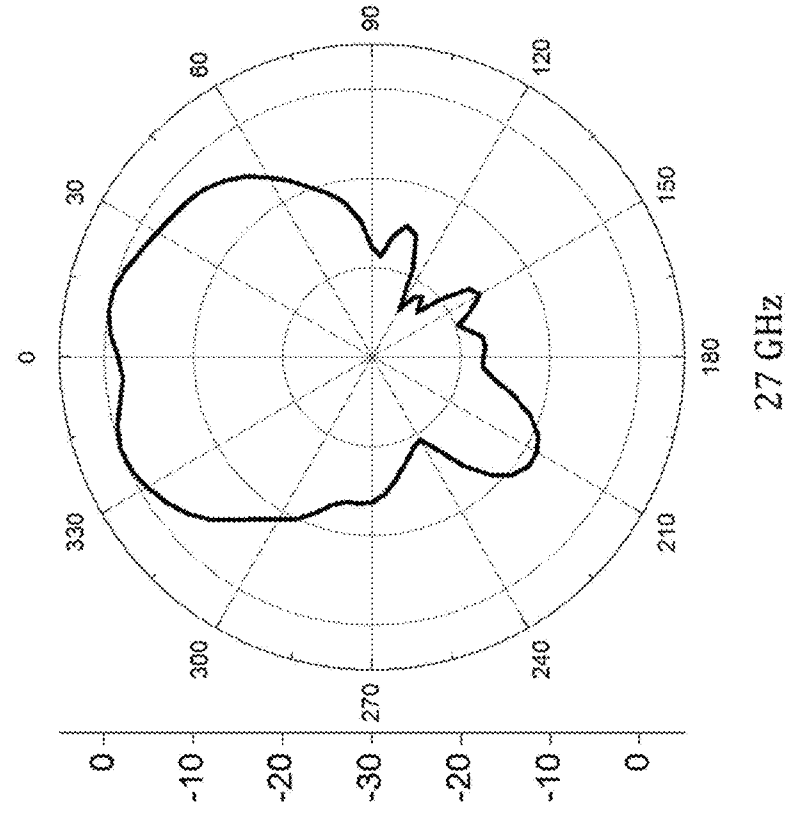

FIGS. 39*a* and 39*b* are graphs showing forward H-plane (XY plane) radiation patterns at 27 GHz and 28 GHz, respectively, when the second port is switched on. In this case, the beamwidth is about 49°. FIGS. 39*a* and 39*b* demonstrate a relatively high pattern integrity, which may be attributed to the aperture behavior of the corporate-fed array. The front-to-back ratio is greater than 10 dB across the band from 27-28 GHz. The wider beamwidth indicates that activating the second port could be advantageous when low gain or broadcast applications are needed.

Figure 40:
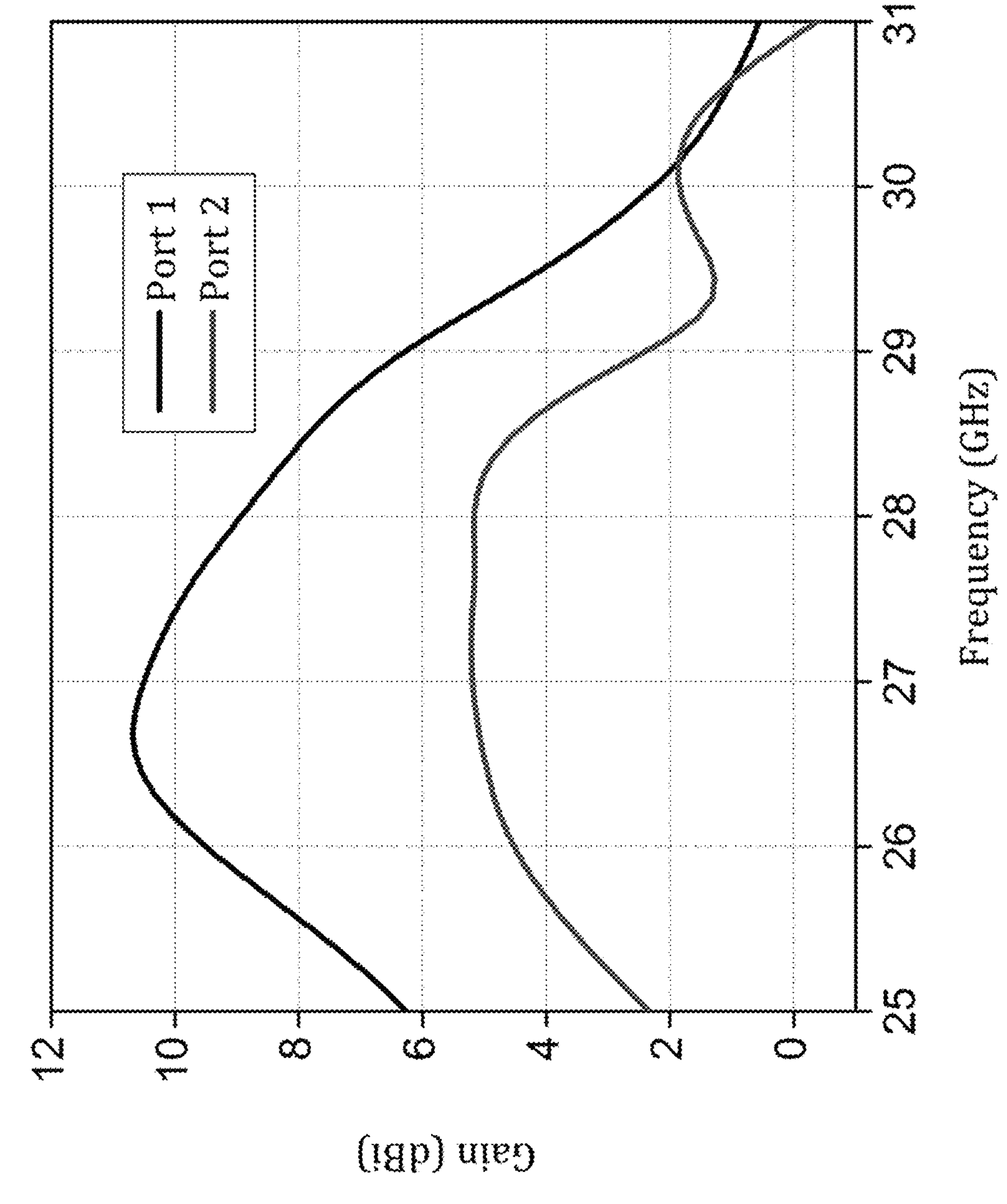
FIG. 40 is a graph illustrating broadside gain of the integrated antenna of FIG. 36*a*.

As demonstrated in FIGS. 38*a*, 38*b*, 39*a* and 39*b*, the integrated conformal antenna 3600 of FIG. 36*a* is useful for gain switchability. Gain switchability is further demonstrated in FIG. 40, which is a graph showing gain of each of the first and second port as a function of frequency. Activation the first port is shown to result in a relatively high gain, particularly at or above 9 dBi between 27-28 GHz. Activation of the second port is shown to result in a relatively low gain, particularly at or above 5.2 dBi between 27-28 GHz. A gain of the first port could be increased by increasing the number of radiating elements fed by the port while maintaining a fixed separation of half-wavelength between each radiating element. The same principle does not apply to the second port, meaning that the second port maintains a relatively low gain regardless of the number of radiating elements included. Thus the gain switchability of the design may be scalable according to the number of radiating elements provided.

Figure 41:
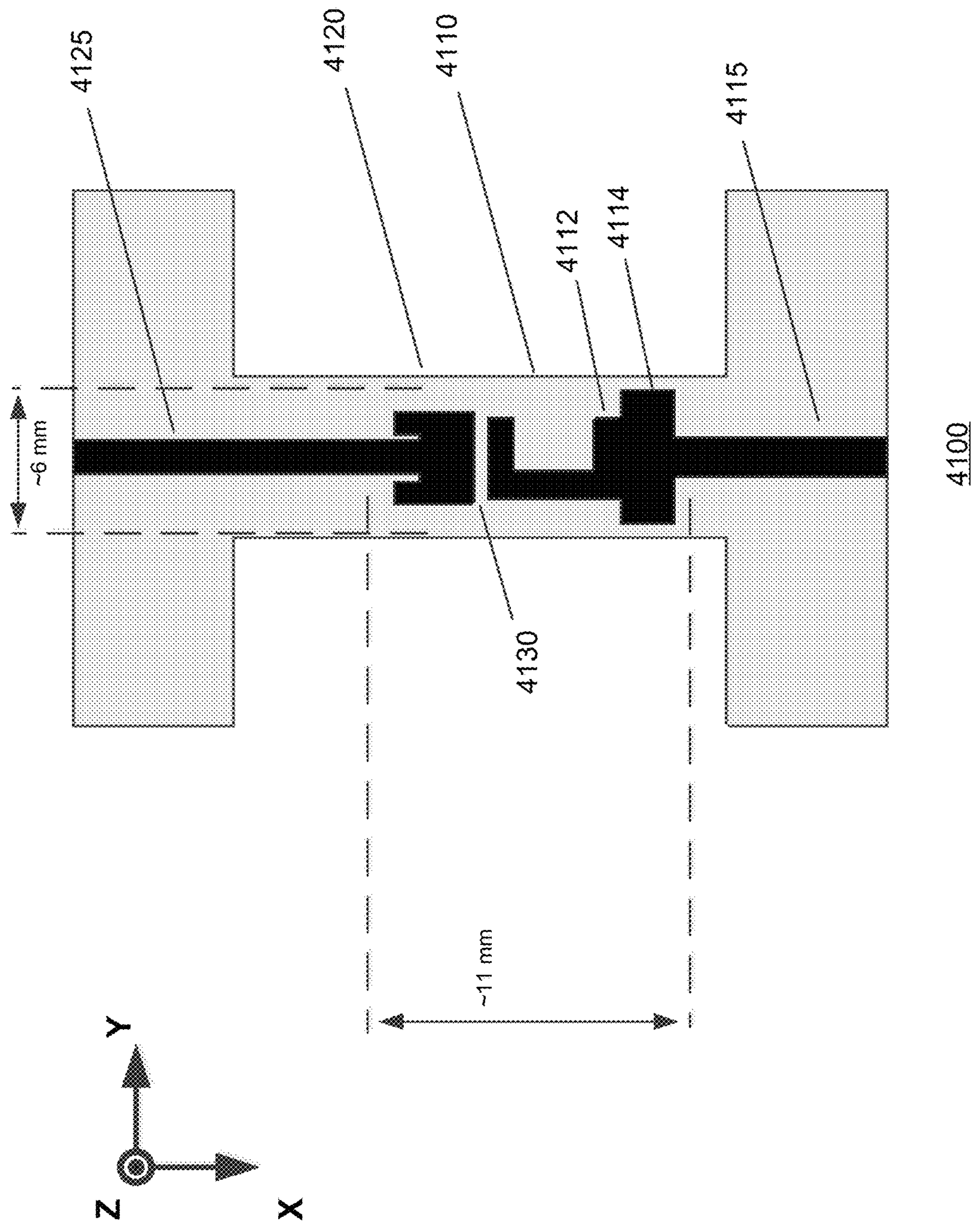
FIG. 41 is a schematic diagram of another example planar integrated antenna in accordance with another aspect of the disclosure.

FIG. 41 is a schematic of another example antenna module 4100 including a first radiating element 4110 and a second radiating element 4120. Each of the radiating elements is fed from a shared ground via a respective microstrip 4115, 4125 formed on a polycarbonate substrate having a dielectric constant of about 2.9 with a finite tolerance of about 0.02 within the 28 GHz band. The dielectric loss tangent of the substrate may be 0.01 or better. The thickness of the substrate may be about 0.5 mm, which strikes a balance between an acceptance physical footprint of the antenna module and a feasible size for fabricating the radiating elements. Overall, the cost of the antenna is significantly lower when compared to conventional substrates.

The first radiating element 4110 may be a broadside radiator for which radiation is dominantly Y-polarized. The microstrip feed line 4115 is a standard 50Ω line. Choosing a length of the feed line may be decided based on the tradeoff between the available physical space for the antenna module and insertion loss characteristics, whereby increasing length of the line would increase insertion loss causing slight decrease in the forward gain of the antenna being fed. It is assumed that the antenna system would be activated by an appropriate switch, depending on the application at hand Two impedance transformers 4112, 4114 are connected in series with the feed line 4115 in order to achieve impedance matching with the first radiating element 4110. In the example of FIG. 41, the first radiating element has a length of 7 mm in the X-axis direction and a width of 5 mm in the Y-axis direction. An overall width of the antenna module 4100 is greater than the width of the first radiating element by at least 0.5 mm, but may be small enough to fit within a panel height of a compact communication device, such as a modern commercial smartphone. In the example of FIG. 41, the antenna module width is about 6 mm.

The second radiating element 4120 may be an inset-fed patch antenna. The microstrip feed line 4125 is a standard 50Ω line. The dimensions of the radiating element 4120 may be the same as described in connection with FIGS. 34 and 36*a*, or they may be a reduced size, such as 3.4 mm in width (along the Y-axis) and 3.0 mm in length (along the X-axis). A reduced-size patch may be advantageous in the case of it being provided on a substrate having a relatively higher dielectric constant than in the examples of FIGS. 5 and 36*a*.

The width of the substrate could be as small as 3.4 mm without any loss of performance metrics of the antenna being fed by its respective port. Reducing the substrate, particularly at the non-radiating edges of the patch antenna 4120, does not significantly deteriorate the characteristics of the antenna. Additionally, since the patch is integrated with the orthogonally polarized antenna, the width of the substrate is ultimately dictated by the overall antenna module 4100.

A gap 4130 may be formed between the two antennas. The gap 4130 functions as a gap for the radiating edge of the second radiating element 4120. In the example of FIG. 41, the gap 4130 is about 0.5 mm. A wider gap may be possible, but placing the radiating elements any closer to one another may significantly disturb the radiating fields of the respective radiating elements due to mutual coupling between the two elements. This is a consideration particularly when one element is a patch antenna and the other is an orthogonally polarized antenna.

An overall size of the antenna module 4100 may be about 11 mm in length in the X-axis direction, including a clearance of at least 0.5 mm on each side, and 6 mm in width in the Y-axis direction. These dimensions constitute the "effective radiating aperture" of the antenna, and they may be sufficient to achieve dual-polarization or polarization diversity, regardless of a length of the feed lines 4115, 4125 connecting to the respective radiating elements 4110, 4120.

Figure 42:
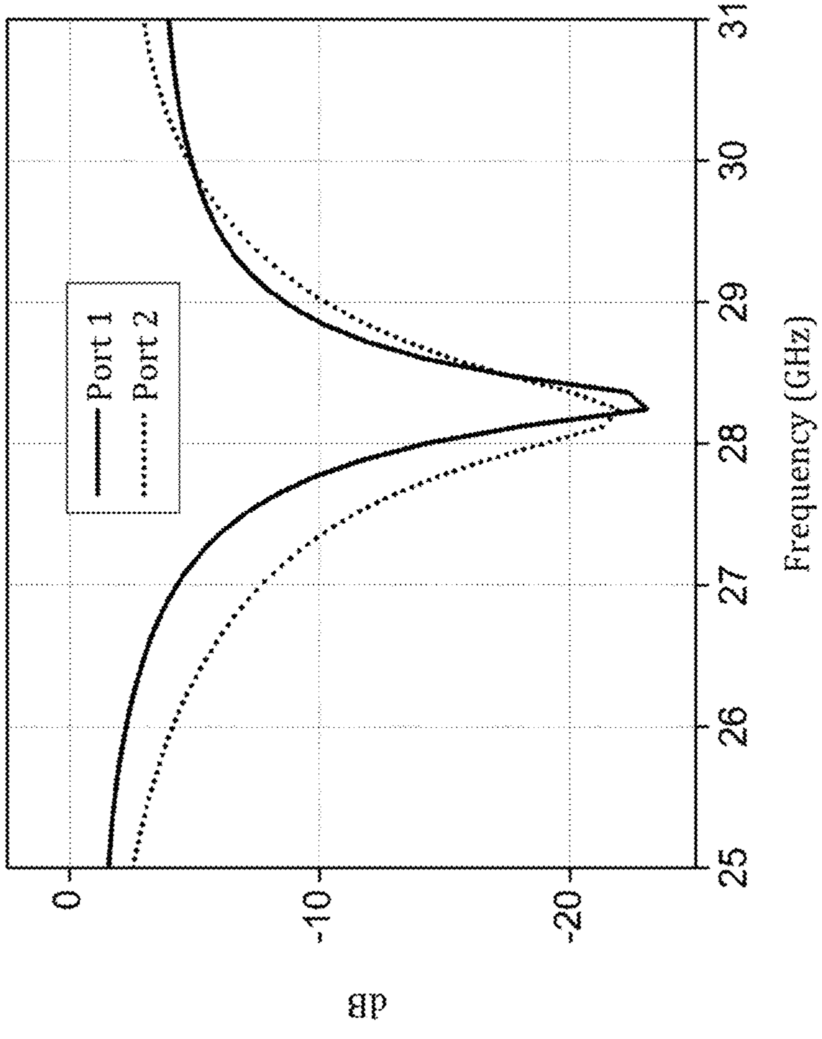
FIG. 42 is a graph showing input reflection coefficients of the planar integrated antenna of FIG. 41.

FIG. 42 is a graph showing input reflection coefficients at both ports of the antenna module 4100 of FIG. 41. A first port is connected to the first radiating element 4110, and a second port is connected to the second radiating element 4120. As shown in FIG. 42, the first port has an impedance bandwidth for which reflection is 10 dB or better between 27.78-28.86 GHz, which amounts to an FBW of 3.8%, and the second port has an impedance bandwidth for which reflection is 10 dB or better between 27.35-29.02 GHz, amounting to an FBW of 5.9%. The relatively narrow bandwidths exhibited by the antenna module ports could be attributed to the relatively small widths of the radiating elements, as they are sub-wavelength and approximately half of the operating wavelength. If each radiating element were designed as a stand-alone element, it would exhibit a higher impedance bandwidth, but sharing an integrated ground results and being in close proximity (e.g., 0.5 mm) to another radiating element lowers the impedance bandwidth due to the close proximity to the other radiating element. One way of increasing bandwidth beyond the values show in FIG. 42 is to provide a thicker substrate. Another way is to widen the substrate. Nonetheless, even without increasing the bandwidth, the design shown in FIG. 41 is suitable for narrow bandwidth applications at or around 28 GHz.

Figure 43:
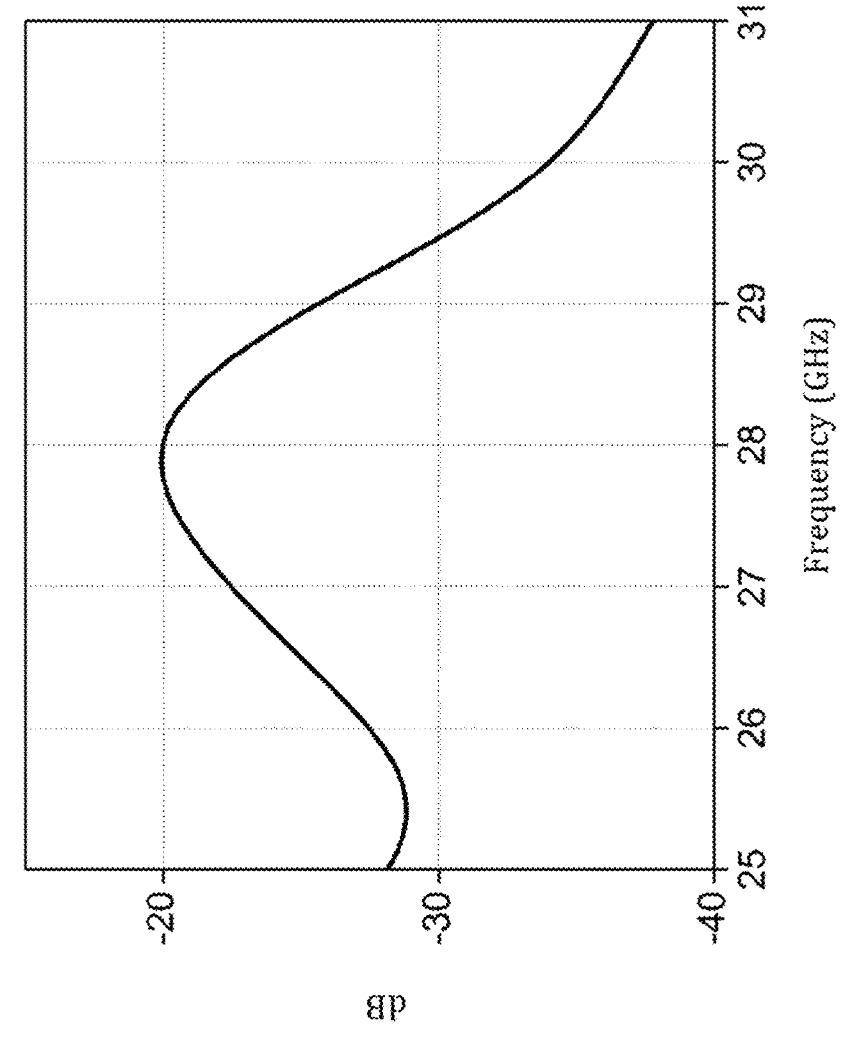
FIG. 43 is a graph showing mutual coupling between ports of the planar integrated antenna of FIG. 41.

FIG. 43 is a graph showing mutual coupling between the first and second ports as a function of operating frequency of the antenna module 4100 of FIG. 41. As can be seen from FIG. 43, the magnitude of mutual coupling between the ports remains 20 dB or less across an entire operating bandwidth of the antenna module, which of course includes 28 GHz. Since the respective radiating elements radiate in respective orthogonal polarizations—the first radiating element 4110 having Y-polarization and the second radiating element having X-polarization—mutual coupling between the elements is relatively low in spite of their proximity to one another. As the mutual coupling is 20 dB or less, deterioration of patterns due to mutual coupling is minimal.

Figure 44B:
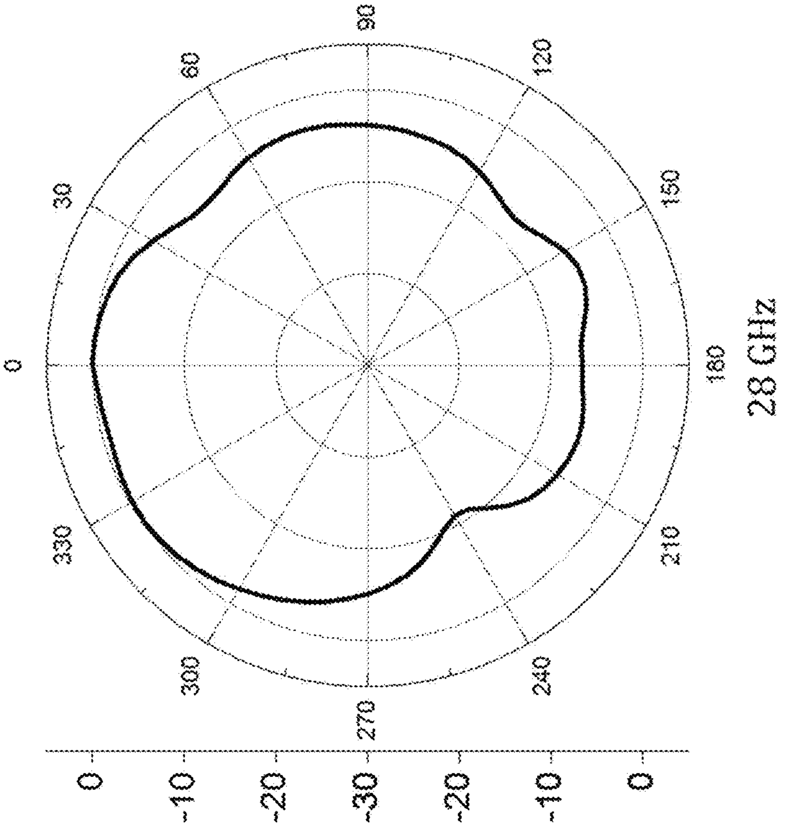
FIGS. 44*a* and 44*b* are radiation pattern graphs illustrating H-plane radiation patterns for a first port of the planar integrated antenna of FIG. 41.
Figure 44A:
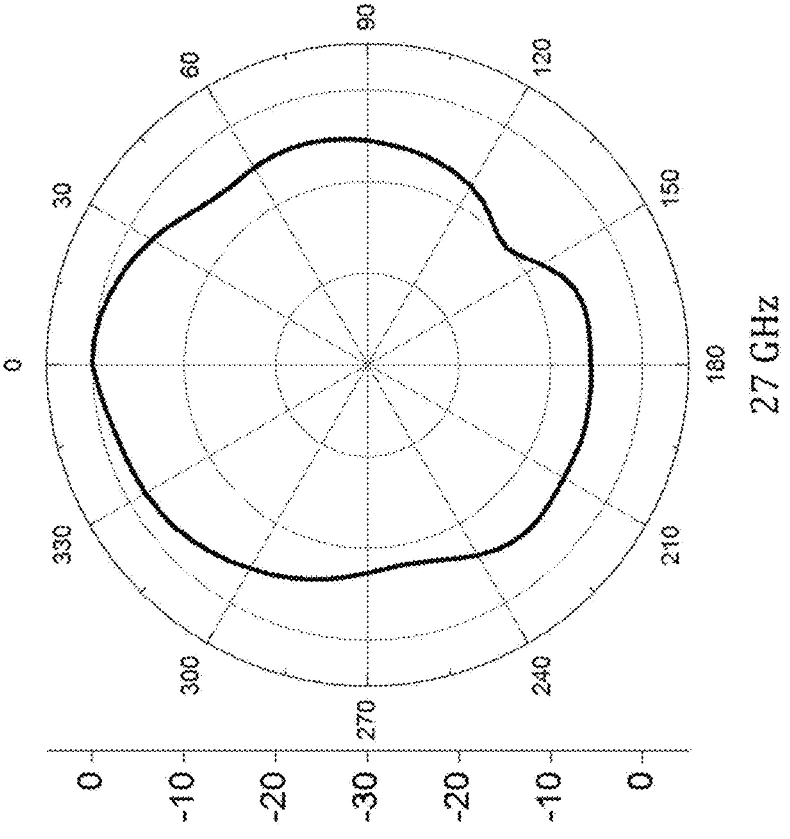

FIGS. 44*a* and 44*b* are graphs showing H-plane (XY plane) radiation patterns at 27 GHz and 28 GHz, respectively when the first port is switched on. In this case, the beamwidth is about 107°, which indicates that the antenna module maintains good angular coverage even after it is integrated with a mobile terminal or other compact device. Increasing substrate size, particularly width, could result in a narrower beamwidth. The front-to-back ratio is greater than 6 dB, which considering the electrically compact nature of the antenna module, is an improvement. Further improvements to front-to-back ratio could be achieved by enhancing the ground plane, although this may increase the overall size of the antenna system.

Figure 45B:
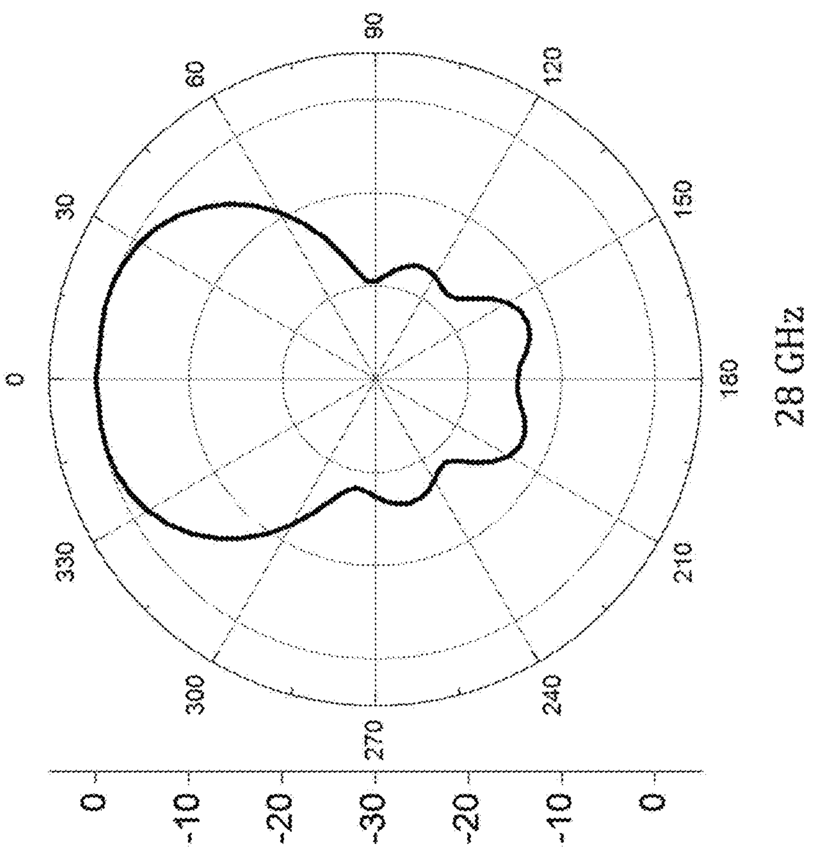
FIGS. 45*a* and 45*b* are radiation pattern graphs illustrating H-plane radiation patterns for a second port of the planar integrated antenna of FIG. 41.
Figure 45A:
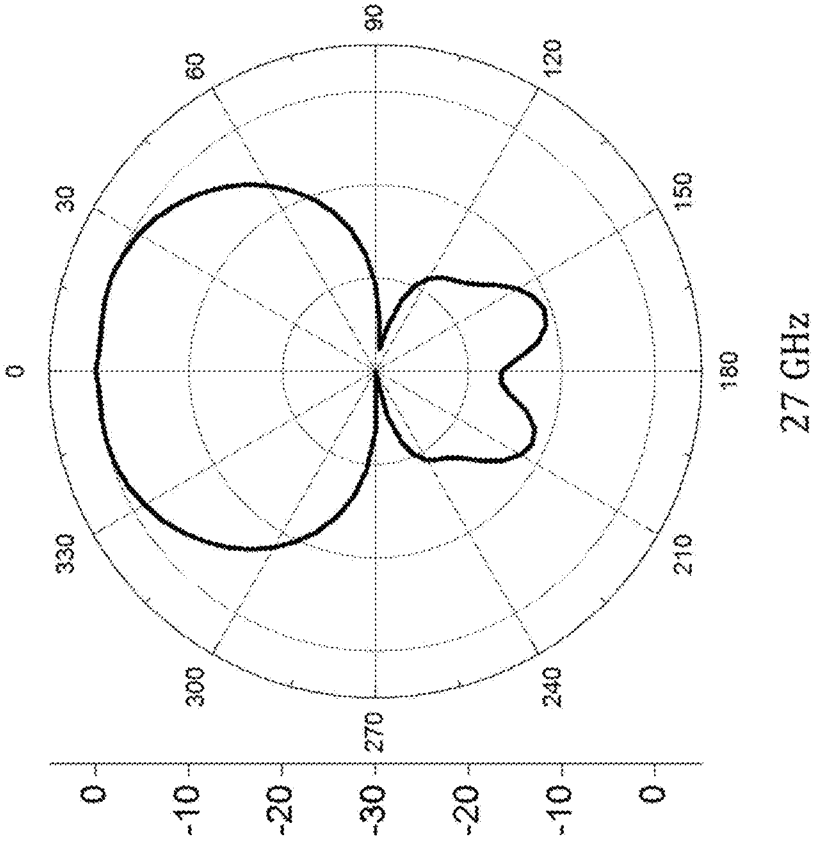

FIGS. 45*a* and 45*b* are graphs showing H-plane (XY plane) radiation patterns at 27 GHz and 28 GHz, respectively when the second port is switched on. In this case, the beamwidth is about 81°, which indicates that the antenna module maintains good angular coverage even after it is integrated with a mobile terminal or other compact device, whereby the beamwidth is comparable to that of a standard inset-fed patch antenna with microstrip feed. The front-to-back ratio is greater than 14 dB which considering the electrically compact nature of the antenna module, is an improvement, and means that when the second port is activated, radiation directed towards a use would be relatively low. Based on the data shown in FIGS. 44*a*, 44*b*, 45*a*, 45*b*, the radiating elements 4110, 4120 could be considered to share an angular coverage space of ±40° with respect to the boresight axis (Z-axis shown FIG. 41), which further demonstrates that the disclosed antenna system is indeed a dual-polarization or orthogonal polarization system within this angular space.

Figure 46:
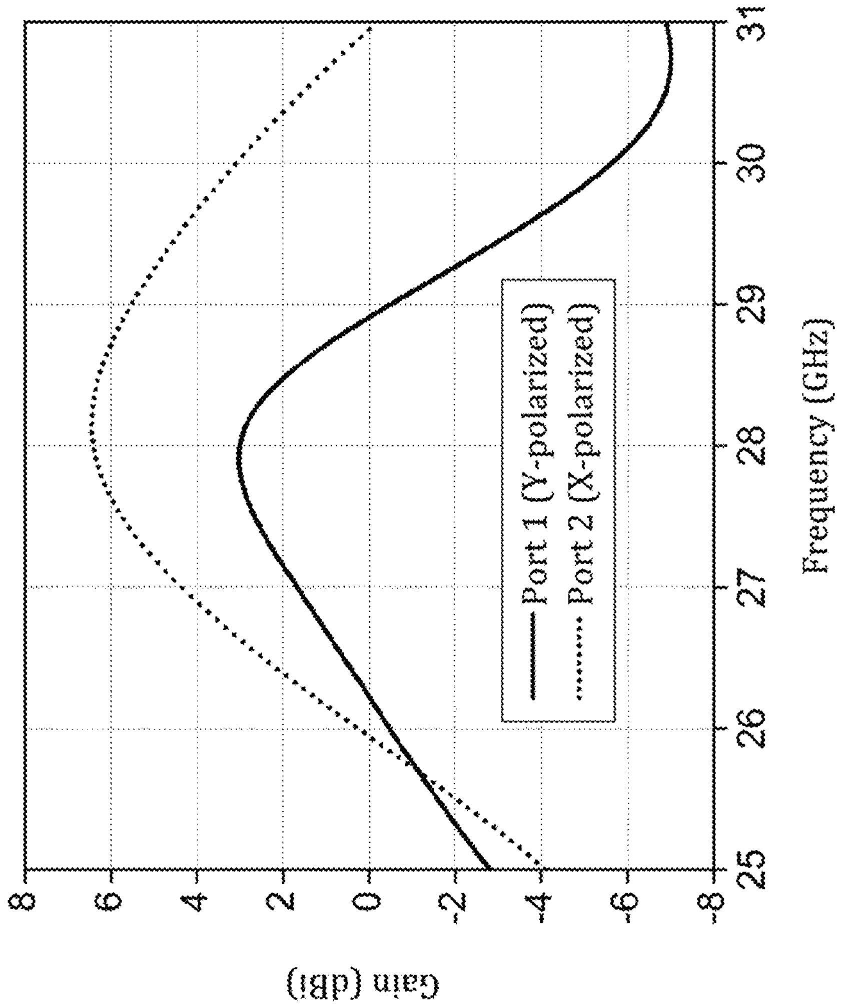
FIG. 46 is a graph illustrating broadside gain of the planar integrated antenna of FIG. 41.

FIG. 46 is a graph showing forward gains for the first and second ports of the antenna module 4100 of FIG. 41 for their respective polarizations. Forward gain of the first port is 3 dBi at the 28 GHz operating wavelength. Forward gain of the second port is 6.4 dBi at the same operating wavelength. Gains could be adjusted based on changes to antenna size, dielectric loss tangent of the substrate, or both. For instance, forward gain could be increased by as much as 1 dB by choosing a substrate with a lower dielectric loss tangent.

A notable advantage of the antenna module 4100 of FIG. 41 is that it achieves orthogonal polarization for two feed ports within the physical constraints of a mobile device housing without having to orient the first and second antennas in positions orthogonal to one another, as separate entities with impedance transformers and a corner-bending feed network. These factors all contribute adversely to the physical footprint of the antenna module, and are avoided in the example module of FIG. 41. Additionally, the design of FIG. 41 achieves dual-polarization while still using broadside radiators, which means that the dual-polarization is still achieved without use of end-fire antennas such as printed dipole or printed Yagi antennas. The polarization diversity achieved by the planar design of FIG. 41 improves data rate of an overall millimeter wave link, due to the fact that signals could be transmitted in both the polarizations, hence doubling the throughput of the system.

The antenna module 4100 of FIG. 41 relies on shared ground but does not offer orthogonal beams. This means that a mobile device including the antenna module 4100 may be limited in the orientations in which it may be held during operation. In order to provide an orthogonal beam to support operation in other orientations, such as a landscape orientation, a third antenna which radiates orthogonally with respect to the broadside radiation may be provided. With reference to FIG. 41, the third antenna may be positioned so that it radiates along the X-axis with a unidirectional beam.

Figures 47A, 47B:
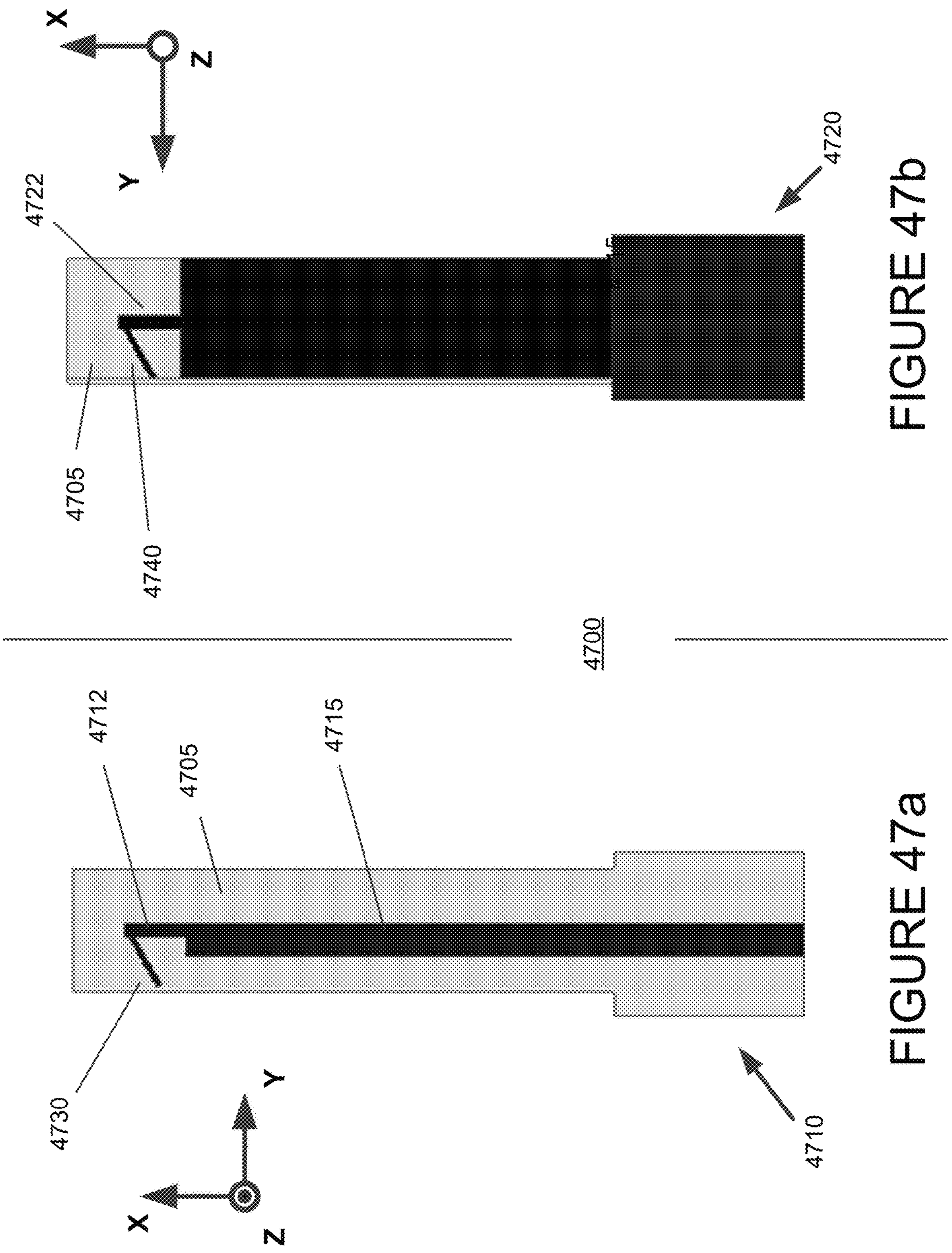
FIGS. 47*a* and 47*b* are cross-sectional top-view schematic diagrams of a planar antenna in accordance with another aspect of the disclosure.

FIGS. 47*a* and 47*b* show a schematic of an example third antenna 4700 that radiates orthogonally to the antenna module 4100 of FIG. 41. FIG. 47*a* shows a top-down view of the third antenna 4700, in which a substrate 4705 and top plane 4710 of the third antenna 4700 formed on a top surface of the substrate 4705 can be seen, and FIG. 47*b* shows a bottom-up view of the third antenna 4700, in which the substrate 4705 and a bottom plane 4720 formed on a bottom surface of the substrate 4705 can be seen. The bottom plane 4720 is positioned underneath the top plane 4710 in the Z-axis direction. Each of the top plane 4710 and bottom plane 4720 are made of conductive elements formed on the substrate 4705.

For example, in FIG. 47*a*, an electrically compact printed angled dipole radiator 4712 and a corresponding feed line 4715 are formed on the substrate 4705 and in the top plane. The substrate 4705 may be a polycarbonate substrate, and may be comparable to the substrate described in connection with FIG. 41. The dipole radiator 4712 may include a dipole arm 4730 positioned at an angle θ relative to the feed line 4715. In the example of FIG. 47*a*, the angle θ is about 30° with respect to the Y-axis perpendicular to the length of the feed line. A smaller angle has the advantage of avoiding the dipole arm from extending in the Y-axis direction farther than the overall width of the antenna, thus making the physical size of the dipole radiator 4710 suitable for placement in a device housing of mobile device, such as a modern smartphone device. The dipole arm 4730 may have a length and width that is shorter and narrower than the feed line 4715. For instance, in FIG. 47*a*, the dipole arm 4730 is shown to have a length of 2.1 mm and a width of 0.2 mm. The feed line 4715 may be a standard 50 Ω line, similar to the feed lines described in connection with FIG. 41.

FIG. 47*b* shows the bottom plane 4720 including a second diploe arm 4740. The bottom plane 4720 may be a ground plane, such that respective diploe arms 4730, 4740 are formed in each of the top plane and a ground plane. The two dipole arms may be positioned at the same angle. Also, the ground plane positioned underneath the feed line 4715 may be wider than the feed line 4715.

An overall length of the third antenna 4700 in FIGS. 47*a* and 47*b* is 26.85 mm, and an overall width is 4.55 mm. The effective radiating element of the third antenna 4700 may be designed within the constraints of the device housing. For instance, a radiating element having length 5 mm and width 4.55 mm, with a substrate thickness of 0.5 mm, could be fabricated and would not exhibit any significant loss in performance metrics of the antenna as compared to larger models.

Figure 48:
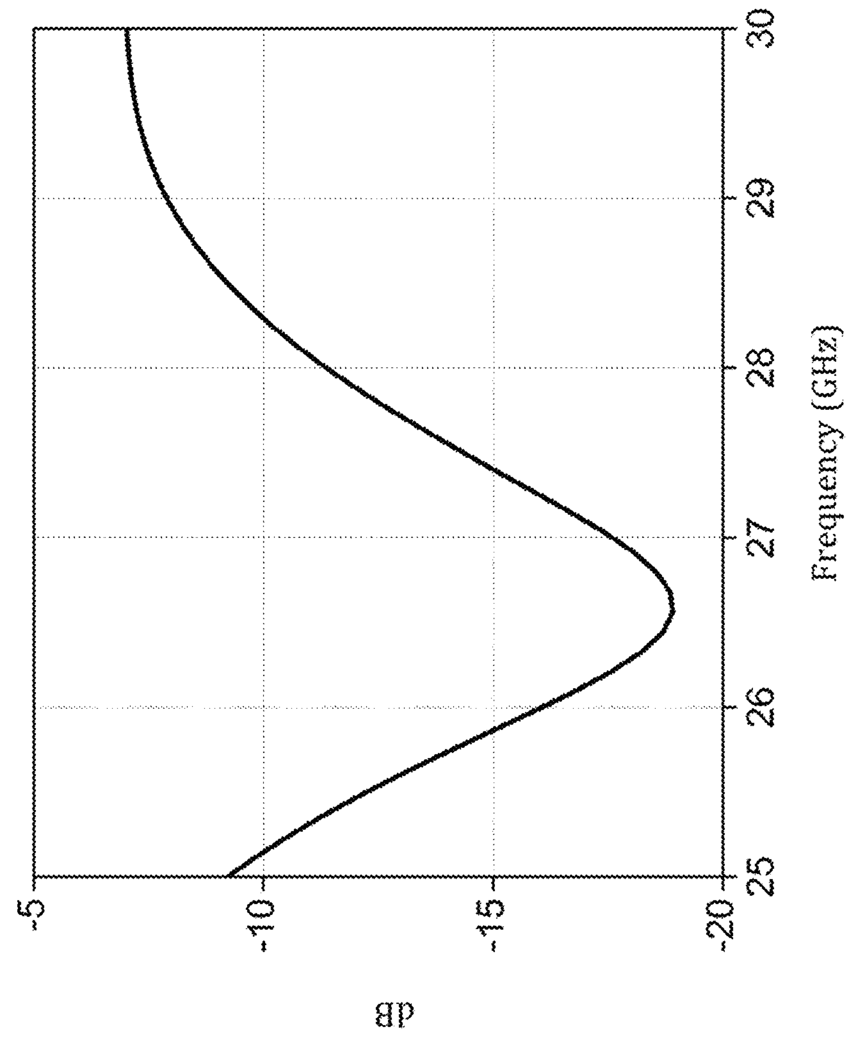
FIG. 48 is a graph showing an input reflection coefficient of the planar antenna of FIG. 47.

FIG. 48 is a graph showing an input reflection coefficient at a third port operatively connected to the third antenna 4700 of FIGS. 47*a* and 47*b*. As shown in FIG. 48, the first port has an impedance bandwidth for which reflection is 10 dB or better between 25.15-28.3 GHz, which amounts to an FBW of 11.8%, which is a relatively high FBW for an antenna of the given electrical dimensions.

Figure 49B:
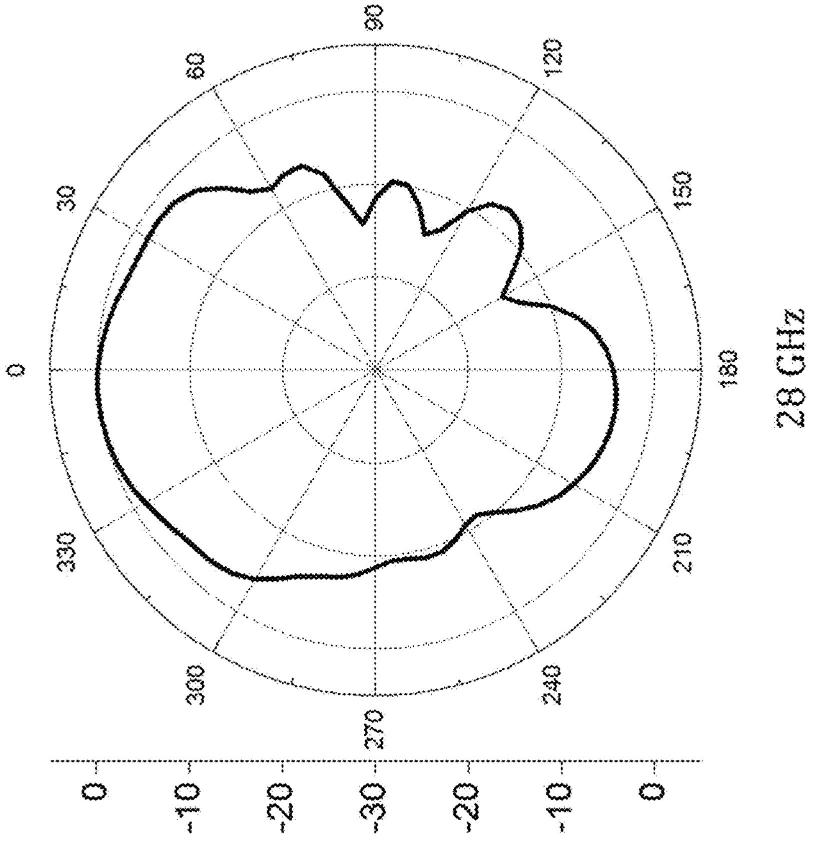
FIGS. 49*a* and 49*b* are radiation pattern graphs illustrating H-plane radiation patterns for the planar antenna of FIG. 47.
Figure 49A:
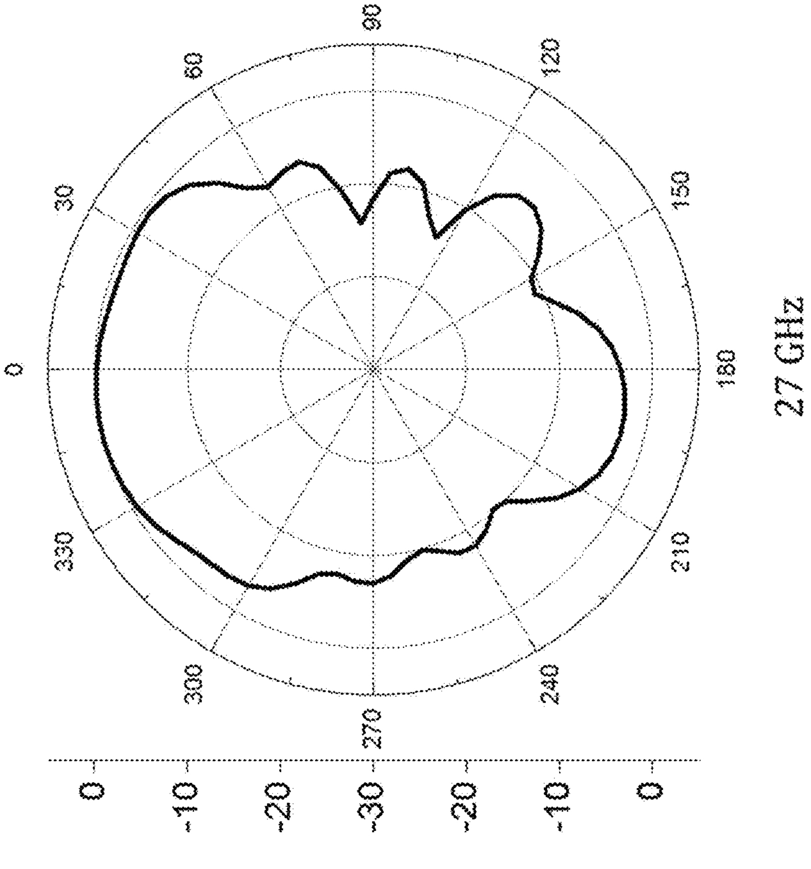

FIGS. 49*a* and 49*b* are graphs showing H-plane (XY plane) radiation patterns at 27 GHz and 28 GHz, respectively when the third port is switched on. In this case, the pattern demonstrates unidirectionality. Narrower beamwidth could alternatively be achieved by including increasing substrate size, particularly width, or integrating the third antenna with parasitics that are similar to Yagi technology, but the design of FIGS. 47*a* and 47*b* is advantageous in that it preserves compactness of the antenna design. In one example, the front-to-back ratio of the third port was found to be 4.5 dB.

Figure 50:
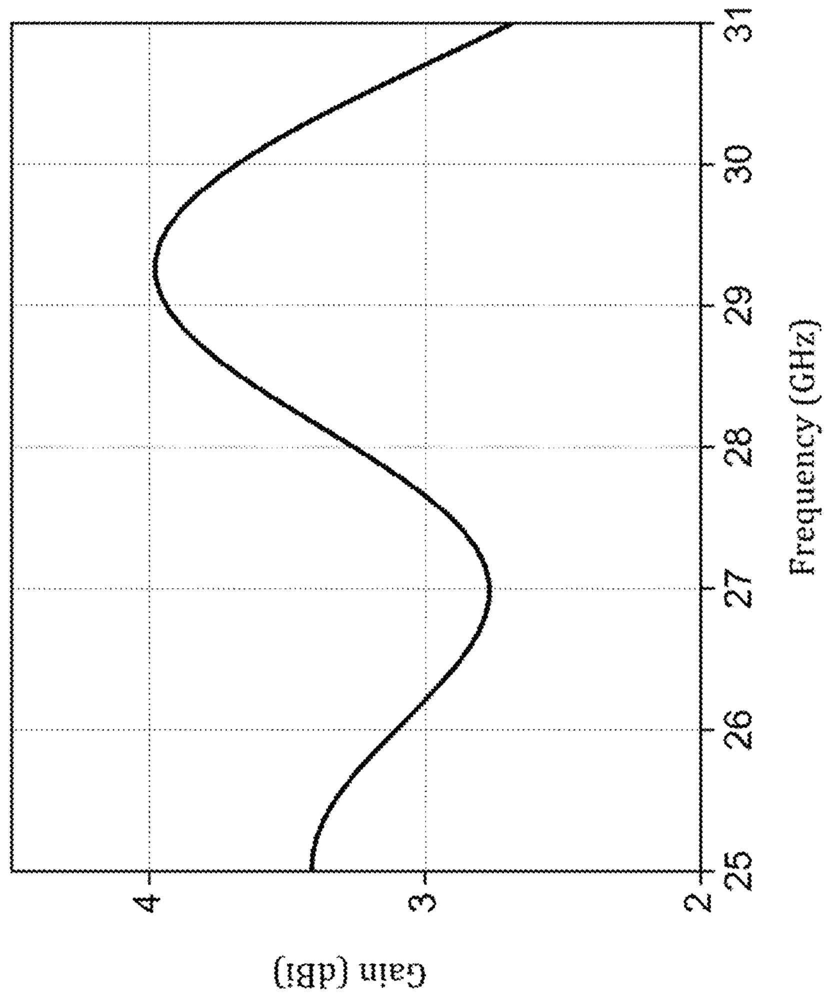
FIG. 50 is a graph illustrating broadside gain of the planar antenna of FIG. 47.

FIG. 50 is a graph showing forward gain for the third port. Forward gain of the third port is 3.2 dBi at the 28 GHz operating wavelength.

Figures 51A, 51B, 51C:
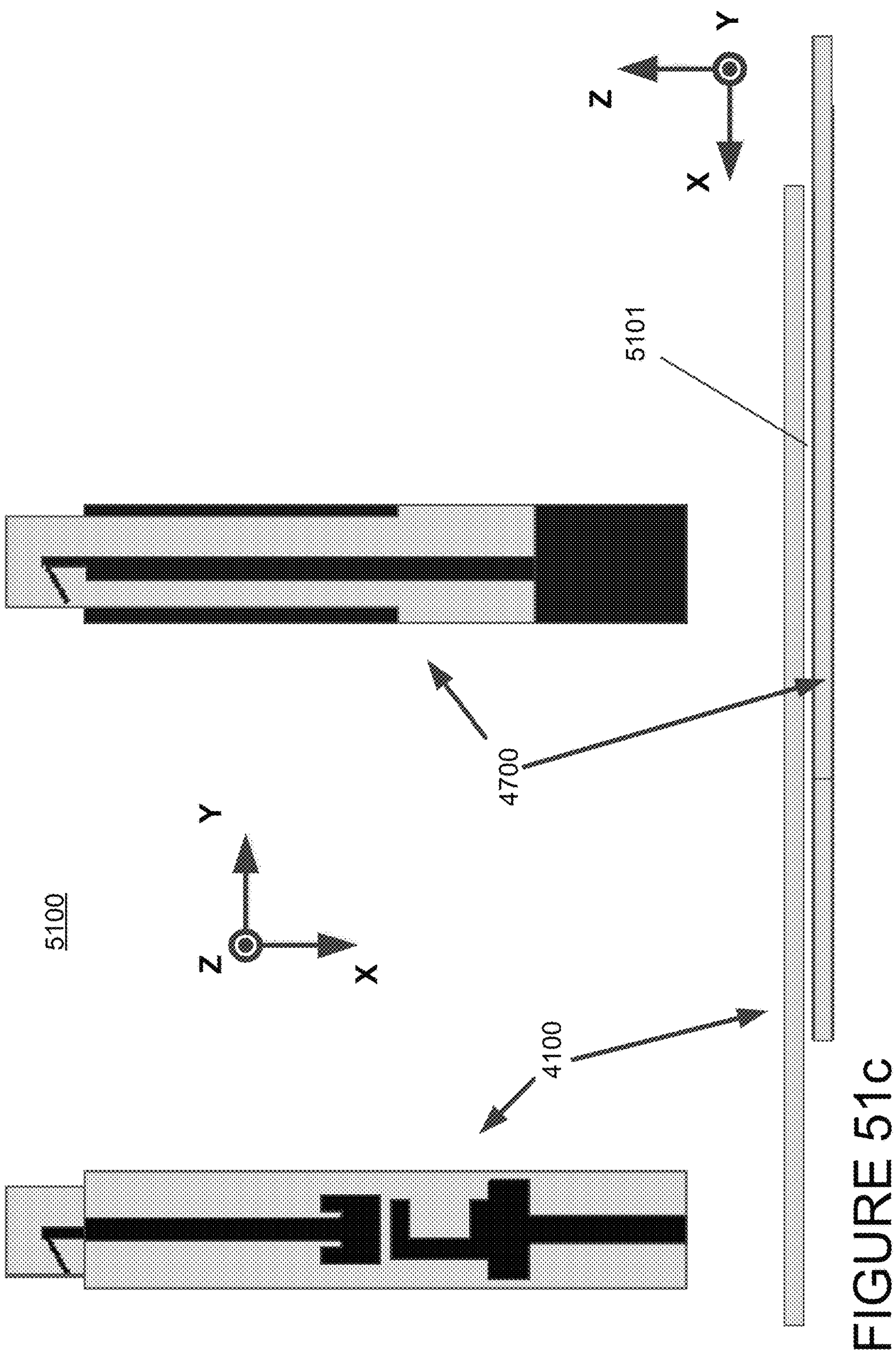
FIGS. 51*a* and 51*b* are cross-sectional top-view schematic diagrams of an example integrated planar three-port antenna system in accordance with an aspect of the disclosure.
FIG. 51*c* is a side view of the integrated planar three-port antenna of FIGS. 51*a* and 51*b*.

FIGS. 51*a*, 51*b* and 51*c* are schematics of a combined three-port antenna system 5100 including the antenna module 4100 of FIG. 41 and the third antenna 4700 of FIGS. 47*a* and 47*b*. As shown in FIG. 51*c*, the antenna module 4100 and the third antenna 4700 may be positioned in close proximity with one another and may be stacked vertically in the Z-axis direction with a partial offset in the X-axis direction. The vertical stack may be separated by a gap 5101. The gap may have a distance of 0.25 mm, which amounts to $0.02\lambda_0$ for an operating frequency of 28 GHz.

In the example of FIGS. 51*a*, 51*b* and 51*c*, overall dimensions of the three-port antenna system 5100 are 34.5 mm in the X-axis direction, 6 mm in the Y-axis direction, and 1.26 mm in the Z-axis direction, including the gap 5101 between the two components. These dimensions may be modified, provided that the resulting system would fit inside of the target device, such as a commercial smartphone. Excluding the feedlines would further reduce the length in the X-axis direction to 15 mm. Relative to $\lambda_0$ at 28 GHz, this would equal $1.4\lambda_0 \times 0.56\lambda_0 \times 0.11\lambda_0$.

Figure 52:
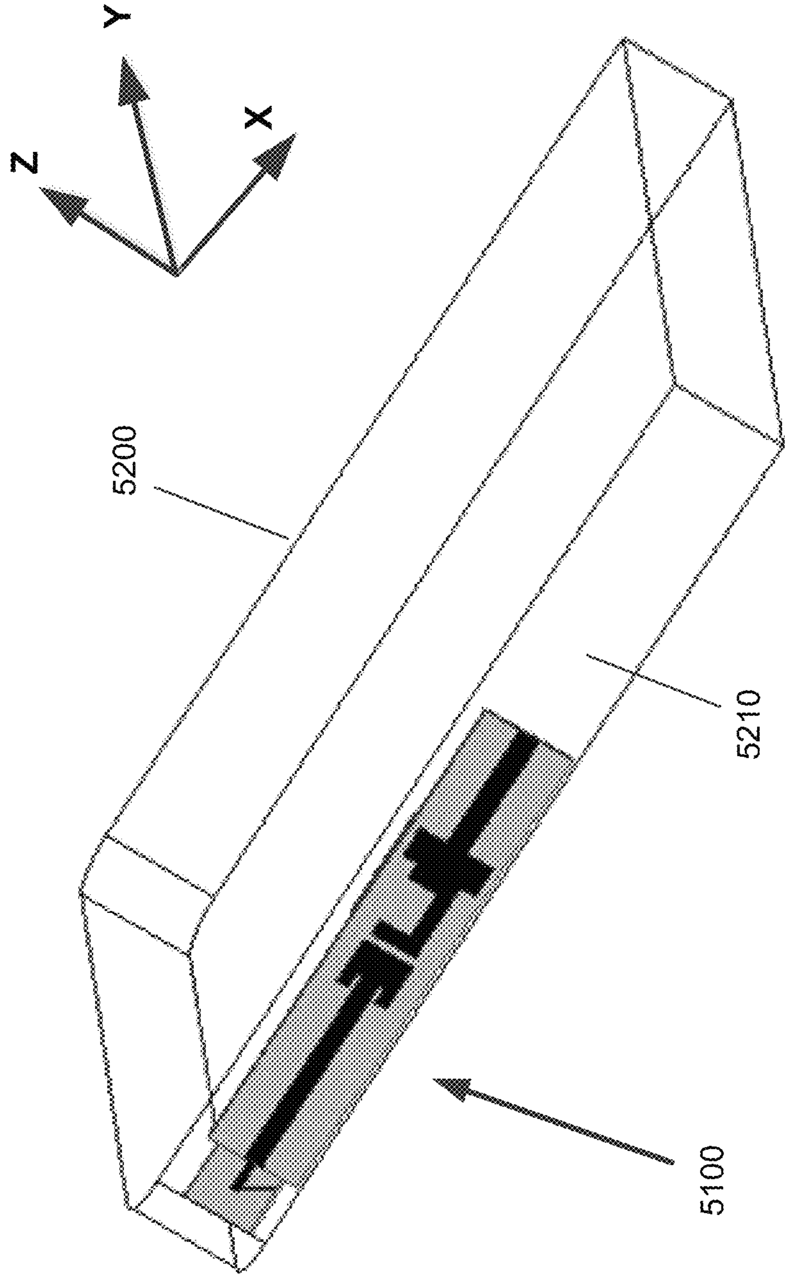
FIG. 52 is a perspective view of the integrated planar three-port antenna of FIGS. 51*a-c* conformed to a device housing.

FIG. 52 is a perspective view of an example placement of the three-port antenna system 5100 within a housing 5200 of a commercial smartphone. As can be seen in FIG. 52, the three-port antenna system 5100 is mounted along an edge 5210 of the smartphone housing 5200. This placement ensures that radiation is directed away from a user of the smartphone while the user engaged in a data mode with the smartphone.

In operation, each of the first and second ports of the three-port antenna system 5100 may be activated when the mobile device is rotated in a first orientation, such as landscape mode. Each of the first and second ports provides a different polarization. For instance, the first port may have a vertical polarization and the second port a horizontal polarization. For further example, the first port may have X polarization and the second port may have Z polarization. The third port may be activated when the device is in a second orientation, such as a portrait mode, and may have a polarization like that of the first port. Thus the first and second ports may offer a polarization diversity in the landscape mode, and the third port may offer orthogonal pattern diversity in the portrait mode.

Figure 53:
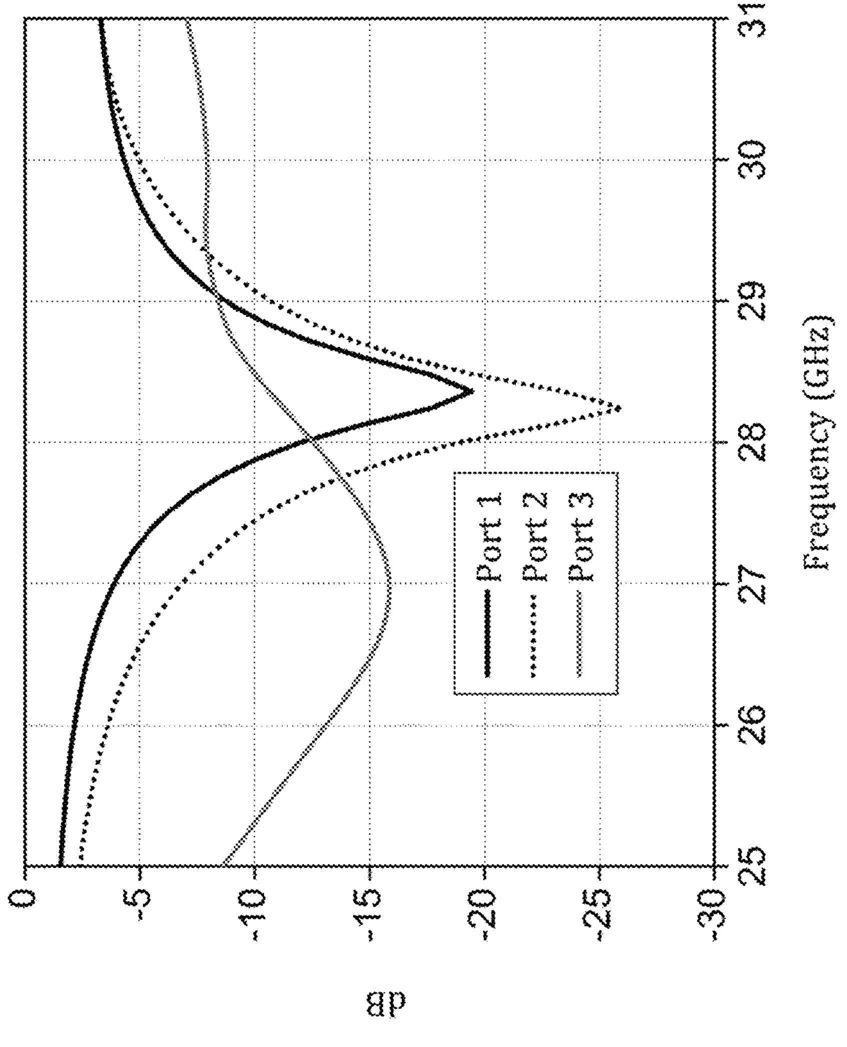
FIG. 53 is a graph showing input reflection coefficients of the integrated planar three-port antenna of FIGS. 51*a-c*.

FIG. 53 is a graph showing input reflection coefficients at all three ports of the three-port antenna system 5100 of FIG. 51. As shown in FIG. 53, the first port has an impedance bandwidth for which reflection is 10 dB or better between 27.8-28.8 GHz, which amounts to an FBW of 3.5%, the second port has an impedance bandwidth for which reflection is 10 dB or better between 27.45-29.07 GHz, amounting to an FBW of 5.7%, and the third port has an impedance bandwidth for which reflection is 10 dB or better between 25.3-28.5 GHz, amounting to an FBW of 11.8%. These figures are largely comparable to the figures shown in previous FIGS. 42 and 48, demonstrating that the impedance characteristics of the two components 4100, 4700 of the three-port antenna system 5100 are not affected by one another despite the proximity between the components.

Figure 54:
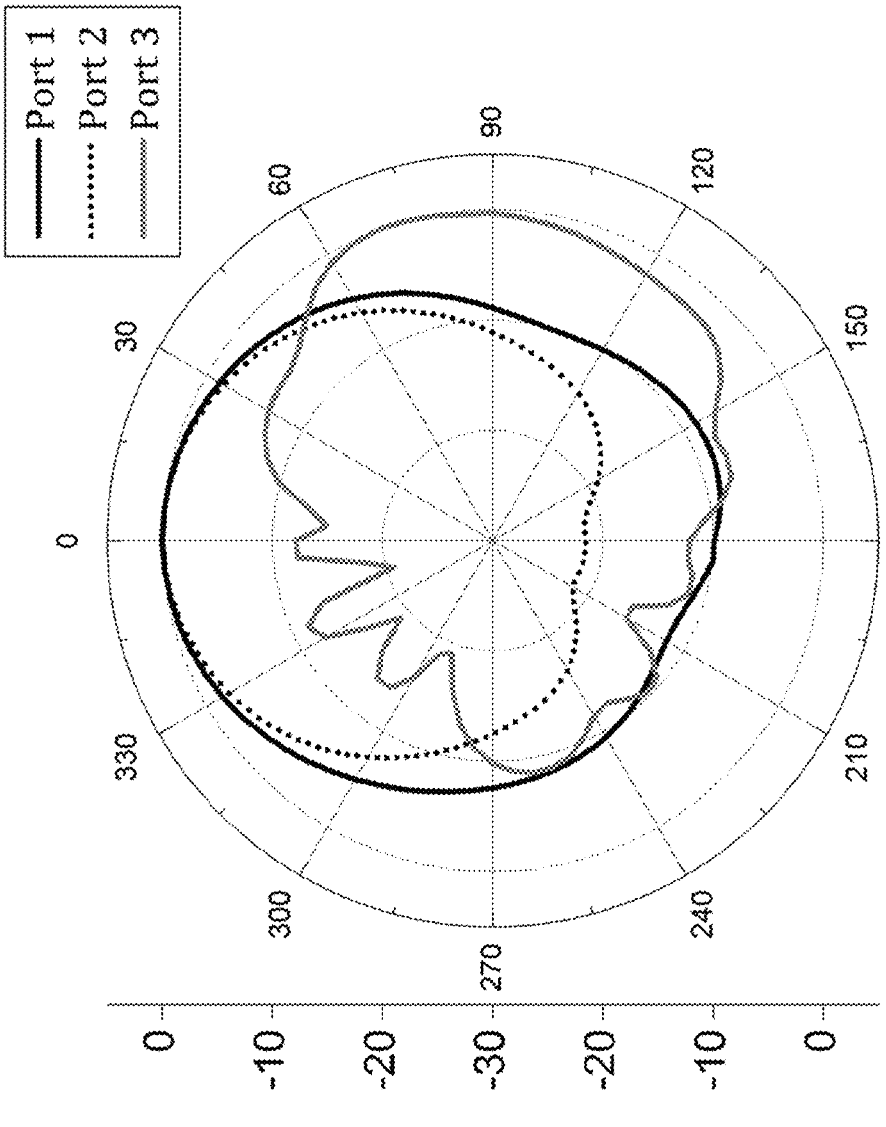
FIG. 54 is a radiation pattern graph illustrating H-plane radiation patterns of the integrated planar three-port antenna of FIGS. 51*a-c*.
Figure 55A:
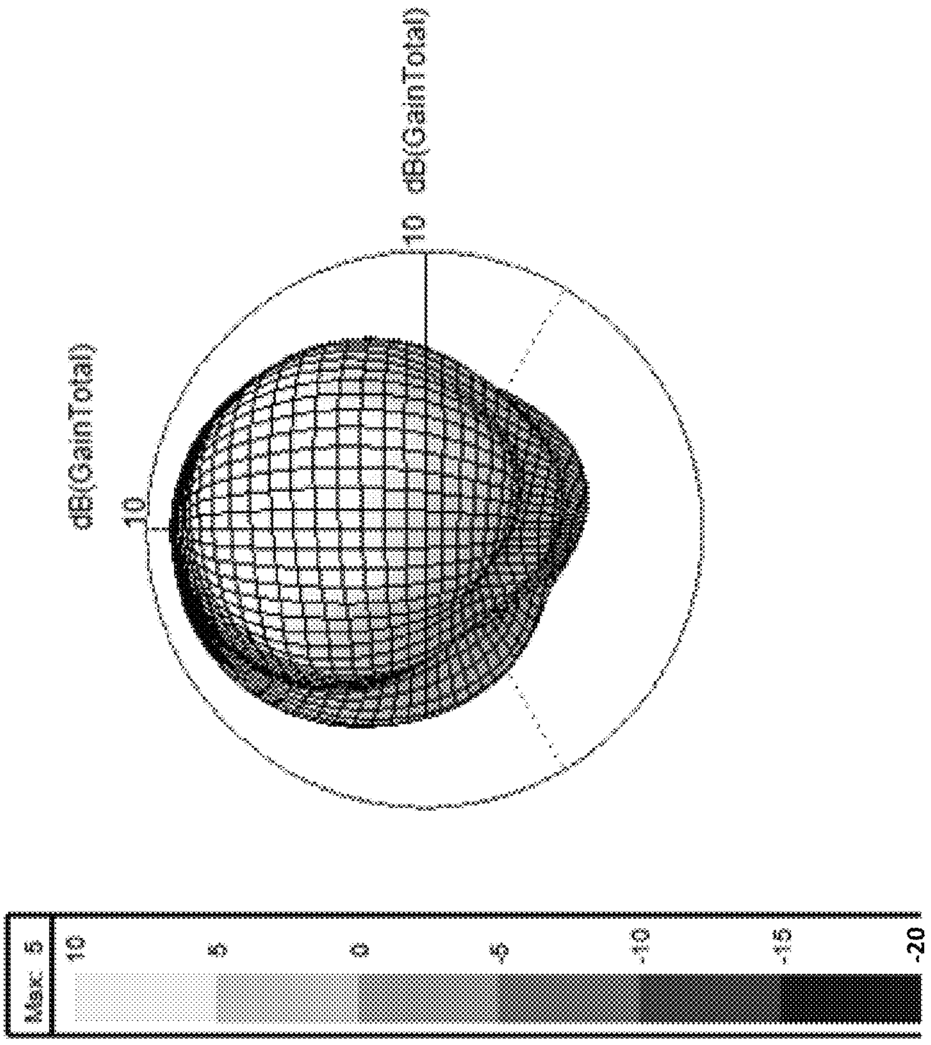
FIGS. 55*a*, 55*b* and 55*c* are radiation pattern graphs illustrating three-dimensional radiation patterns of individual radiating elements of the integrated planar three-port antenna of FIGS. 51*a-c*.
Figure 55B:
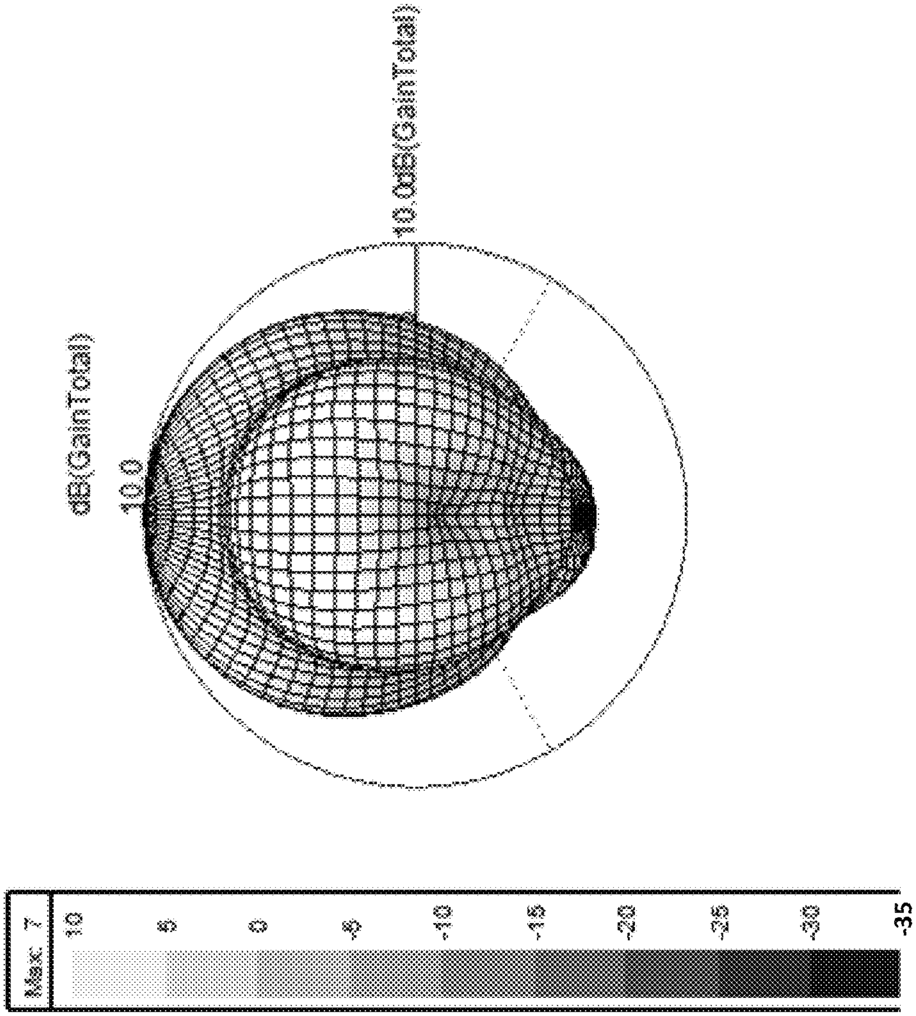
Figure 55C:
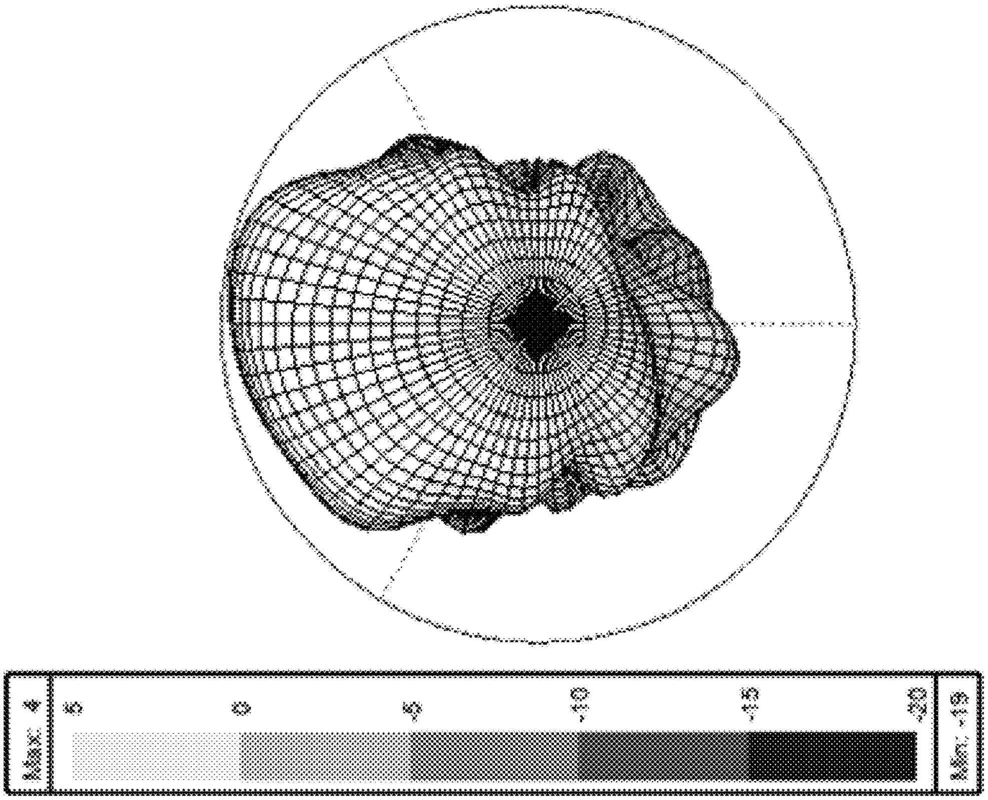

FIG. 54 is a graph showing radiation patterns at 28 GHz for excitation of each of the first, second and third ports. It can be seen from FIG. 54 that the radiation pattern associated with each port is unidirectional, indicating that minimal radiation is directed towards the user when the antenna system is oriented properly within the user's device, such as by being integrated within an edge panel of a mobile device or smartphone. For added illustration, FIGS. 55*a*, 55*b* and 55*c* show three-dimensional radiation patterns of the individual radiating elements. Unidirectional behavior is also demonstrated by these images.

Figure 56:
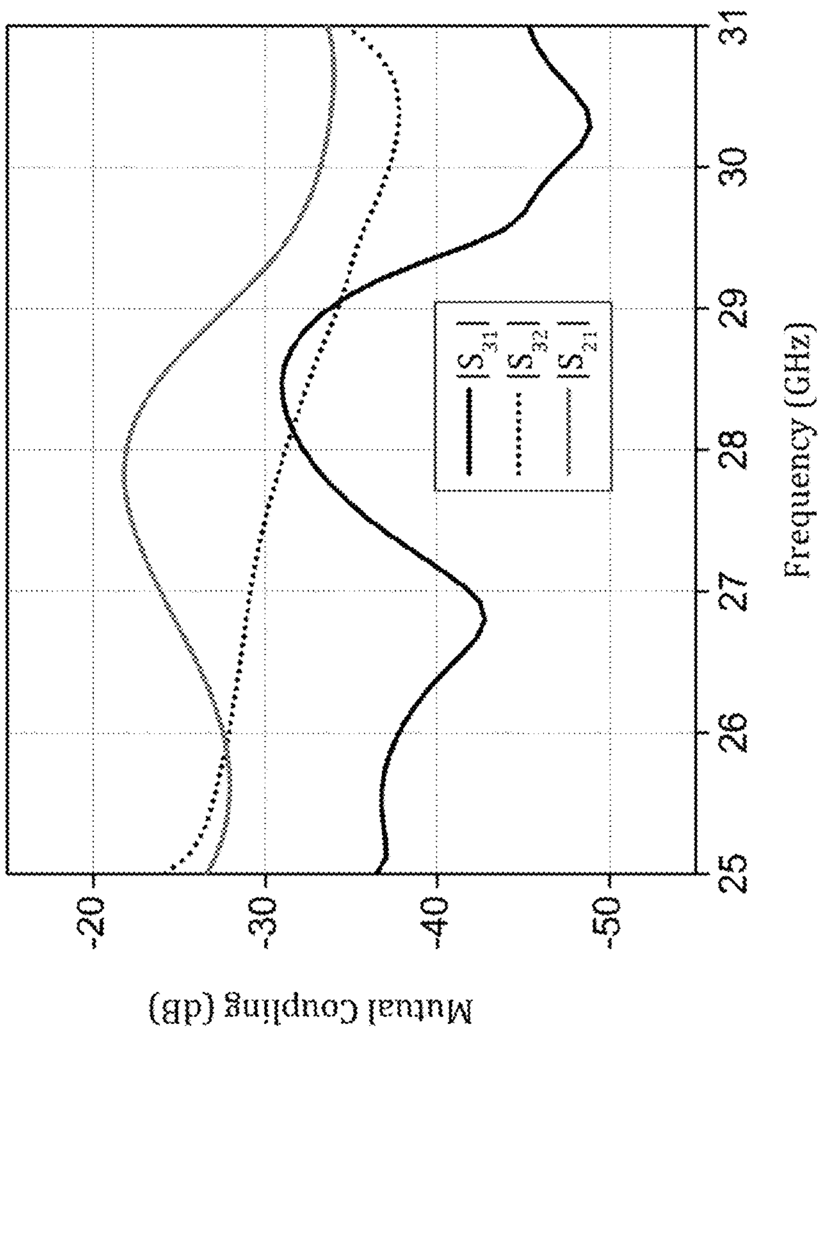
FIG. 56 is a graph showing mutual coupling between ports of the integrated planar three-port antenna of FIGS. 51*a-c*.

FIG. 56 is a graph showing mutual coupling between each pair of ports in the antenna system 5100. As can be seen from FIG. 56, mutual coupling is less than 20 dB across the operational bandwidth and beyond for each pair of radiating elements of the system. This confirms that the orthogonality of the respective radiators keeps the mutual coupling between ports relatively low.

Figure 57:
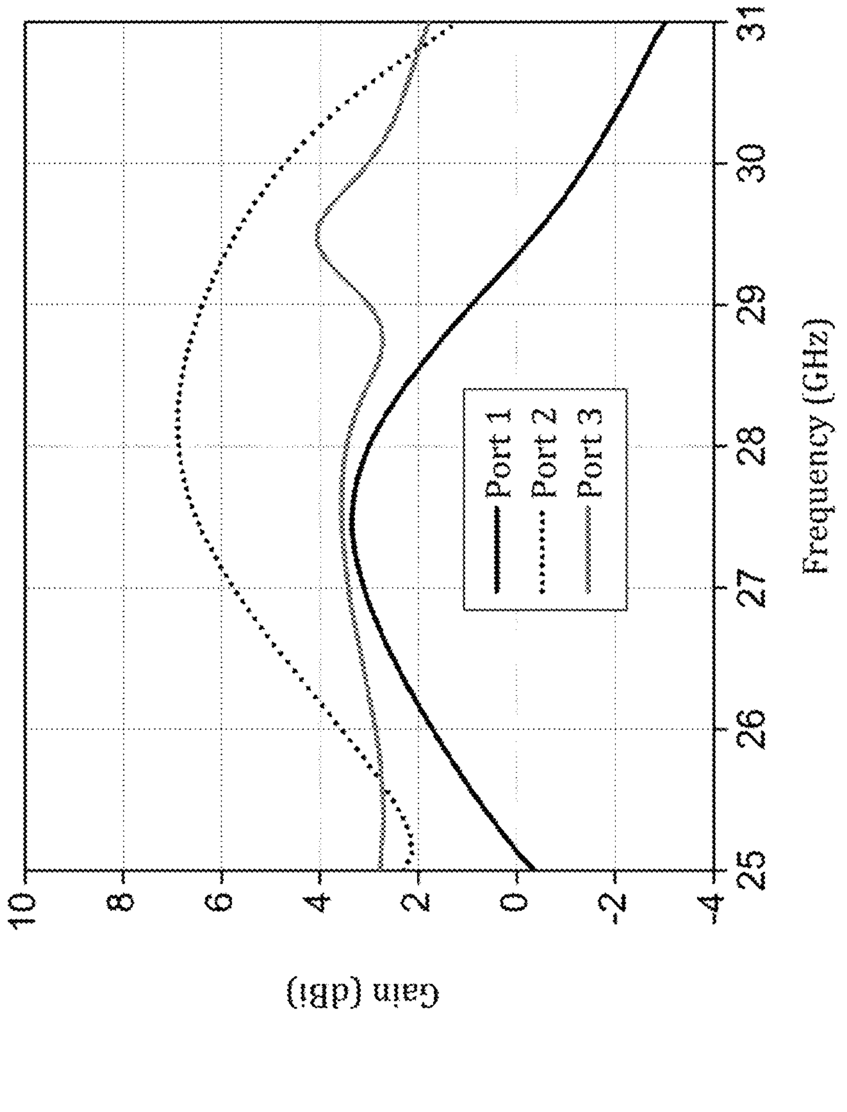
FIG. 57 is a graph illustrating broadside gain of the integrated planar three-port antenna of FIGS. 51*a-c*.

FIG. 57 is a graph showing forward gains for each of the three ports of the antenna system 5100. As can be seen from FIG. 57, the forward gain of the first port is 3.3 dBi, forward gain for the second port is 3 dBi, and forward gain for the third port is 6.5 dBi at the 28 GHz operating wavelength. These figures are largely comparable to the figures shown in previous FIGS. 46 and 50, demonstrating that the forward gain of the two components 4100, 4700 and beam integrity of the three-port antenna system 5100 is not affected by one another despite the proximity between the components.

The illustrations of the above examples generally show long feed lines, and some illustrations also show protrusions at the ends of the substrates for mounting end launch connectors. It should be understood that these features are optional and may be omitted from other example designs without significantly affecting performance of the designed antenna modules and systems. Additionally, the illustrations generally do not show switches and control circuitry. However, it should be understood that each port of the subject antenna systems and modules may be connected to a respective switch or switches, and that the switches may be controlled by control circuitry, such as one or more microcontrollers, in order to control activation of the respective ports. For instance, the control circuitry could be used for controlling switching between high gain and low gain elements, depending on an orientation of the subject device, or both. In one such example, a handheld device may include one or more processors for controlling switching between the different antenna elements of the integrated conformal antenna. The one or more processors may receive instructions or indications about the handheld device, such as an orientation of the device or a type of operation to be executed (e.g., data transfer, broadcast, beamforming, etc.). In turn, the one or more processors may determine which of the antenna elements to excite based on the instructions or indications. For example, the processors may select between the first or second antenna elements based on an orientation of the handheld device. For further example, the processors may select between the second or third antenna elements based on whether a high gain or low gain application is being performed. Other processing device and controller arrangements may be designed in order to achieve the advantages of the antennas described herein.

The above examples generally show radiating elements designed to operate at 28 GHz. This operating frequency is particularly advantageous for 5G communication applications, although other microwave frequencies could be supported by the same or similar example radiator designs.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An apparatus comprising:
- a planar substrate including a fold extending along a lateral axis, wherein the fold divides the planar substrate between a first portion and a second portion;
- a first port formed at an end of the planar substrate on the first portion of the substrate;
- a second port formed at the end of the planar substrate on the first portion of the substrate;
- a first antenna coupled to the first port and comprising:
  - a plurality of first radiator elements formed on the second portion of the substrate,
- wherein the plurality of first radiator elements form a phased array antenna; and
  - a network of first feed lines connecting the first port to the plurality of first radiator elements; and
- a second antenna coupled to the second port,
- wherein the first antenna is configured to operate at a millimeter-wave operating frequency band, and
- wherein the second antenna is a wideband antenna and includes:
  - a second radiator formed on the second position of the substrate;
  - a second feed line extending in a longitudinal direction and connecting the second port to the one or more second radiators; and
  - one or more stubs coupled to the second feed line and adapted to increase a fractional input impedance bandwidth of the second antenna.

2. The apparatus of claim 1, wherein the millimeter-wave operating frequency band includes 28 GHz.

3. The apparatus of claim 1, wherein the fold is at a 90-degree angle, and wherein the apparatus is adapted to be integrated within a casing of a handheld device.

4. The apparatus of claim 1, wherein the first antenna has at least one of:
- a fractional input impedance bandwidth of about 10%; or
- a front-to-back radiation ratio of 10 dB or greater within the operating frequency band.

5. An apparatus comprising:
- a planar substrate including a fold extending along a lateral axis, wherein the fold divides the planar substrate between a first portion and a second portion;
- a first port formed at an end of the planar substrate on the first portion of the substrate; and
- a first antenna coupled to the first port and comprising:
  - one or more first radiator elements formed on the second position of the substrate; and
  - one or more first feed lines connecting the first port to the one or more first radiator elements,
- wherein the first antenna is configured to operate at a millimeter-wave operating frequency band, wherein the one or more first radiators is a single radiator and a single first feed line, and wherein the first antenna is a wideband antenna including one or more stubs coupled to the single first feed line and adapted to increase a fractional input impedance bandwidth of the first antenna.

6. The apparatus of claim 5, wherein the first antenna has at least one of:
- a fractional input impedance bandwidth of about 13%; or
- a front-to-back radiation ratio of 10 dB or greater within the operating frequency band.

7. The apparatus of claim 1, wherein the second radiator is configured to radiate in a direction perpendicular to the longitudinal direction.

8. The apparatus of claim 1, wherein a spacing between the first antenna and the second antenna is on the order of 1 millimeter, and wherein a mutual coupling between the first antenna and the second antenna less than 20 dB across the operating frequency band.

9. The apparatus of claim 1, further comprising:
- a third port formed at a side of the planar substrate on the second portion of the substrate; and
- a third antenna coupled to the third port and comprising:
  - one or more third radiator elements formed on the second position of the substrate; and
  - one or more third feed lines connecting the third port to the one or more third radiator elements.

10. The apparatus of claim 9, wherein a spacing between the first antenna and the third antenna is on the order of 1 millimeter, and wherein a mutual coupling between the first antenna and the third antenna is less than 20 dB across the operating frequency band.

11. The apparatus of claim 9, wherein a gain of the second antenna within the operating frequency band is more than double a gain of the third antenna.

12. The apparatus of claim 9, further comprising a radome including a casing made of a dielectric material, wherein the casing is adapted to cover each of the plurality of first radiator elements, the second radiator element and the one or more third radiator elements.

13. The apparatus of claim 12, wherein the casing includes an upper surface and a lower surface encasing each of the first radiator elements, the second radiator element and the one or more third radiator elements, wherein the upper surface further includes:
- a first portion having a first thickness and positioned over the first antenna and the third antenna; and
- a second portion having a second thickness less than the first thickness and positioned over the second antenna.

14. The apparatus of claim 12, wherein the casing has at least one of:
- a dielectric constant of about 2.75;
- a dielectric loss tangent of about 0.01; or
- a surface resolution of about 200 μm or less.

15. The apparatus of claim 1, further comprising a second fold parallel to the fold and further dividing the substrate into first, second and third portions, wherein the second portion is between the first and third portions, and wherein each of the radiator elements is in the second portion.

16. The apparatus of claim 1, wherein a height of the second portion in a direction perpendicular to the lateral axis is 6 mm or fewer.

17. A mobile device comprising:

a housing; and an apparatus according to claim 1, wherein the fold included in the substrate of the apparatus is adapted to conform to a corner of the housing.

18. The mobile device of claim 17, further comprising a processor configured to:

receive an indication of an orientation of the mobile device being one of a first orientation or a second orientation;

transmit and receive signals between the mobile device and a base station using the first antenna when the indicated orientation of the mobile device is the first orientation; and transmit and receive signals between the mobile device and the base station using the second antenna when the indicated orientation of the mobile device is the second orientation.

19. The mobile device of claim 18, wherein the first orientation is a portrait orientation, and wherein the second orientation is a landscape orientation.

20. The mobile device of claim 18, wherein the processor is further configured to:

receive a first instruction to perform a data transfer or point-to-point link operation;

in response to the first instruction, excite the second port to perform the data transfer or point-to-point link operation using the second antenna;

receive a second instruction to perform a broadcast operation; and in response to the second instruction, excite the third port to perform the data transfer or point-to-point link operation using the third antenna.

21. An apparatus comprising:

a planar substrate;

a first port formed on the planar substrate;

a first antenna formed on the planar substrate and coupled to the first port, wherein the first antenna is a phased array antenna comprising a plurality of first radiator elements and a network of first feed lines connecting the first port to each of the plurality of first radiator elements;

a second port formed on the planar substrate;

a second antenna formed on the planar substrate and coupled to the first port, wherein the second antenna comprises at least one second radiator element and a second feed line connecting the second port to the at least one second radiator element, wherein the at least one second radiator element and one of the plurality of first radiator elements are configured to form a shared radiator, wherein the shared radiator is configured to provide a flow of energy from the at least one second radiator element to the plurality of first radiator elements, and wherein each of the first and second antennas is configured to operate at a millimeter-wave operating frequency band.

22. The apparatus of claim 21, wherein the millimeter-wave operating frequency band includes 28 GHz.

23. The apparatus of claim 21, wherein each of the plurality of first radiator elements and the at least one second radiator element is an inset-fed patch antenna element.

24. The apparatus of claim 21, wherein the first plurality of the network of first feed lines is configured to split power from the first port approximately equally among the plurality of first radiator elements, and wherein the flow of energy from the at least one second radiator element is provided through the network of first feed lines to the plurality of first radiator elements according to a decreasing intensity for each element that is farther from the shared radiating element.

25. The apparatus of claim 21, wherein the apparatus is configured to produce a first gain when the second antenna is activated, and to produce a second gain that is higher than the first gain when the first antenna is activated.

26. The apparatus of claim 21, wherein the first antenna has a fractional input impedance bandwidth of about 10%, and the second antenna has a fractional input impedance bandwidth of about 9%.

27. The apparatus of claim 21, wherein the planar substrate includes:

a first fold extending along a lateral axis of the first antenna, wherein the fold divides the planar substrate between a first portion and a second portion; and a second fold extending along a lateral axis of the second antenna, wherein the fold divides the planar substrate between the first portion and a third portion, wherein the wherein the first portion includes each of the plurality of first radiator elements and the at least one second radiator element, wherein the second portion includes at least part of the network of first feed lines, and wherein the third portion include the second feed line.

28. The apparatus of claim 27, wherein the first fold and second fold are configured to conform a shape of the folded substrate to a corner of a device housing.

29. The apparatus of claim 27, wherein the apparatus is configured to produce a first gain when the second antenna is activated, and to produce a second gain that is lower than the first gain when the first antenna is activated.

30. The apparatus of claim 29, wherein the first gain is about 9 dBi, and wherein the second gain is about 5 dBi.

31. The apparatus of claim 21, wherein the apparatus has at least one of:

(i) a fractional input impedance bandwidth of about 11% for the first antenna and about 6% for the second antenna;

(ii) a front-to-back radiation ratio of 15 dB or greater for the first antenna and 10 dB or greater for the second antenna within the operating frequency band; or (iii) a beamwidth of about 20° for the first antenna and about 50° for the second antenna.

32. A mobile device comprising:

a housing; and an apparatus according to claim 27, wherein the apparatus is conformed to an interior corner of the housing.

33. The mobile device of claim 32, wherein the first portion of the apparatus is planar with a side edge of the device housing, and wherein the side edge of the device housing has an interior height of between 4.4-6.6 mm.

34. The mobile device of claim 33, wherein the shared radiator is configured to direct radiation in a direction away from a user of the mobile device when the mobile device is held in a landscape orientation.

35. A mobile device comprising:

a housing; and an apparatus according to claim 5, wherein the fold included in the substrate of the apparatus is adapted to conform to a corner of the housing.

36. The mobile device of claim 35, further comprising a processor configured to:

receive an indication of an orientation of the mobile device being one of a first orientation or a second orientation;

transmit and receive signals between the mobile device and a base station using the first antenna when the indicated orientation of the mobile device is the first orientation; and transmit and receive signals between the mobile device and the base station using the second antenna when the indicated orientation of the mobile device is the second orientation.

37. The mobile device of claim 35, wherein the first orientation is a portrait orientation, and wherein the second orientation is a landscape orientation.

38. The mobile device of claim 35, wherein the processor is further configured to:

receive a first instruction to perform a data transfer or point-to-point link operation;

in response to the first instruction, excite the second port to perform the data transfer or point-to-point link operation using the second antenna;

receive a second instruction to perform a broadcast operation; and in response to the second instruction, excite the third port to perform the data transfer or point-to-point link operation using the third antenna.

39. The mobile device of claim 17, wherein the mobile device has each of a length, a width and a thickness, and wherein the second portion of the substrate is positioned along an edge panel of the mobile device extending in a direction of the thickness of the mobile device.

40. The mobile device of claim 39, wherein the plurality of first radiator elements point in the direction of the thickness of the mobile device away from a user of the mobile device.

41. The mobile device of claim 35, wherein the mobile device has each of a length, a width and a thickness, and wherein the second portion of the substrate is positioned along an edge panel of the mobile device extending in a direction of the thickness of the mobile device.

42. The mobile device of claim 41, wherein the plurality of first radiator elements point in the direction of the thickness of the mobile device away from a user of the mobile device.

* * * * *